US010598222B2

(12) United States Patent
Devitt et al.

(10) Patent No.: US 10,598,222 B2
(45) Date of Patent: Mar. 24, 2020

(54) AIR BEARING FOR USE AS SEAL

(71) Applicant: NEW WAY MACHINE COMPONENTS, INC., Aston, PA (US)

(72) Inventors: Andrew Devitt, Media, PA (US); Richard Duane Pollick, West Chester, PA (US)

(73) Assignee: NEW WAY MACHINE COMPONENTS, INC., Aston, PA (US)

( * ) Notice: Subject to any disclaimer, the term of this patent is extended or adjusted under 35 U.S.C. 154(b) by 0 days.

(21) Appl. No.: 14/085,762

(22) Filed: Nov. 20, 2013

(65) Prior Publication Data

US 2014/0286599 A1 Sep. 25, 2014

Related U.S. Application Data

(63) Continuation-in-part of application No. 13/733,806, filed on Jan. 3, 2013, now Pat. No. 8,753,014.

(Continued)

(51) Int. Cl.
*F16C 32/06* (2006.01)
*F16C 33/74* (2006.01)
(Continued)

(52) U.S. Cl.
CPC ........ *F16C 32/0618* (2013.01); *F16C 17/107* (2013.01); *F16C 32/067* (2013.01);
(Continued)

(58) Field of Classification Search
CPC .. F16C 32/0618; F16C 17/107; F16C 32/067; F16C 33/741; F16C 32/0644;
(Continued)

(56) References Cited

U.S. PATENT DOCUMENTS 1,814,833 A 7/1931 Doran
2,086,896 A 7/1937 Carter
(Continued)

FOREIGN PATENT DOCUMENTS

DE 10201956 C1 7/2003
EP 0034280 A2 8/1981
(Continued)

OTHER PUBLICATIONS

Rasnick et al., "Porous Graphite Air-Bearing Components as Applied to Machine Tools," Society of Manufacturing Engineers Technical Report, pp. 1-45 (1974).
(Continued)

*Primary Examiner* — Charles G Freay
*Assistant Examiner* — Lilya Pekarskaya
(74) *Attorney, Agent, or Firm* — Volpe and Koenig, P.C.

(57) ABSTRACT

In order to effect a seal a porous material which comprises one side of two opposing surfaces is used to restrict and evenly distribute externally pressurized gas, liquid, steam, etc. between the two surfaces, exerting a force which is opposite the forces from pressure differences or springs trying to close the two faces together and so may create a non-contact seal that is more stable and reliable than hydrodynamic seals currently in use. A non-contact bearing is also disclosed having opposing surfaces with relative motion and one surface issuing higher than ambient pressure through a porous restriction, wherein the porous restriction is part of a monolithic porous body, or a porous layer, attached to lands containing a labyrinth, the porous restriction and lands configured to not distort more than 10% of a gap created from differential pressure between each side of the porous restriction.

16 Claims, 57 Drawing Sheets

Related U.S. Application Data

(60) Provisional application No. 61/728,595, filed on Nov. 20, 2012, provisional application No. 61/582,674, filed on Jan. 3, 2012, provisional application No. 61/704,927, filed on Sep. 24, 2012, provisional application No. 61/728,595, filed on Nov. 20, 2012.

(51) Int. Cl.
*F16J 15/34* (2006.01)
*F16C 33/72* (2006.01)
*F16C 17/10* (2006.01)
*F16C 11/06* (2006.01)

(52) U.S. Cl.
CPC ...... *F16C 32/0644* (2013.01); *F16C 32/0666* (2013.01); *F16C 32/0674* (2013.01); *F16C 33/726* (2013.01); *F16C 33/741* (2013.01); *F16C 33/748* (2013.01); *F16J 15/342* (2013.01); *F16C 11/0666* (2013.01); *F16C 2206/02* (2013.01); *F16C 2360/00* (2013.01)

(58) Field of Classification Search
CPC .............. F16C 32/0666; F16C 32/0674; F16C 33/726; F16C 33/748; F16J 15/342
See application file for complete search history.

(56) References Cited

U.S. PATENT DOCUMENTS

| | | | |
|---|---|---|---|
| 2,125,446 A | 8/1938 | Hurtt | |
| 2,407,807 A | 9/1946 | Bentley | |
| 2,680,410 A * | 6/1954 | Kolb | F04D 15/0077 210/450 |
| 2,683,635 A | 7/1954 | Wilcox | |
| 2,683,636 A | 7/1954 | Wilcox | |
| 2,888,802 A * | 6/1959 | Dosmann | F02C 3/062 60/791 |
| 3,021,146 A | 2/1962 | Sommer et al. | |
| 3,132,903 A | 5/1964 | Webb | |
| 3,169,807 A | 2/1965 | Abel et al. | |
| 3,302,865 A * | 2/1967 | Kun | 417/423.12 |
| 3,360,309 A | 12/1967 | Voorhies | |
| 3,368,850 A | 2/1968 | Wilcox | |
| 3,395,949 A | 8/1968 | Kun | |
| 3,399,001 A | 8/1968 | Whitaker | |
| 3,450,448 A | 6/1969 | Weichsel | |
| 3,476,451 A | 11/1969 | Schwartzman | |
| 3,502,920 A | 3/1970 | Chaboseau | |
| 3,518,021 A * | 6/1970 | Lake | F04D 23/008 384/91 |
| 3,603,654 A | 9/1971 | Bird | |
| 3,612,630 A | 10/1971 | Rosensweig | |
| 3,620,581 A | 11/1971 | Heller et al. | |
| 3,645,589 A * | 2/1972 | Bird | F16C 32/0618 384/107 |
| 3,650,582 A | 3/1972 | Casey | |
| 3,698,724 A | 10/1972 | Blanchere et al. | |
| 3,698,725 A | 10/1972 | Klabunde | |
| 3,701,535 A | 10/1972 | Dieter Born et al. | |
| 3,718,334 A | 2/1973 | Kiwalle | |
| 3,721,479 A | 3/1973 | Rasnick et al. | |
| 3,728,857 A * | 4/1973 | Nichols | 62/469 |
| 3,763,534 A | 10/1973 | Conroy et al. | |
| 3,969,042 A * | 7/1976 | Bachler | F04D 19/042 384/109 |
| 4,021,050 A | 5/1977 | Powers | |
| 4,053,162 A | 10/1977 | Bjerk | |
| 4,118,042 A | 10/1978 | Booth | |
| 4,174,842 A | 11/1979 | Partus | |
| 4,199,152 A | 4/1980 | Catterfeld | |
| 4,355,850 A * | 10/1982 | Okano | F01D 25/22 384/121 |
| 4,361,332 A | 11/1982 | Logan et al. | |
| 4,613,141 A | 9/1986 | Heinen | |
| 4,664,973 A | 5/1987 | Otfinoski et al. | |
| 4,676,668 A | 6/1987 | Ide | |
| 4,710,034 A | 12/1987 | Tittizer et al. | |
| 4,732,531 A | 3/1988 | Minoda et al. | |
| 4,749,283 A * | 6/1988 | Yokomatsu | F16C 29/025 384/12 |
| 4,809,354 A * | 2/1989 | Kawashima | F16C 29/025 384/114 |
| 4,838,710 A * | 6/1989 | Ohta | C23C 14/32 384/100 |
| 4,927,274 A | 5/1990 | Smith | |
| 5,058,905 A | 10/1991 | Nosowicz et al. | |
| 5,280,208 A * | 1/1994 | Komura et al. | 310/90 |
| 5,284,347 A | 2/1994 | Pope | |
| 5,360,273 A | 11/1994 | Buckmann | |
| 5,509,737 A | 4/1996 | Waskiewicz et al. | |
| 5,645,354 A | 7/1997 | Heinzl et al. | |
| 5,713,576 A | 2/1998 | Wasser et al. | |
| 5,722,671 A | 3/1998 | Nosowicz et al. | |
| 5,743,654 A | 4/1998 | Ide et al. | |
| 5,865,441 A | 2/1999 | Orlowski | |
| 6,004,037 A | 12/1999 | Harris et al. | |
| 6,019,515 A * | 2/2000 | Fujii et al. | 384/107 |
| 6,024,491 A | 2/2000 | Bak | |
| 6,062,568 A | 5/2000 | Orlowski et al. | |
| 6,276,145 B1 | 8/2001 | Sharpless et al. | |
| 6,288,465 B1 * | 9/2001 | Suzuki | F16C 32/00 219/648 |
| 6,315,452 B1 * | 11/2001 | Titcomb | 384/114 |
| 6,342,270 B1 | 1/2002 | Kumamoto et al. | |
| 6,342,306 B1 | 1/2002 | Ozawa et al. | |
| 6,404,845 B1 | 6/2002 | Sharpless et al. | |
| 6,494,460 B2 | 12/2002 | Uth | |
| 6,505,836 B1 | 1/2003 | Toshihiko | |
| 6,515,288 B1 * | 2/2003 | Ryding | F16C 29/025 250/441.11 |
| 6,659,739 B2 | 12/2003 | Varney et al. | |
| 6,872,002 B2 | 3/2005 | Tomita et al. | |
| 6,881,027 B2 | 4/2005 | Klaass et al. | |
| 7,023,952 B2 | 4/2006 | Brunnett | |
| 7,396,017 B2 | 7/2008 | Orlowski et al. | |
| 7,461,846 B2 | 12/2008 | Chitren | |
| 7,631,878 B1 | 12/2009 | Orlowski et al. | |
| 7,823,885 B2 | 11/2010 | Droscher et al. | |
| 8,035,272 B2 | 10/2011 | Yoshikawa et al. | |
| 8,073,098 B2 | 12/2011 | Holzermer et al. | |
| 8,123,868 B2 | 2/2012 | Devitt | |
| 8,228,675 B2 | 7/2012 | Koplow | |
| 8,882,446 B2 * | 11/2014 | Underbakke | 415/111 |
| 2001/0053196 A1 | 12/2001 | Sai | |
| 2005/0172800 A1 | 8/2005 | Uchino | |
| 2005/0210875 A1 | 9/2005 | Larue et al. | |
| 2006/0060259 A1 | 3/2006 | Devitt | |
| 2006/0062499 A1 | 3/2006 | Boyd | |
| 2007/0134111 A1 * | 6/2007 | Eybergen | F04D 13/028 417/423.6 |
| 2008/0303614 A1 | 12/2008 | Fischer et al. | |
| 2009/0034887 A1 | 2/2009 | Fujikawa et al. | |
| 2010/0143104 A1 | 6/2010 | Furman et al. | |
| 2010/0207389 A1 | 8/2010 | Nyffemegger | |
| 2010/0213674 A1 | 8/2010 | Garrison et al. | |
| 2010/0277020 A1 | 11/2010 | Devitt | |
| 2011/0052375 A1 * | 3/2011 | Underbakke | F04D 29/047 415/170.1 |
| 2011/0169225 A1 | 7/2011 | Winkler et al. | |
| 2011/0243762 A1 | 10/2011 | Daikoku et al. | |
| 2012/0163742 A1 * | 6/2012 | Underbakke | F16C 32/0692 384/123 |
| 2014/0217205 A1 * | 8/2014 | Kobayashi | F01D 1/023 239/700 |

FOREIGN PATENT DOCUMENTS

| | | |
|---|---|---|
| EP | 0262939 A2 | 4/1988 |
| EP | 0 488 715 | 6/1992 |
| EP | 0 882 915 | 12/1998 |
| EP | 0 900 959 | 3/1999 |
| EP | 2 386 369 | 11/2011 |

(56) References Cited

FOREIGN PATENT DOCUMENTS

| | | | |
|---|---|---|---|
| EP | 2505778 A1 * | 10/2012 | ............ F01D 1/023 |
| GB | 2360332 A | 9/2001 | |
| JP | S4713781 A | 7/1972 | |
| JP | S4831163 B1 | 9/1973 | |
| JP | S547970 A | 1/1979 | |
| JP | S6457422 U | 4/1989 | |
| JP | H03292413 A | 12/1991 | |
| JP | H109267 A | 1/1998 | |
| JP | H10132088 A | 5/1998 | |
| JP | H1162877 A | 3/1999 | |
| JP | 2007113786 A | 5/2007 | |
| JP | 2007-274770 A | 10/2007 | |
| JP | 2008-508838 A | 3/2008 | |
| JP | 2011-112144 A | 6/2011 | |
| WO | 10/151138 | 12/2010 | |

OTHER PUBLICATIONS

Koplow, "A Fundamentally New Approach to Air-Cooled Heat Exchangers," Sandia Report, SAND2010-0258 (Jan. 2010).

* cited by examiner

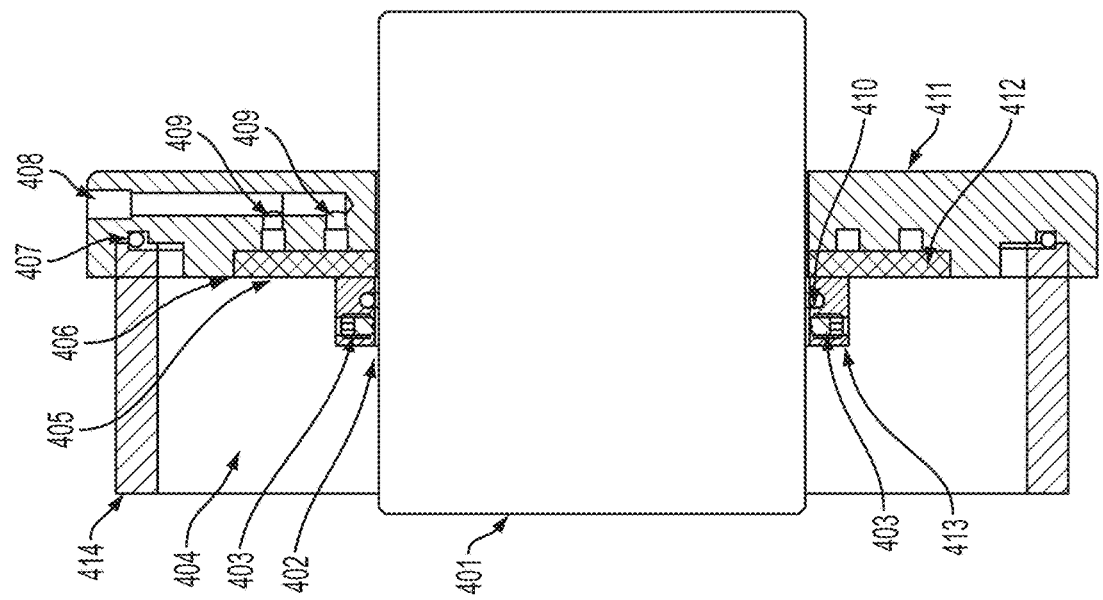
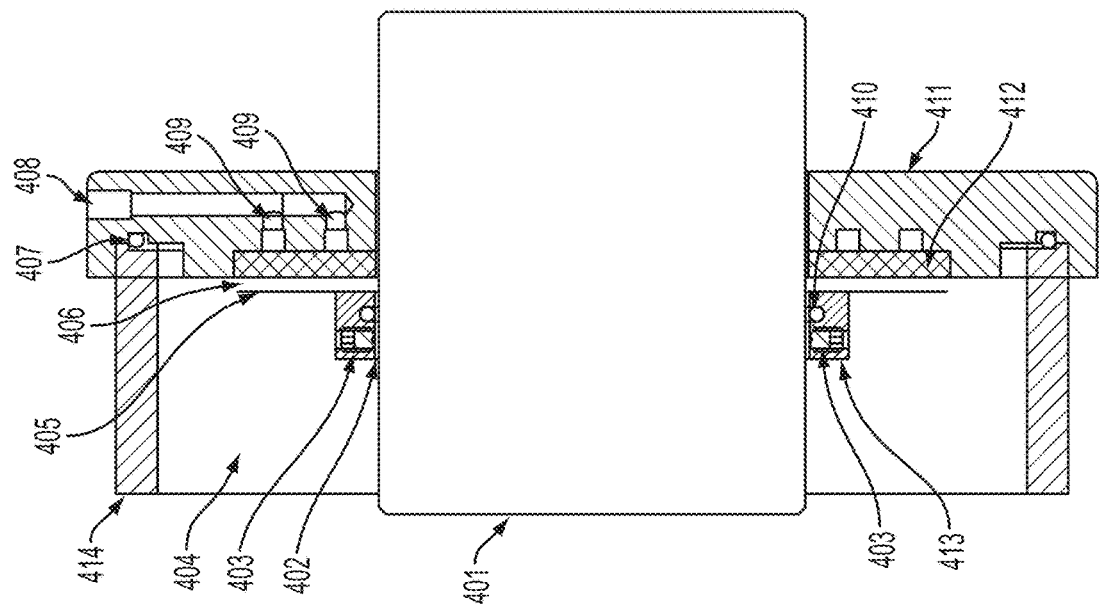

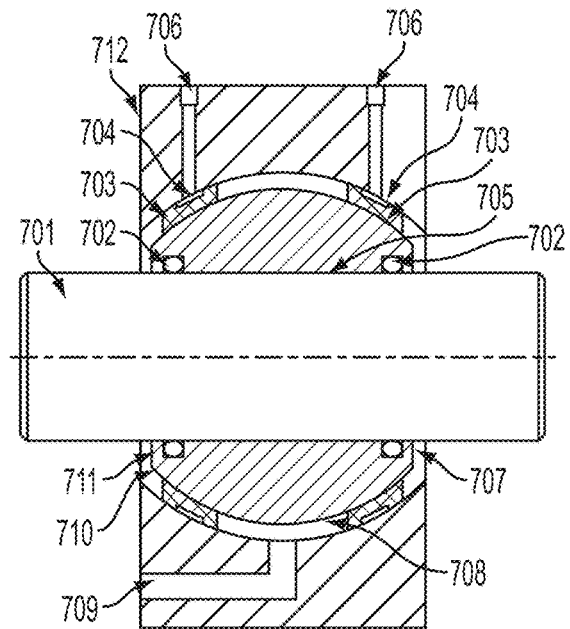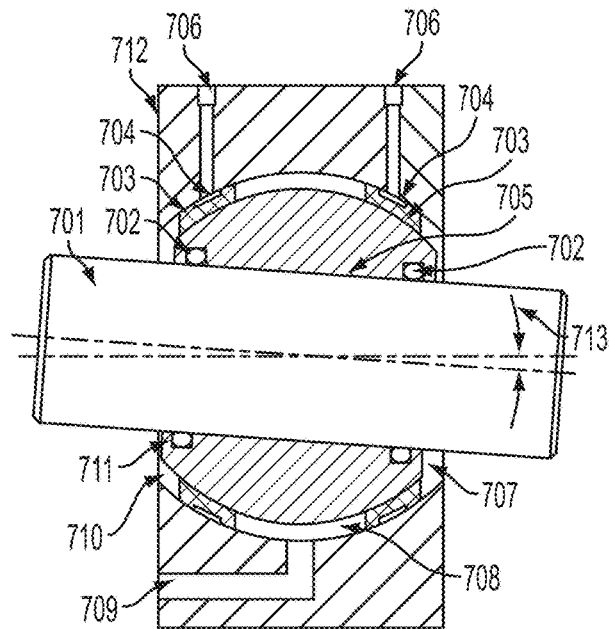
FIG. 7A   FIG. 7B
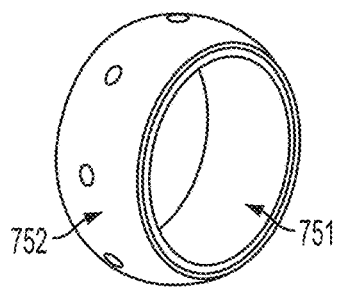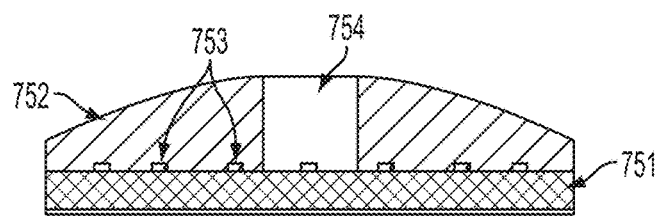
FIG. 7C

AIR BEARING FOR USE AS SEAL

REFERENCE TO RELATED APPLICATIONS

This application is a continuation-in-part of U.S. patent application Ser. No. 13/733,806, filed on Jan. 3, 2013 which claims the benefit of U.S. Provisional Application Nos. 61/582,674, filed Jan. 3, 2012; 61/704,927, filed Sep. 24, 2012; and 61/728,595, filed Nov. 20, 2012, whose disclosures are hereby incorporated by reference in their entireties into the present disclosure.

FIELD OF INVENTION

This application is generally related to bearings and seals used in pumps, compressors, turbines, generators, motors, turbo expanders and chargers, mixers, thrusters, propulsors, in-line pumps, refiners etc., that are used in the oil and gas, power generation e.g., compressed air and pumped hydro storage, aero turbine, chemical processing, paper manufacturing, aeration and water purification, gas separation, and various other process fields.

BACKGROUND

Turbo equipment typically includes a rotating shaft with impellers or blades that are borne by a radial bearing at either end of the rotating shaft. A thrust bearing is employed at one end of the shaft in order to accommodate axial loading of the rotating shaft assembly.

Typically dry gas or mechanical seals are used ensure that bearing oil lubrication is not mixed with process fluid and to contain high pressure gases from escaping. Dry gas seals use hydrodynamic air bearing affects to create small, non-contact gaps. These non-contact gaps are effective as sealants only when the surface speed between the sealing surfaces is relatively high and the bearing surfaces remain flat and pressed against each other to prevent seizure at speed and/or "Hang-ups." Mechanical seals suffer from similar issues.

In contact based seals, areas of the shaft and seal are subject to wear and leakage and create a lot of noise e.g., lip seals. Brush and ablatable seals are a form of contact based seals that use centrifugal force or pressure differentials to keep them in contact with a respective mating surface. General wear on brush and ablatable seals create particulates that add significantly to maintenance costs; at high speeds, heat and frictional losses between the seals and shaft are significant. Labyrinth seals provide a form of non-contact seal that minimizes wear on the shaft caused by contact, but these non-contact seals provide a conductance path that can result in huge flows when there are pressure differentials across the seal. Leakages in non-contact seals are reduced by minimizing and elongating clearances in an axial direction between the rotating and stationary sections of the seal. This adds significant costs and is not always effective. In process equipment, bearing isolators are used to combine labyrinth and lip seal technologies. These isolators inject fluid or gas at a higher pressure than the flow pressure of the volume to be sealed, as seen in U.S. Pat. No. 7,631,878 (Orlowski).

In Turbo equipment, hydrodynamic oil bearings, such as spiral groove and foil bearing, are typically configured as either a sleeve or tilting pad to accommodate rotary loads or a tilting pad-type bearing to accommodate thrust loads. The bearings may be mounted in various configurations, such as, for example: stud mounting, where a rounded or spherical surface mates with a backside of a bearing pad, See, New Way Air Bearings' web site under "mounting components"; flexure mounting, where a bearing pad moves freely in various directions as a result of being mounted upon a compliant member e.g., a flexure or groove, See generally, U.S. Pat. No. 5,743,654 (Ide); elastomeric mounting, where a bearing pad has compliance from contact with an elastomeric member e.g., an O-ring type mount, See generally, U.S. Pat. No. 3,360,309 (Voorhis); a spring-type mounting that provides compliance to the bearing pad, e.g., Belleville washers; and any other suitable mount, such as, linkages, hardened balls, rods, pins, etc.

The hydrodynamic oil bearings provide non-contact seals, such as gas and labyrinth seals, based on the viscous dragging of a fluid or gas into a small gap. The oil bearings build up a pressure "wedge" as certain speeds are reached. See generally, Pall Corporation and Carbone Turbograph gas seals; U.S. Publication No. 2006/0062499 A1 (carbon graphite, ceramic materials, pressurized gas in high-speed turbine engines). Typically small electric motor compressors e.g., oil-free positive displacement compressors, pneumatically-driven positive displacement compressors, or multi-stage centrifugal compressors, that are direct driven, high speed, and constructed with stainless steel and without internal seals or oil lubrication systems, are used in the industry to provide air and a relatively small amount of seal gas at a relatively high pressure. It is important to remove particulates and condensates prior to injecting gas into an externally pressurized gas bearing; air quality Class 3 as defined by ISO 8573-1 is recommended for use in externally-pressurized gas bearings. See generally, Almasi, Turbomachinery International November/December 2013 issue. Use of conventional sealing systems that combine labyrinth and face/dry-gas seal technologies facilitate low flows from the small gaps positioned between the technologies. The buffer/flush gas provided in the small gap flows to a process side through the labyrinth. Similarly, a seal gas is provided that flows to a process side. The seal gas may be vented or flared. Some separation gas vents through a bearing chamber with a pumped-oil input. Temperature fluctuations in the bearing chamber cause large changes in oil viscosity and oil leakage from turbo systems creating serious problems; drains and coolers are used to control oil temperature.

SUMMARY

Briefly stated, the invention provides a porous externally pressurized gas bearing technology for use as a seal in Turbo equipment e.g., turbines, pumps, centrifugal and axial compressors, expanders, blowers, dryers, high speed motors, etc., that eliminates the need for oil-based bearings and improves efficiency in large equipment by combining sealing and bearing functions. The combination of sealing and bearing functions in Turbo equipment has implications for length, stiffness, and dynamic performance of rotating equipment. These pressurized gas bearings are non-contact bearings that: operate independent of relative motion, e.g., zero RMP; operate at extreme temperatures, e.g., in cryogenic or superheated steam applications; operate while using highly pressurized process gas or fluid in a non-contact bearing gap; combine sealing and bearing functionality to prevent or reduce wear and pressure between contacting faces; prevent "hang-ups" that result from failure of a compliance or biasing mechanism; increase rotordynamic stability. As non-contact seals, these gas bearings have no coulomb friction and no wear. There is viscous sheer friction in the air film but this is orders of magnitude less than the bearing friction. The structure and functionality of the gas bearings results in reduced maintenance and weight of the overall system, eliminates dry-running at start-up, extends the life of the bearings, allows the bearing system to operate aerodynamically should the gas supply be interrupted (magnetic bearings require a back-up bearing in the event of a power interruption), and results in reduced energy consumption and an environmentally-friendly solution to oil bearings.

The pressurized gas bearing uses a porous media to restrict and evenly distribute the flow of externally supplied hydrostatic pressure into an air bearing gap by exerting a force that is opposite the forces from the pressure differences or springs being used to bias the bearing faces together. The porous media externally pressurized gas bearing is able to run on process fluid and the porosity can be adjusted to restrict the flow of pressurized gas in the gas bearing to the molecular weight and/or viscosity of the gases to be used in the Turbo equipment. The porous media may be bonded to a nonporous housing with an air distribution labyrinth that leads into the porous media.

The air bearing gap is located between at least two opposing seals or counter surfaces and maintains the high pressure in the air bearing gap to seal against migration of contamination, liquids, and gases and separates atmospheric pressure from a vacuum used to preload the air film in lightly loaded precision stages. Even though the pressurized gas bearing is a non-contact system, the seals are mechanically coupled to a respective counter bearing surface via compression of the air film and the flow through the porous media is determined by a desired flow through the air gap, generally approximately two times the desired flow with the shaft or thrust in place.

The aerostatic pressure of the bearing system may be adjusted to the point where the bearing faces are completely unloaded and zero contact pressure exists between the bearing faces even though the bearing faces are in intimate contact. Contact between the bearing faces results in approximately zero flow through the air gap and the line pressure being fed into the porous material will exist between the bearing faces. This contact force can easily be adjusted by varying the input pressure to reduce wear and heat generated by friction in conventional contact seals and by increasing the air gap thickness during shaft rotation to minimize temperature build-up through sheer energy losses. This technology can be applied to radial bearings for rotating shafts, thrust bearings, and also for use in sealing various surfaces of rotating components e.g., impellers, etc.

Unlike an orifice bearing that will collapse and close the air gap in an overload condition, externally pressurized gas bearings that include porous graphite bearing faces generate a mitigating force in an overload condition. This occurs because the porous media does not depend on the air gap to distribute air pressure across the bearing face and the faces continue to exert air pressure across the entire bearing are. This happens even in a zero gap or zero flow situations.

Externally pressurized gas bearings have the potential to revolutionize the fundamental design of Turbo equipment. This is, in part, because the pressurized gas bearings have the capability to operate with process gases, carbon dioxide, nitrogen, helium, argon, other gases, or even steam, and at process temperatures which allows the gas bearings to move from the ends of the shafts to a position directly between the impellers or stages. Further, the gas bearings may also be positioned and employed in places where work is being done in the turbo equipment that were previously off-limits to bearing technology. This substantially improves rotor dynamics since gas bearings on the impellers allow for independently-rotating stages and high-speed motors can be integrated directly into each impeller stage; this eliminates the need for a rotating shaft, gear boxes, elongation of shaft segments, and alignment issues between the compressor and motor/driver. This is a substantial improvement over the prior art since each impeller stage can be independently rotated at its most efficient speed for the Turbo equipment as an overall bearing system. Further, externally pressurized gas bearings allow for shorter shaft segments, higher speed-capability, larger bearing journals, dramatic stiffening of the shaft, and additional squeeze-film damping surface area which eliminates the need for the circulation and cooling of oil and venting of gases to flare. Removing the possibility that oxygen will be introduced into the flammable gases being compressed results in increased safety for Turbo equipment operators and bystanders.

Because externally pressurized gas bearings combine sealing and bearing functionality, highly-effective seals are possible between impeller stages, radially at the root on the shaft diameter, and/or axially at the perimeter of the impellers. Axial bearings at the perimeter of a centrifugal stage can be fitted with axial compliance and biasing forces. This provides both damping and compliance for thermal growth. Most importantly, such bearing/seal combinations eliminate blow-by inefficiencies, avoiding the problems associated with large high pressure flows through non-deterministic clearance gaps. Thin laminar flow gas-bearing gaps seal between impeller stages in narrow bearing bands just inside an impeller's outer diameter and large clearances are left everywhere else. Consequently, use of the externally pressurized gas bearings results in noise reduction and Turbo equipment that is more efficient.

A non-contact bearing is also disclosed having opposing surfaces with relative motion and one surface issuing higher than ambient pressure through a porous restriction, wherein the porous restriction is part of a monolithic porous body, or a porous layer, attached to lands containing a labyrinth, the porous restriction and lands configured to not distort more than 10% of a gap created from differential pressure between each side of the porous restriction.

BRIEF DESCRIPTION OF THE DRAWINGS

The foregoing summary, as well as the following detailed description of the preferred embodiments, will be better understood when read in conjunction with the appended drawings. For the purpose of illustrating the invention, there is shown in the drawings embodiments which are presently preferred. It should be understood, however, that the invention is not limited to the precise arrangement shown.

FIG. 4 is a single blade seal.

FIG. 7A-7B is an angular seal compliance.

FIG. 7C is an angular and axial seal compliance.

DETAILED DESCRIPTION OF THE PREFERRED EMBODIMENTS

Figure 1A:
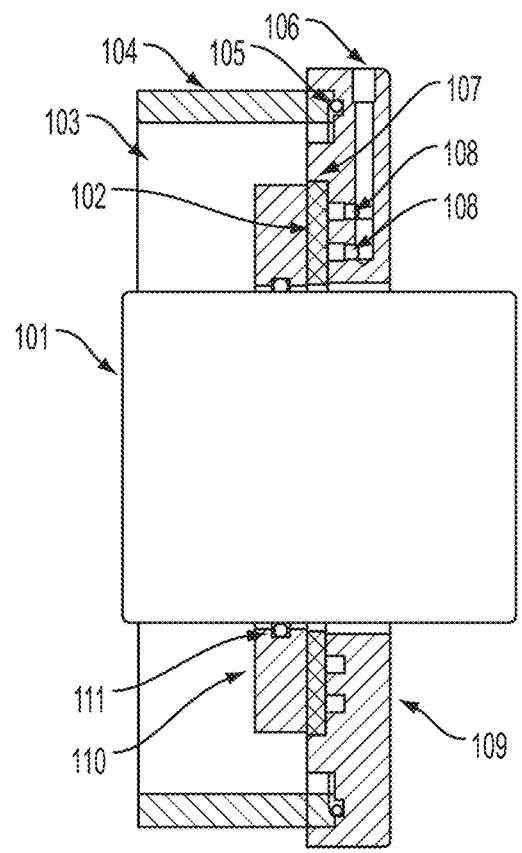
FIG. 1A is a vertical section cut of a simplified single face gas bearing seal.

Certain terminology is used in the following description for convenience only and is not limiting. The words "front," "back," "left," "right," "inner," "outer," "upper," "lower," "top," and "bottom" designate directions in the drawings to which reference is made. Additionally, the terms "a" and "one" are defined as including one or more of the referenced item unless specifically noted otherwise. A reference to a list of items that are cited as "at least one of a, b, or c" (where a, b, and c represent the items being listed) means any single one of the items a, b, or c, or combinations thereof. The terminology includes the words specifically noted above, derivatives thereof, and words of similar import.

Figure 1B:
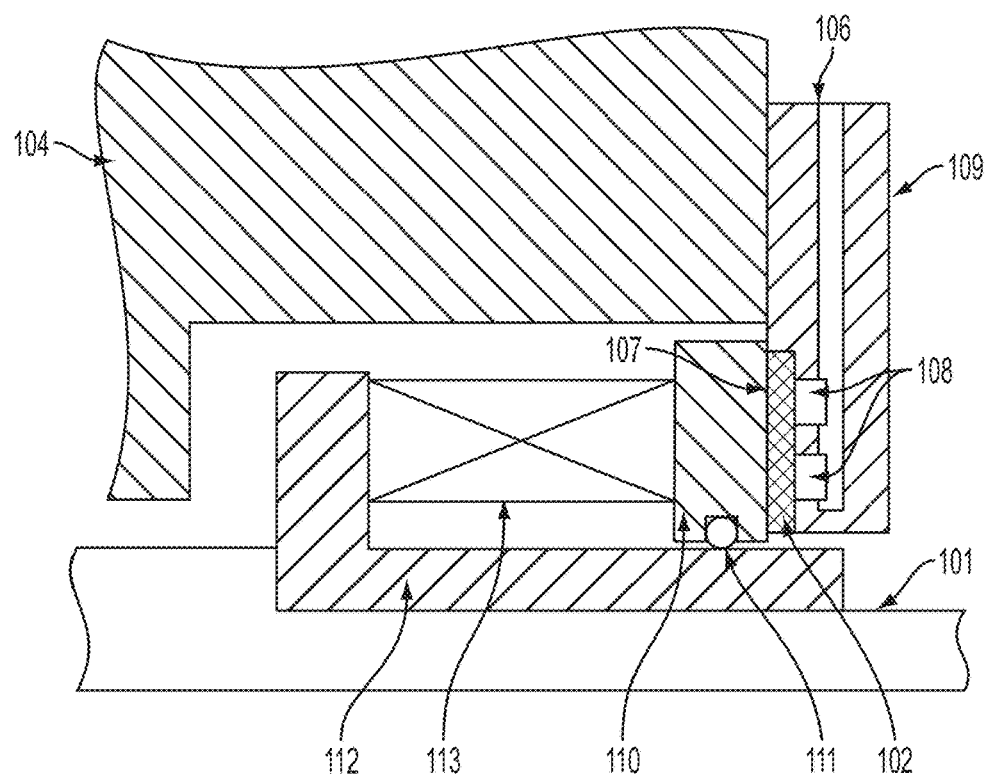
FIG. 1B is a detailed section cut of a single face flexible rotating element.
Figure 1C:
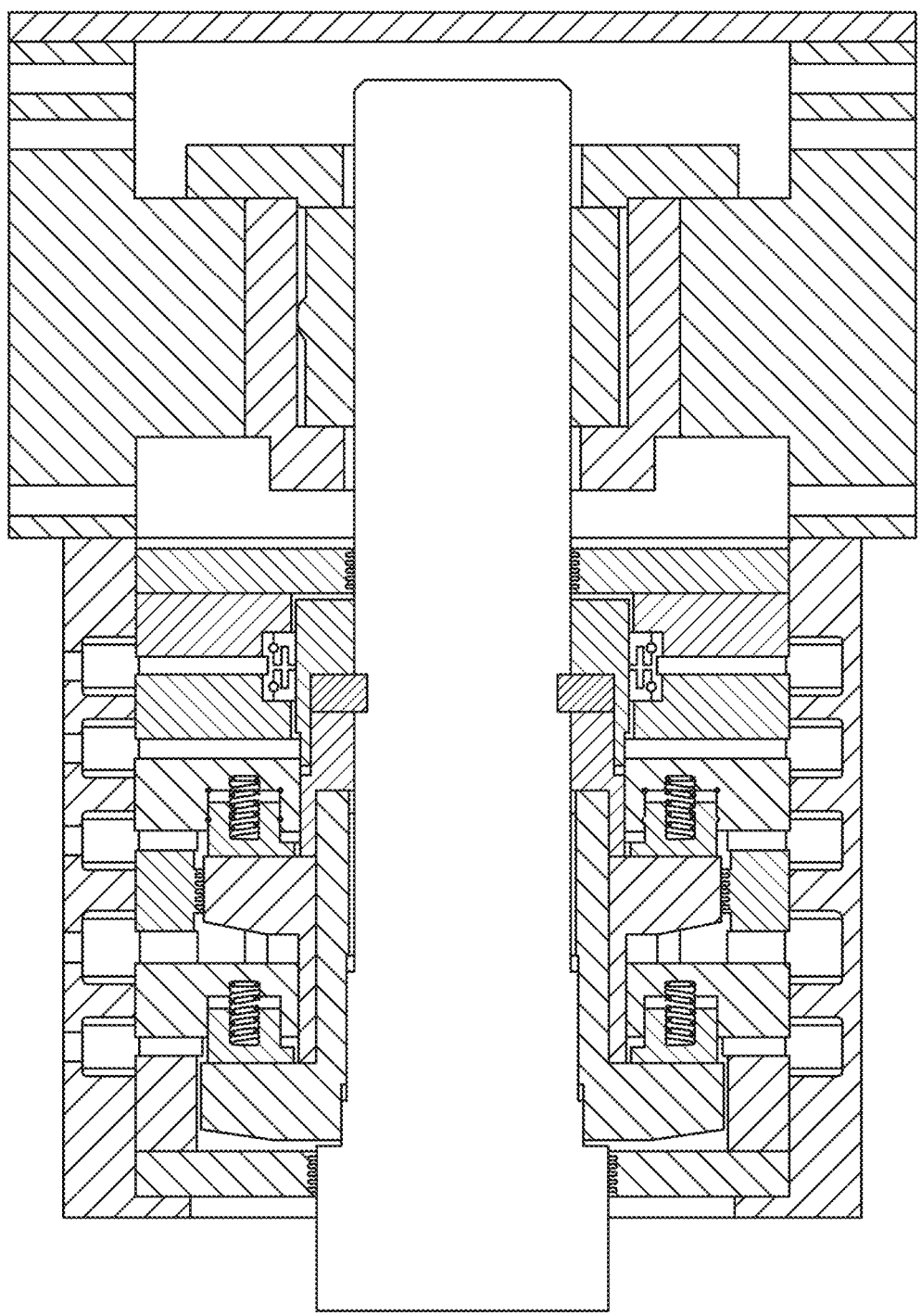
FIG. 1C is a diagram showing a prior art image without description.
Figure 2A:
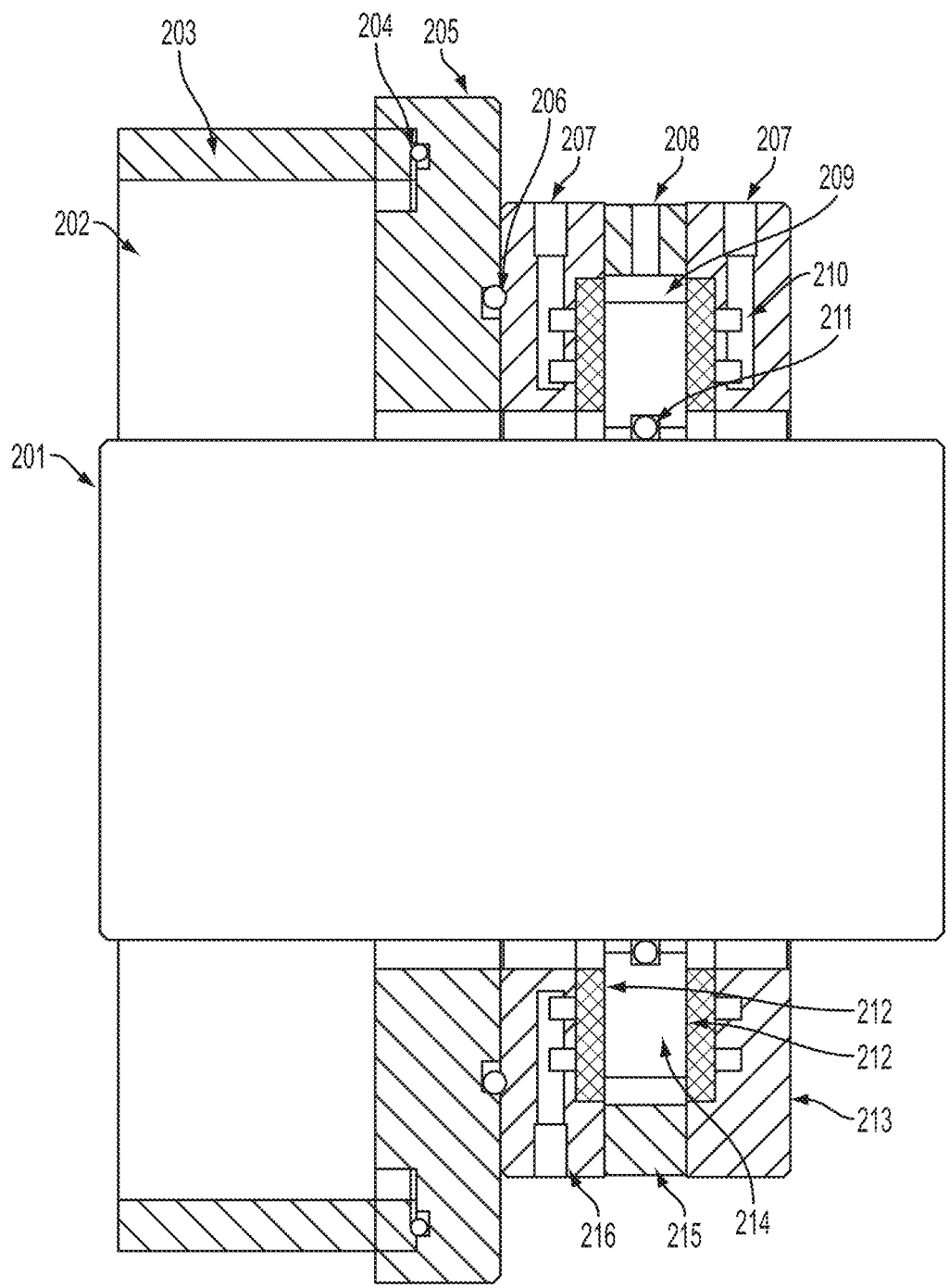
FIG. 2A is a double opposed simplified gas bearing seal.

As illustrated in FIGS. 1A and 2A, a shaft 101 that may rotate at high speeds 201 is coupled to a runner 110, 214 via an O-ring 111, 211 or any other suitable mounting mechanism. The shaft 101 may be equipped with a sleeve 112. The O-ring 111, 211 provides axial compliance to the runner 110, 214 by accommodating axial displacements of the shaft 101 and/or self-adjusting gaps that occur between the runner 110, 214 and a stationary surface. The thickness of the gap is a function of hydrostatic input pressure, the forces urging air bearing faces 212 together, restrictions of porous media 107 and the ratio of surface area to leak edge of the surfaces. These variables may be controlled to create highly effective noncontact seals. In one embodiment, the runner 110, 214 is hard-mounted to the shaft 101 and axial compliance is designed into the stationary components so that the runner 110, 214 is free to move radially on an air film. As illustrated in FIGS. 1B and 2A, a spring loading mechanism 113 biases the runner 110, 214 or opposing air bearing faces 212 of at least two mechanical seals into contact to adjust the load on the seal faces 212 and provide axial compliance.

As illustrated in FIGS. 1A, 1B, and 2A, a seal body 109 is mounted at an interface to a housing casing 203 or adapter plate 205 via an O-ring seal 105. The seal body 109 is equipped with conductive passages 106 that supply pressurized fluid to a labyrinth 108. The labyrinth 108 evenly distributes the pressurized fluid to the backside of a porous media 107 comprised of any porous or sintered material such as graphite, carbon, silicon carbide, Tungsten carbide, alumina, etc. In an alternative embodiment, any air bearing compensation technique may be used, such as, for example, orifice, step, groove, inherent or pocketed compensation, etc.

Figure 1D:
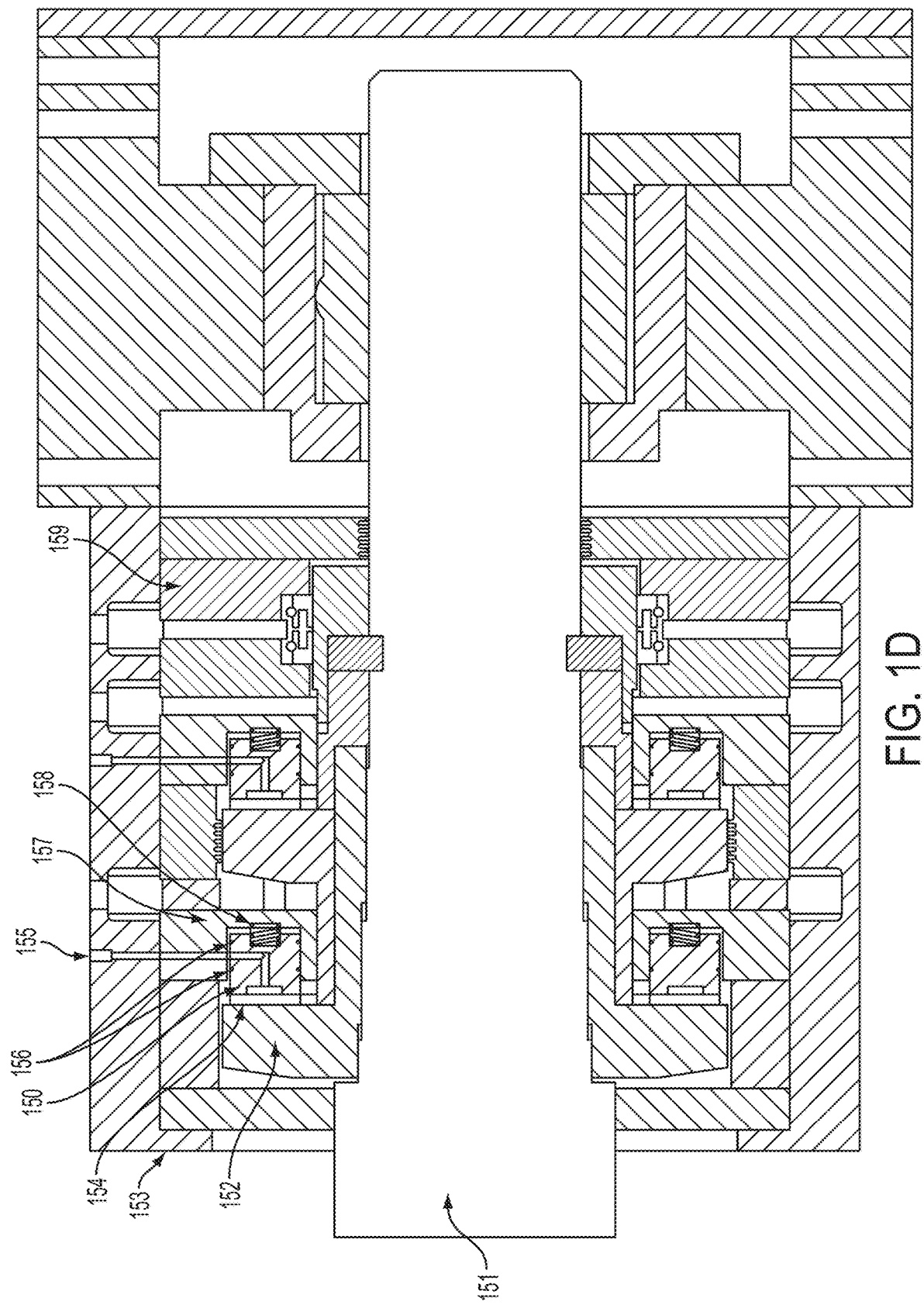
FIG. 1D is a side view of a vertical section cut of a tandem face seal.

As illustrated in FIG. 1D, a shaft 151 for a piece of rotating equipment, for example, a compressor or turbine, has a sleeve and rotating mating ring 152 that cooperates with a primary ring 150. A compressor case 153 receives a seal cartridge 159, shown by API standard 682. The seal cartridge 159 feeds pressure to a porous face 154 of the primary ring 150. The primary ring 150 does not rotate and acts as "flexible element" that introduces pressure through a port 155 into a Plenum 157 which is sealed with O-rings 156. A spring 158 or diaphragm type flexure acts as a biasing force and keeps the air bearing primary ring 150 pressed against the rotating mating ring 152. In a tandem seal the same description is repeated with regard to a secondary seal.

Figure 1E:
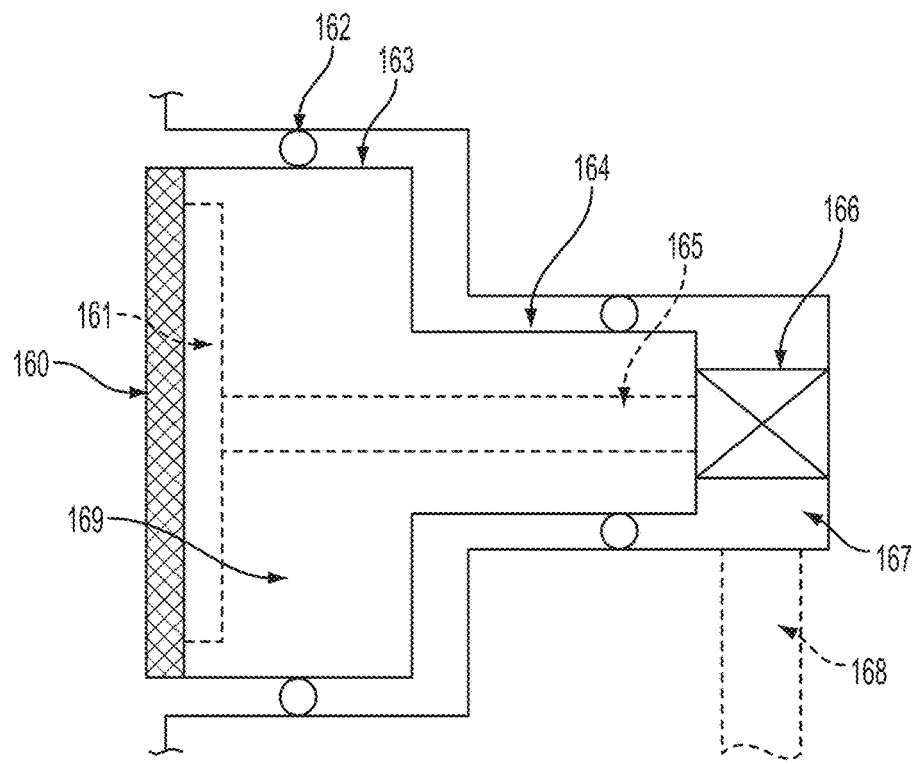
FIG. 1E is a detailed view of a flexible stationary primary with adjustable air closing force

As illustrated in FIG. 1E, a primary ring 169 with a porous face 160 and a Plenum 167 is contained inside the seal cartridge 159 by O-rings 162. A port 165 of the Plenum 167 distributes air pressure behind the porous face 160 to a through port 168. A spring 166 or diaphragm type flexure acts as a biasing force and keeps the primary ring 169 against the mating ring to avoid any potential leakages. To prevent "hang ups" that occur when the compliant ring is not forced against the mating ring and cause undesired back flows, the air pressure being fed to the face 160 of the bearing may also be employed on the back of, in this case, the primary ring 169.

Figure 1F:
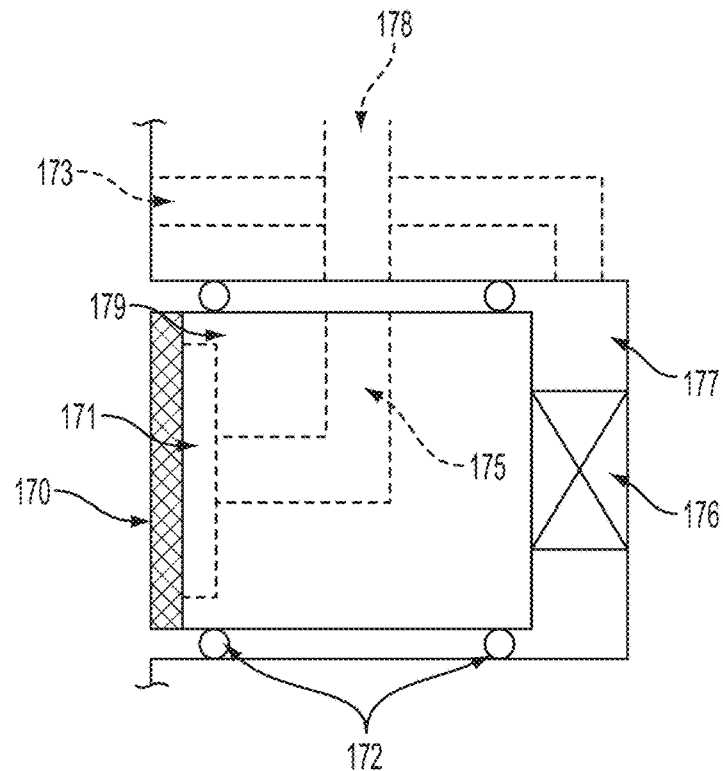
FIG. 1F is a flexible stationary primary with mechanical closing force.

As illustrated in FIG. 1F, a primary ring 179 with a porous face 170 and a Plenum 171 that distributes air pressure behind the porous face 170 is constrained between O-rings 172 within the seal cartridge. A port 178 supplies air pressure from a bearing functionality to a port 175 before reaching Plenum 171. A vent 173 isolates pressure meant for the air bearing face and exerts a force on the back of the primary ring. In this way only the spring or diaphragm forces will urge the primary ring towards the mating ring.

Figure 1G:
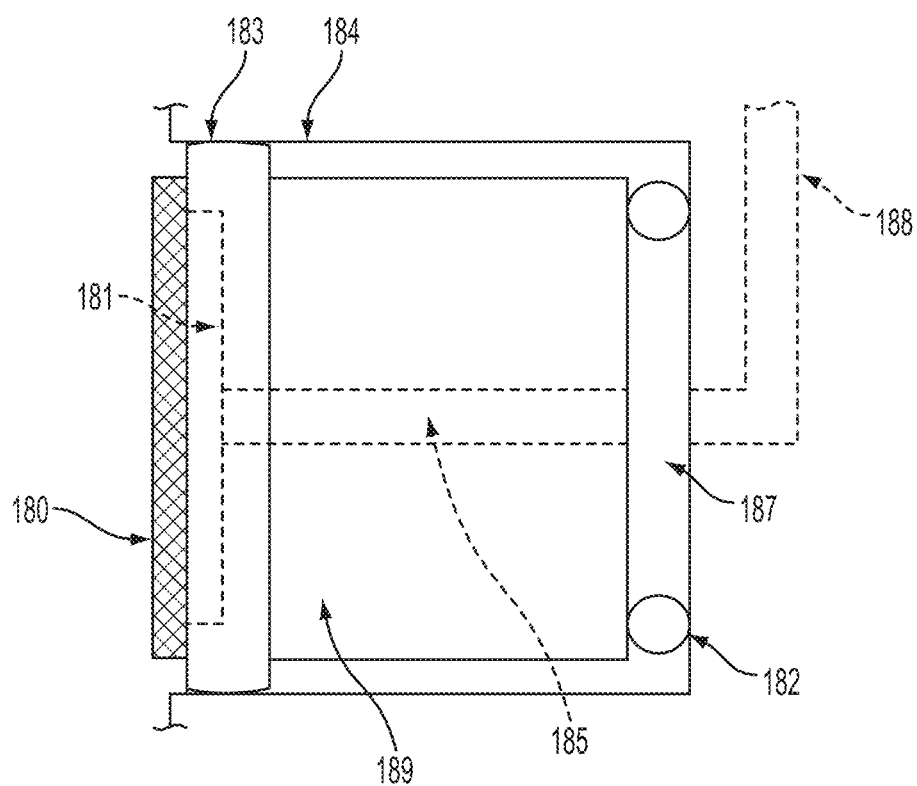
FIG. 1G is a flexible stationary primary with Torus.

As illustrated in FIG. 1G, a primary ring 189 with a porous face 180 and a Plenum 187 that distributes air pressure behind the porous face 181 is constrained in the seal cartridge by an O-ring 182 and a Torus 183 e.g., a segment of a sphere or a curve with constant diameter (See FIG. 1G). The primary ring 189, O-ring 182, and Torus 183 are tightly fitted inside of the seal cartridge diameter 184. A port 188 introduces air pressure to the bearing and supplies the pressure to a port 185 though the Plenum 187. The Plenum 187 supplies the pressure to a labyrinth 181 and the labyrinth 181 supplies the pressure to a porous media 180.

Figure 2B:
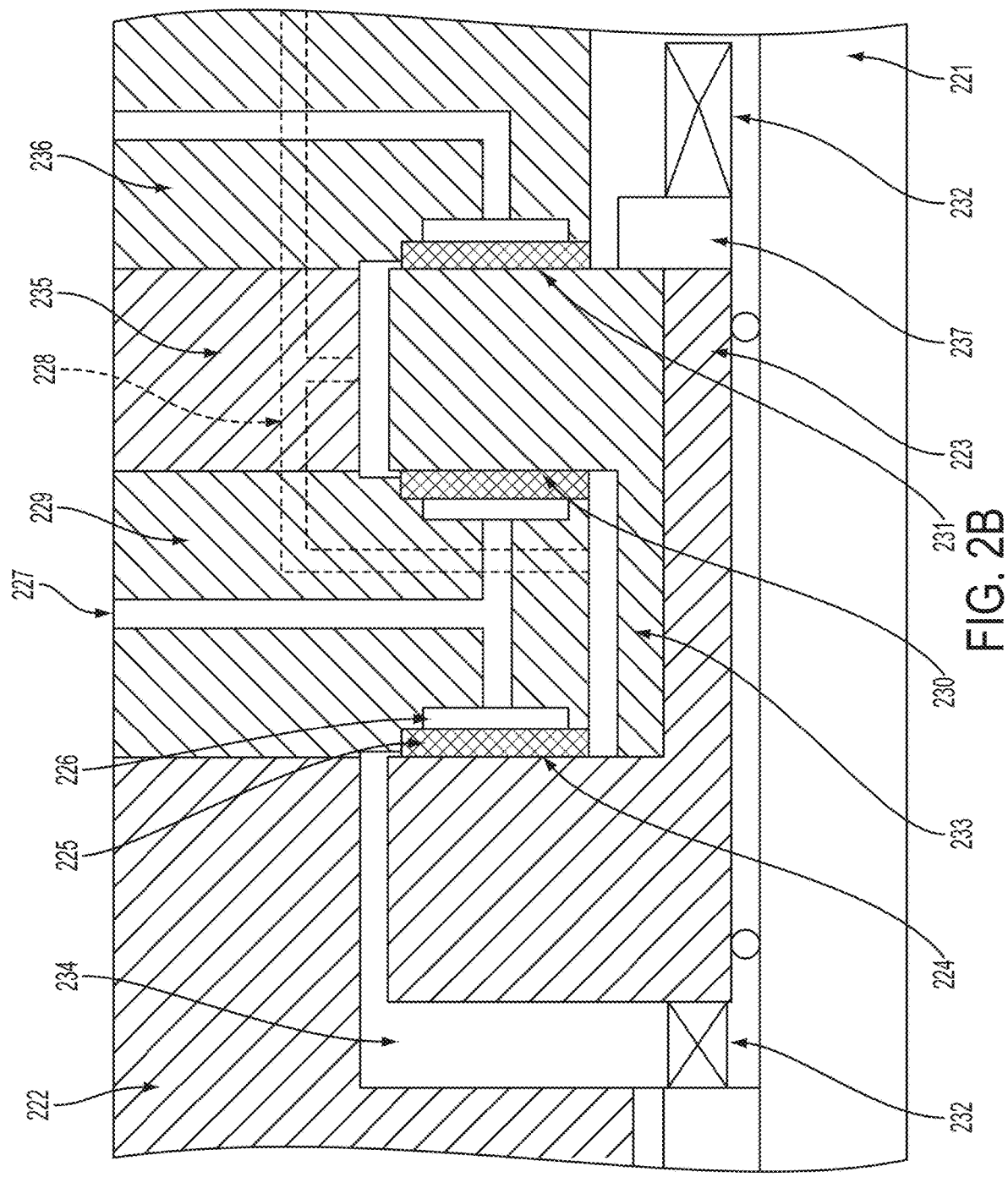
FIG. 2B is a flexible rotating element with double opposed preferred.

As illustrated in FIG. 2B, a shaft 221 for a piece of Turbo equipment has a seal cartridge 222. A mating ring 223 that is a rotating flexible element is provided within the seal cartridge 222. The mating ring 223, as shown in FIG. 2B, is integrally associated with a sleeve. In one embodiment, the sleeve and mating ring 223 may be separate components. The mating ring 223 and sleeve are supported axially on the shaft 221 via springs 232 and the mating rings 223, 233 are locked together axially by clamping ring 237. In one preferred embodiment, the mating ring 223 runs against a stationary primary ring 229 with a porous bearing seal face 224 and a labyrinth 226 and input port 227 to create an effective hydrostatic gap using the porous media 225 as a restrictive element. In this embodiment, for example, for a double seal, a second mating ring 233 and a second primary ring face 230 are positioned opposite from the porous bearing seal face 224 of the stationary primary ring 229. Both the single and double seal bearing systems are fed external pressure and vented using the same systems and porting. The volume between the porous bearing seal face 224 and the second primary ring face 230 is vented though a port 228 to prevent pressure build-up in the volume between the faces 224, 230. Seal faces 230, 231 are similarly vented. It should be noted that some of the flow exiting the seal gap 224 will flow to the process side. The amount is dependent on pressure difference between the pressurized volume and the vent pressure. For example, if the volume 234 is pressurized to 1000 PSI and the vent 228 is at ambient pressure flow most of the flow will be out of the vent rather than into the process. The input pressure to the porous media 225 should be 4 to 6 bar above the pressure it is sealing against, for example, 1060 to 1090 PSI. It is possible to regulate a cascading lower pressure to each of the successive faces so that the pressure is dropped down over stages. If each stage has a 1000 PSI pressure drop, the seal could effectively seal 3000 PSI.

The air bearing sealing gaps between the faces of the porous bearings on the stationary primary ring 229 in the inside facing surfaces of mating rings 223, 233 is fixed at assembly. Axial displacement of the shaft relative to the seal cartridge allows the mating ring sleeve to move on the shaft during "hang-ups" of the mating rings 223, 233 so that the bearing faces are not materially damaged. In one embodiment, a porous carbon bearing face runs on the opposite side of the mating ring 223 in the space 234 between the porous bearing seal face 224 and the second primary ring face 230, as shown in illustration 600.

Figures 1, 2C:
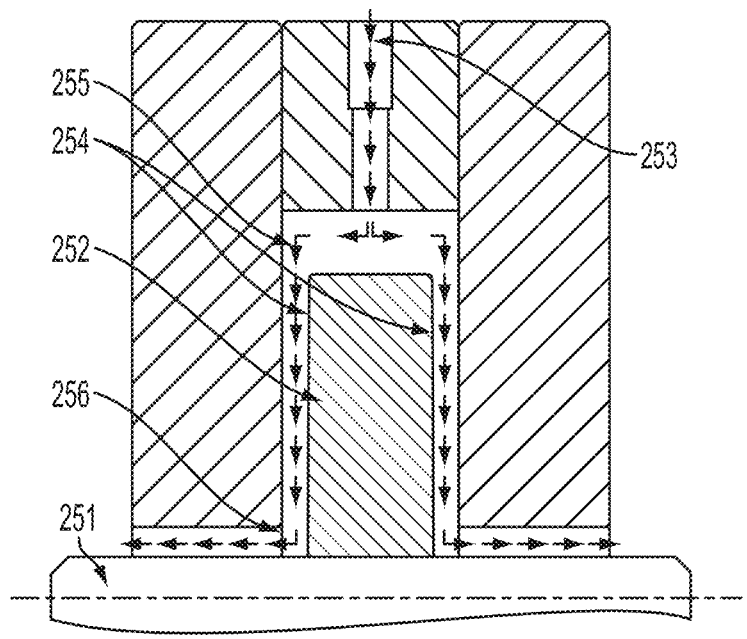
FIG. 2C-1-2C-4 is a porous versus hydrodynamic gas seals.

As illustrated in FIG. 2C-1, a seal gas flows into a gap from an outside edge 255 across the gap and exits at a lower pressure edge 256. The seal gas is introduced into a port 253 at a higher pressure than a process gas. The runner 252 rotates at a high speed with the shaft 251. Aerodynamic features 254 etched into the faces of the runner 252 establish an air bearing film on each side of the runner.

Figures 2, 2C:
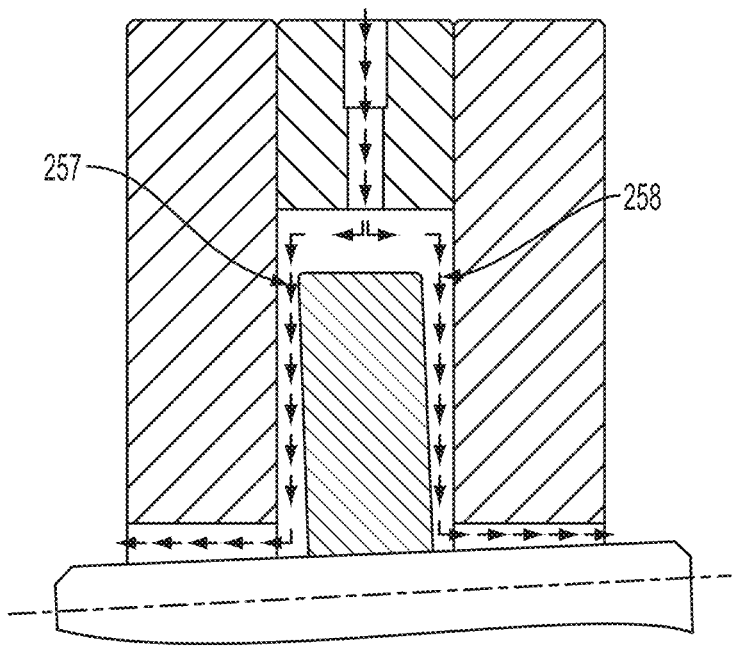

As illustrated in FIG. 2C-2, an axial or angular change in the shaft results in a smaller gap on one side 257 and larger gap on the other side 258. This results in restricted flow of seal gas and reduced pressure to the side with the smaller gap 257 causing instability.

Figures 2, 2C, 3:
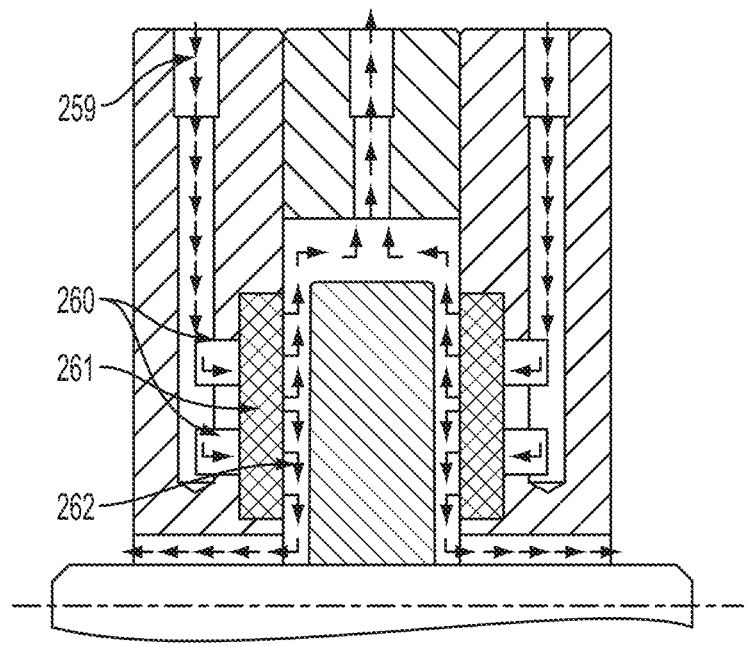

As illustrated in FIG. 2C-3, a high pressure gas is introduced through a port 259 into a plenum 260. The plenum 260 supplies the high pressure gas to the porous media 261 which restricts the flow of the high pressure gas into the bearing gap 262. There are no features etched in the runner 263. The bearing pressure in the gap at the runner 263 automatically increases when a similar axial or angular change in the position of the runner 263 towards one of the bearing faces occurs. The bearing pressure in the gap continues to increase until the runner actually makes contact with one of the bearing faces at which point the pressure attempting to exit the porous media will approach the input pressure. The relative force between the runner and the bearing face is mitigated by the pressure attempting to exit the bearing face at the runner 263. The opposite side 264 of the runner has a lower pressure since the gap is larger and the restriction comes from the porous media instead of the edge of the gap. This results in a naturally stable situation where the side with the smaller gap builds a higher pressure and the side with the larger gap has a relatively lower pressure. In the aerodynamics seals illustrated in FIGS. 2C-1 and 2C-2 the reverse is the case.

Figures 2, 2C, 3, 4:
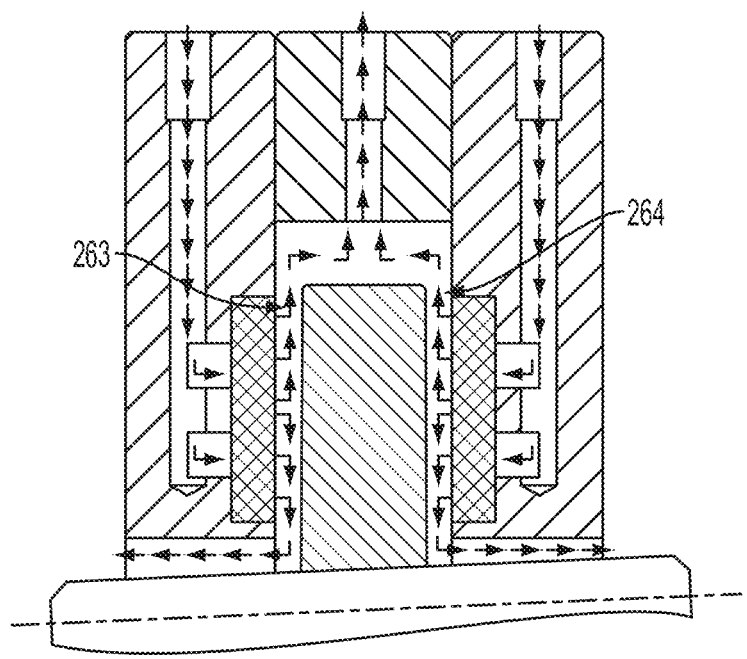
Figure 2D:
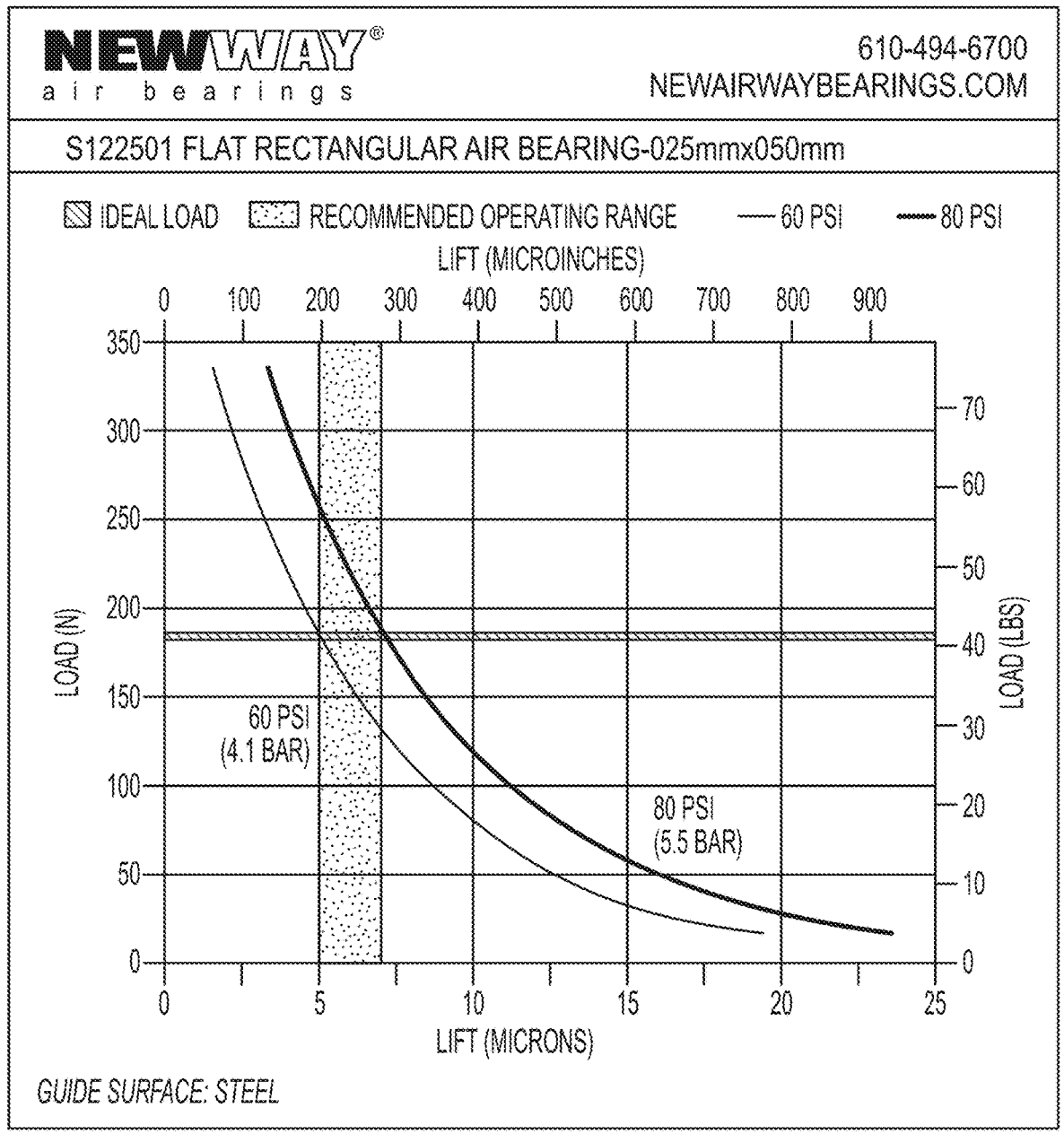
FIG. 2D is a lift load chart for porous air bearings.

As illustrated in FIG. 2D, the stiffness of an air bearing film changes with its thickness. The thickness of the air gap is directly correlated to its stiffness; a thinner air gap increases the stiffness of the air bearing film. As illustrated in the chart of FIG. 2D, the slope of the lift load curve is representative of the bearing stiffness at a given point; the horizontal line represents zero stiffness and the vertical line represents infinite stiffness. A decrease in the size of the gap makes it increasingly difficult to distribute enough air across the full surface of the bearing. In a porous bearing, the air issues from the entire face of the bearing directly into the gap and there is no difficulty in getting the air to flow across the gap. This makes the porous bearing a more robust gas bearing. It is worth noting that the flow through the gap is a cubed function of the gap; doubling the gap results in an eight fold increase in the flow.

Figure 3A:
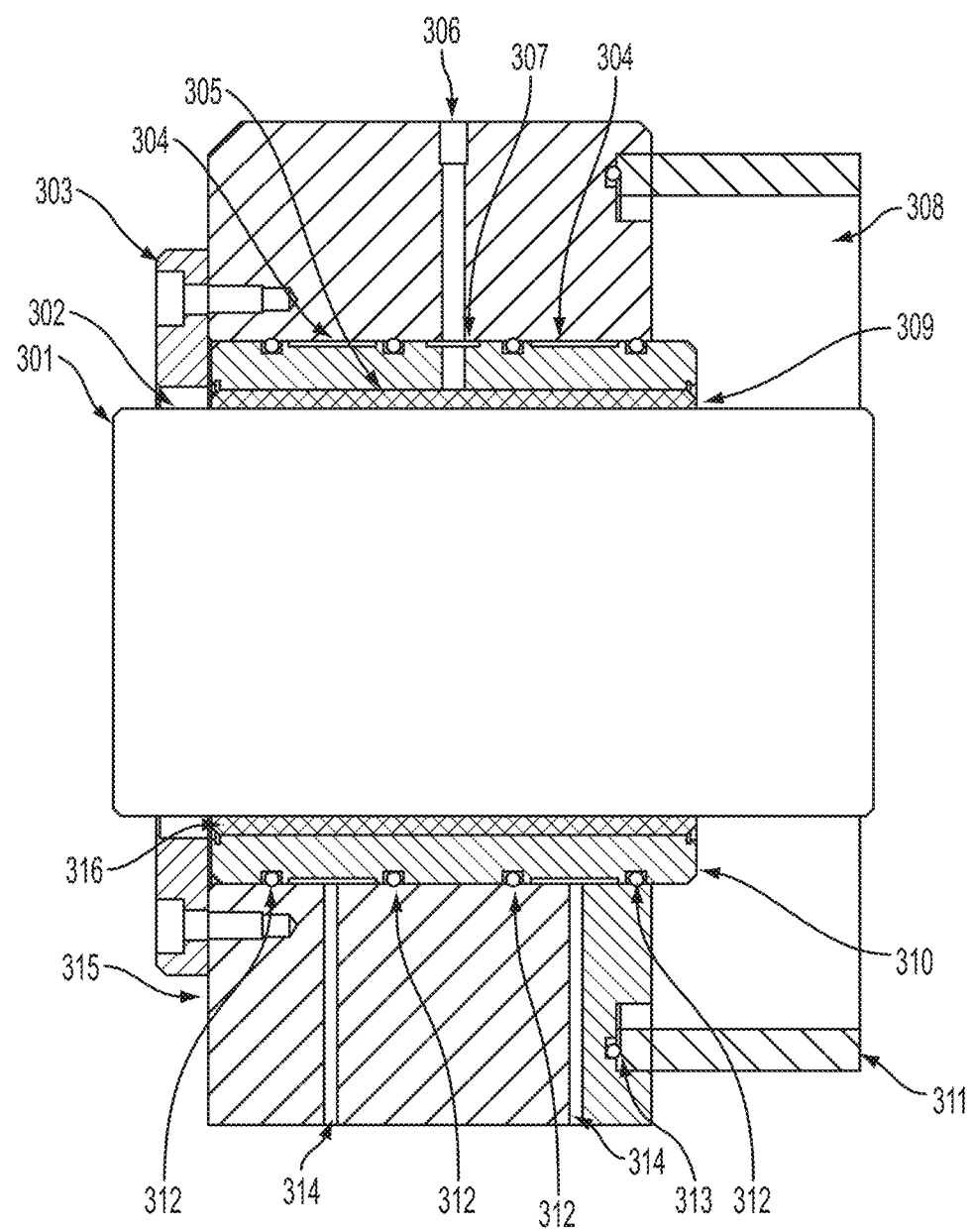
FIG. 3A is a circumferential gas bearing seal.

As illustrated in FIG. 3A, a shaft 301 that may rotate at high speeds is rotated inside of a stationary cylindrical bearing seal 310. Contamination or pressures that exist in a volume 308 are sealed and denied egress into a gap 309 by hydrostatic pressure exiting the gap 309. In one embodiment, the housing or casing 311 is equipped to receive the cylindrical air bearing seal 310 directly. In an alternative embodiment, the housing or casing 311 is equipped to receive an adapter block 315 at an interface; an O-ring 313 provides a static seal at the interface. In each of these embodiments, it is preferred to have a retainer 303 on the low pressure side of the seal; clearance 302 should be provided between the retainer 303 and the shaft. A passageway 306 supplies high pressure fluid to the cylindrical seal assembly. In one embodiment, the O-rings 312 seal the plenum 307 so that the high pressure fluid may be supplied into the cylindrical air bearing seal body 310 through a single passageway 306; the fluid is supplied into the seal body 310 without directly connecting a fitting to the seal body 310. In another embodiment, the O-rings 312 provide for radial and angular compliance so that the shaft is free to move axially on an air film. The O-rings 312 may also be used to contain epoxy, injected through a hole 314, which fills a cylindrical gap 304 between the housing or mounting block and the seal body.

The high pressure fluid entering through aperture 306 and finding its way through the hole in the seal body will be distributed axially and radially between the seal body 310 and the porous media 316 by a labyrinth 305 which may be in the porous media or the seal body. Although porous media compensation is the preferred embodiment other compensation methods are possible. Porous media air bearing compensation is only one potential solution, orifice, step, grove, inherent or pocketed compensation among other compensation techniques known in the art may be employed. Porous air bearings are known in the art and are described by the inventor in previous applications. Also, methods for providing clean fluids at pressure are well-known and readily available. The porous media 316 may be comprised of graphite, carbon, silicon carbide, alumina or basically any sintered or porous material. These materials are typically found as face seals and mechanical seals and as runners and runner faces in dry gas seals. Just instead of filling or sealing this porosity which is a common practice the porosity is used for air bearing functionality.

Figure 3B:
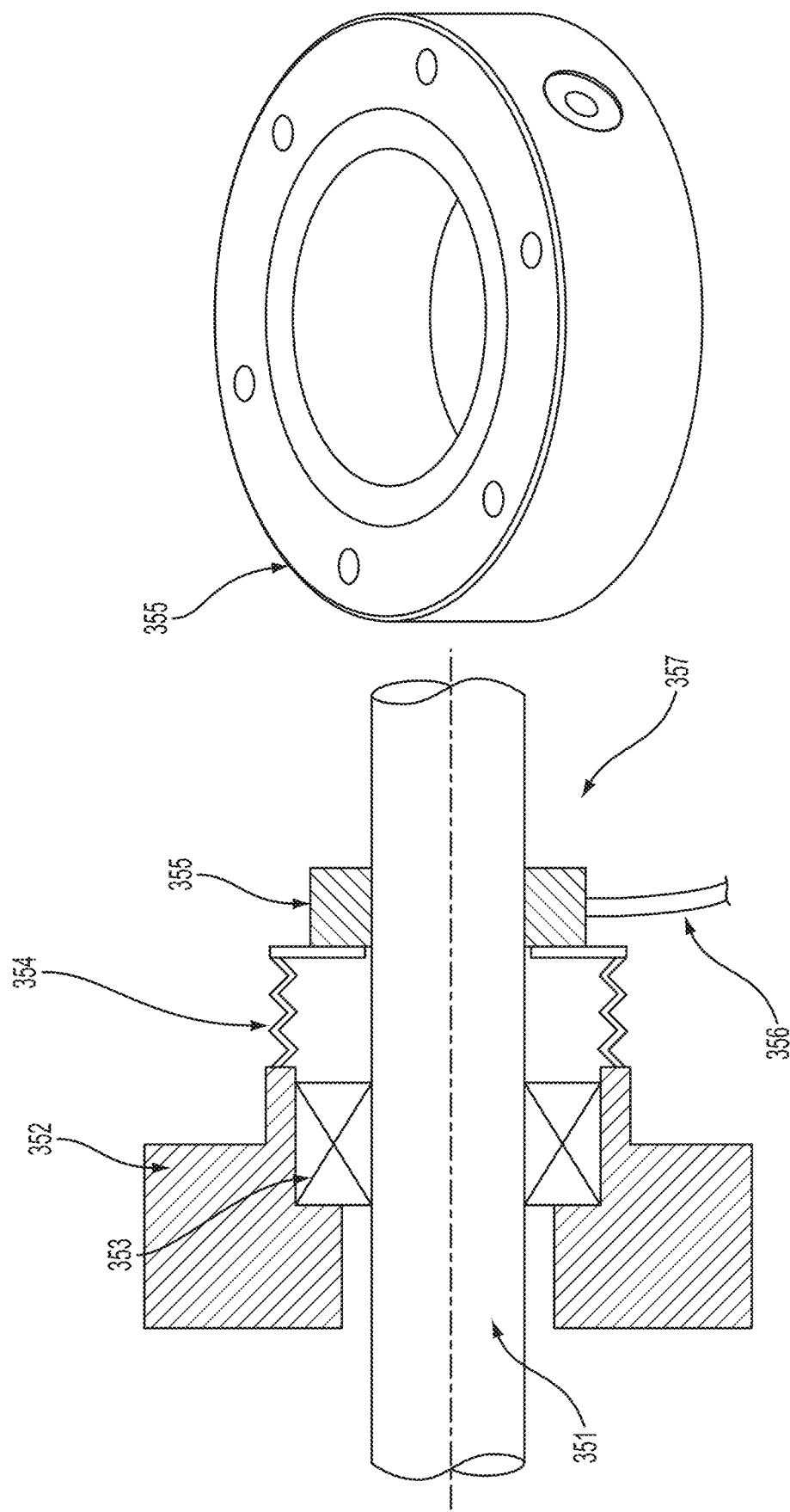
FIG. 3B is a mounting method for circumferential seal.

As illustrated in FIG. 3B, there is a shaft 351 and a housing 352 which are coupled through a bearing system 353. Being desirous to isolate the bearing from the process or environment in area 357 an aerostatic gas seal 355, consistent with the illustration in FIG. 300 (except in this example the aerostatic pressure is plumbed through a flexible tube 356) just shorter axially, is coupled to the shaft 351 through a high-pressure air film which supports the seal 355 in a noncontact fashion with respect to the shaft. So the shaft may rotate at a high rate of speed with virtually no torque transmitted to the seal because of the low shear forces in the air gap, but the seal is able to follow motions of the shaft without contact due to the radial stiffness of the air film. The mechanical bellows allows the seal to follow the shaft rather than keeping it rigidly coupled to the housing. Additional methods for providing compliance are detailed in other figures in this application.

In contrast to labyrinth seals cylindrical air bearing seals are coupled to the shaft via the stiffness of the air film. In example 350 the bushing seal is supported by the spinning shaft it is sealing on. This allows for eliminating alignment issues found in labyrinth seals. The seal is stationary with respect to the Stator and connected to it through some sort of flexible bellows arrangement 354, diaphragm or an axial O-ring as examples of compliant mounts. It would also be possible to take a circumferential seal and mount it between axial face seals as described in FIGS. 200 and 800.

Bearing isolators similar to those taught in FIGS. 2A and 3B or FIGS. 7-10 may allow for the shifting of the center of the shaft, angular excursions of the shaft and axial displacements. In some cases these bearing isolators used pressurized air or water though an uncompensated annular groove to help affect the seal. These are characterized by high flows and low pressures due to their large gaps and lack of compensation.

In FIG. 4, a shaft 401 which may rotate at high speeds has a blade runner 405 coupled to it using a mounting ring 413 which is fixed to the shaft by set screws 403 and or a shoulder. An O-ring 410 may be employed to seal clearance at 402. There are two illustrations in FIG. 4; in view A the blade 405 is not up against the porous seal bearing face and the gap 406 allows for a view of the blade runner 405, in view B, the blade runner is in place and the gap 406 between it and the porous face 412 is as it would be in operation, less than 25 microns. The blade itself may be coupled directly to the shoulder if the shaft is so equipped with a shoulder (a shoulder would be the axial face created by a step in the diameter). The blade runner is characterized by being thin axially and so differentiated from conventional runners. The blade may be any thickness but likely between 0.1 and 1 mm thick. This blade runner has the advantage of being light weight and so it has a minimal effect on the moment of inertia of the shaft and on potential imbalances caused by the runner. Because the pressure to be sealed in volume 404 is the same everywhere in the volume it acts uniformly on the back of the blade flexure, urging it against the air bearing seal face with constant per-unit area force. For this reason it is not necessary to have a heavy rigid runner connected to the shaft. The gap 406 will vary but a force equal to and opposite forces existing in volume 404 will be generated in the air gap. This embodiment may be well suited for replacing brush type seals especially in turbines designed as aero engines. As it would seal more effectively, have zero or at lease relatively low friction or ware and occupy significantly less space axially.

High pressure gas some bars higher than what exists in volume 404 is introduced into port 408, which conducts the pressure to the Plenum 409, which distributes the air pressure uniformly to the backside of the porous media 412 which will create a pressure in the gap 406 at its face and between the runner 405

The volume 404 represents a volume on one side of the seal, this could be a gearbox, a motor-generator housing, or a process fluid or gas such as a mixer, refiner, water pump or gas pipeline, or a seal between compartments, impellers or stages in a piece of rotating equipment like a compressor as examples. 414 would represent the casing or the housing. There may or may not be an adapter plate as shown in FIG. 200 number 205. The seal body itself 411 would likely mount to the housing casing or adapter plate with an O-ring seal 407. The seal body in illustration 100 refers to a seal that would be lightly loaded, it should be recognized that the seal body and its mounting maybe designed to be stiff enough so that it does not deform significantly under the pressure differentials that are being sealed. Alternatively it may be designed so that it does flex and so may flex to cooperate with the conformable nature of the Blade Runner which is essentially a flat spring steel flexure.

Figure 5A:
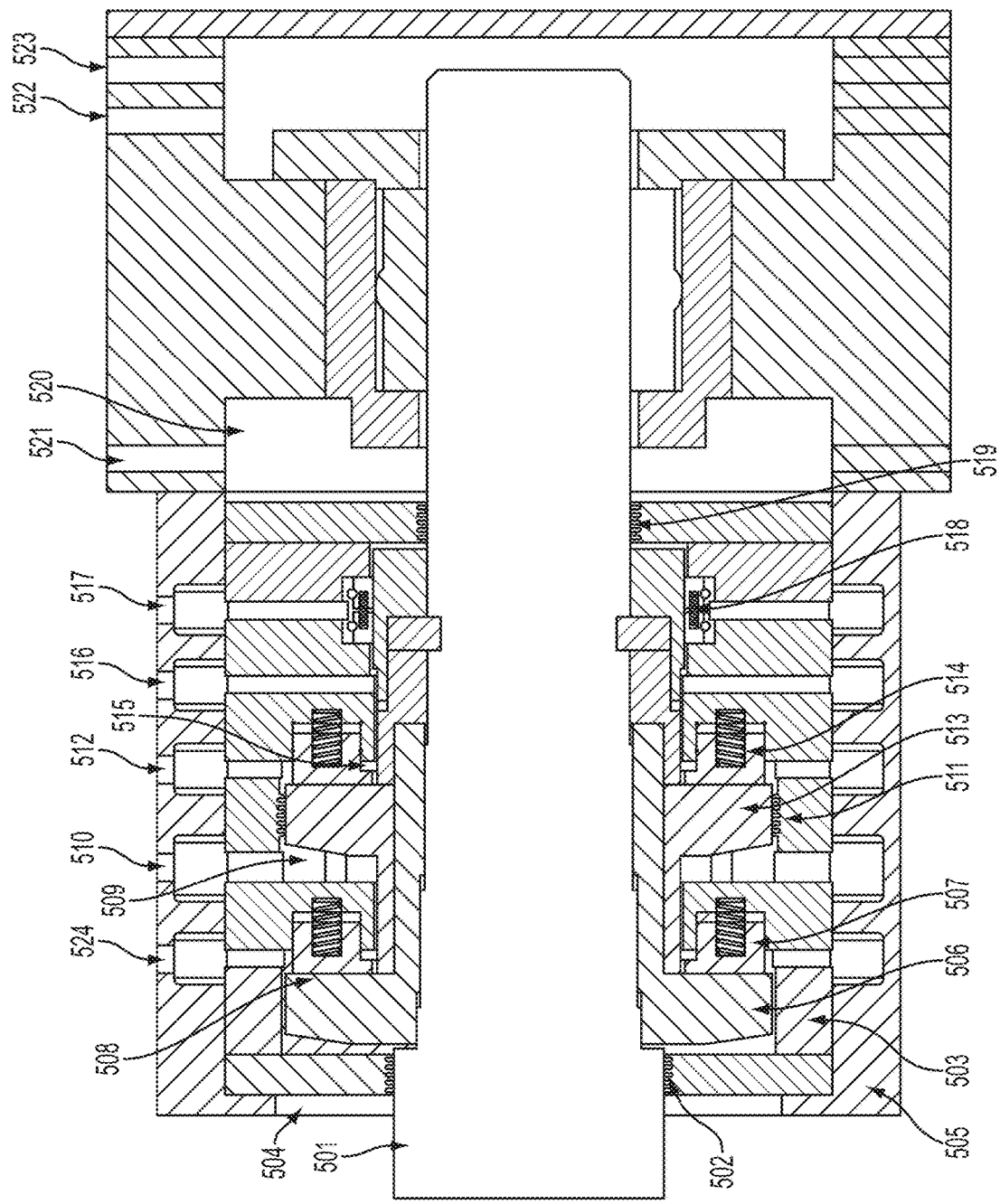
FIG. 5A is a prior art detailed description.

As illustrated in FIG. 5A, a conventional centrifugal compressor employs a sealing and bearing system described here (but this is descriptive of many other potential applications in rotating equipment); shaft 501 comes from the compressor camber 504 though a labyrinth seal 502, into the seal cartridge 503 which fits into the seal chamber within the compressor casing 505. Then a face or dry-gas seal affected between the primary ring 507 and mating ring 506, which we will refer to as the primary seal 508. Between the labyrinth 502 and the primary seal 508 a buffer/flush gas is introduced though port 524, most of this gas flows back to the process side as the labyrinth seal has a high degree of flow even with only a bar's worth of pressure difference. This buffer gas is important to keep the primary seal gap clean. Some of the gas flows across the mechanical face or aerodynamic primary seal 508 and into the Plenum 509, finally exiting through vent 510. Then there is a seal gas or inert gas introduced through port 512, as before most of this flows through labyrinth seal 511 and out vent 510. Some of this gas does flow through the secondary seal made up of the mating ring 513 and primary ring 514. This is because the pressure being introduced at 512 is higher than the pressure in the volume 515. This flow is exhausted through vent 516. Then there is a separation gas introduced through port 517 which flows through the separation seal 518. Some of that flow migrates into volume 515 and vents through 516 and some of that flow makes its way through labyrinth seal 519 (if so equipped) and into the bearing chamber 520. So we have process and buffer gas flowing out of vent 510 and this is mixed with seal or inert gas that was introduced through 512. This needs to be reprocessed or sent to flare. The gas flowing across the secondary seal and into volume 515 mixes with the separation gas being introduced through 517 and then exits out of vent 516 and also needs to be sent to flare or otherwise processed or reported as an emission. Additionally separation gas flowing into the bearing chamber 520 will find its way out vent 521 and becomes yet another environmental headache. The bearing chamber has oil pumped in at pressure through port 522, the oil then needs to be drained out through port 523 (that may be positioned at the bottom) filtered and cooled to control its viscosity which important because it is very temperature sensitive. With all of those tubes coming and going from each end of the compressor, more than one operator thought he was looking upon Medusa.

Figure 5B:
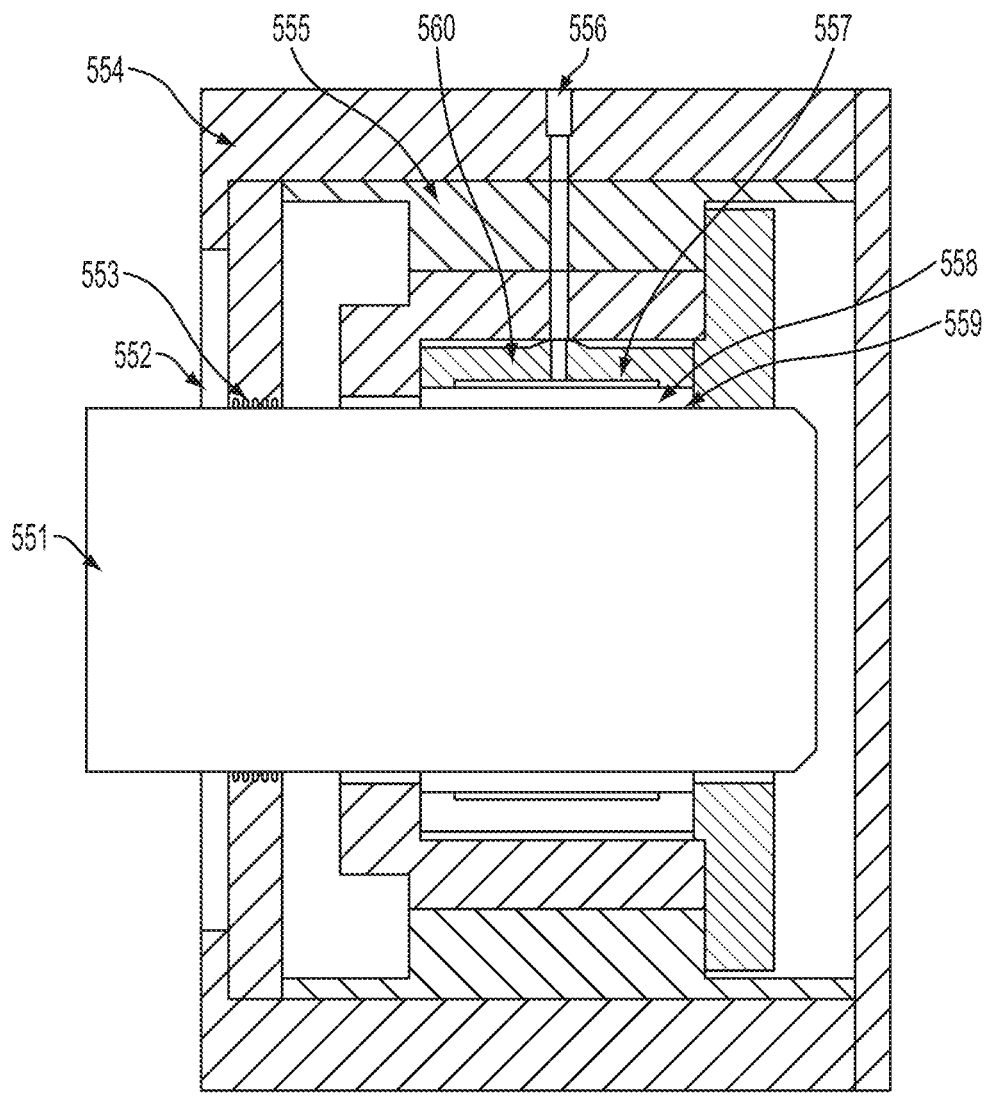
FIG. 5B is a gas bearing that eliminates the seals.

As illustrated in FIG. 5B, the services, complications and environmental headaches listed above are eliminated by the following novel teachings. With reference to FIG. 550 please notice that oil has been removed as a lubricating medium for the bearings supporting the compressor shaft. Instead gas bearings operating on the gas being compressed in the compressor are used to create an aerostatic air bearing support 560 for the shaft 551. The bearing cartridge 555 and the bearing chamber and or seal chamber in the compressor casing 554 may change in new designs to take advantage of the much more compact design that is possible, but this is not necessary as the gas bearing cartridge can fit in the same space that the oil bearing cartridge fits into.

The preferred embodiment is to use a porous media restriction 558 at the face of tilting pad externally pressurized air bearings 560. These bearings can be fed using the same buffer gas that had been employed in the prior art but this buffer gas is instead pumped into the externally pressurized air bearings 560. The bearings require a higher pressure differential, likely in the range of 4 to 20 bar above the pressure on the other side of labyrinth seal in volume 552, but the volume of this buffer gas flow, that is now bearing gas, is dramatically less than was required of buffer gas in the prior art, likely less than one cubic foot per minute per bearing. The buffer gas may be taken from the high-pressure side of the pump, or the suction side, conducted through filters or dryers, compressed if taken from the suction side, and then introduced through port 556, into the bearing 560, distributed to the labyrinth 557 restricted by the porous media 558 and then finally exiting under pressure through the final bearing restriction, gap 559. After the gas has exited the bearing gap 559 it acts to raise the pressure in the bearing compartment slightly as the used gas will flow back into the process through the labyrinth seal 553 or some other ring or separation seal that may be used in that location.

In the case that vents are eliminated, there is no reason to have a process flow into the bearing chamber because there is nowhere for it to go. This eliminates having to flare or report vents to atmosphere, and is a huge environmental advantage. And as there is only one gas to deal with, services are dramatically simplified, improvements in maintenance costs and downtime and the reduction in capital costs as seal services capital cost can be a multiple of the cost of the seal. Safety is also improved, as the elimination of venting also eliminates the possibility of entraining oxygen into flammable gases being compressed or allowing dangerous gases to escape.

Rotor dynamics are dramatically improved by the use of this invention, the length of shaft that had previously been consumed by seals may be eliminated, dramatically stiffening the shaft 551. The diameter of the shaft can be increased due to the higher speed capability of the gas bearings again stiffening the shaft and providing more area for squeeze film damping in the gas bearing.

The environmental problems and mess associated with oil are eliminated, there are no more oil leaks. No oil can make it to a face or dry gas seal and carbonize. Oil no longer controls the temperature which the bearing compartment can operate at. Gas bearings may operate at the most extreme temperature ranges, from cryogenic to supper heated steam. It is noted here that conventional techniques for gluing porous media 558 to the stainless steel or aluminum bearing housings 560 is not appropriate for extreme temperatures.

The compressor or also in the case of a gas turbine or large generator will have the rotor supported on a frictionless gas film even at zero RPM. This reduces the risk at startup and shutdown, allows for slow roll and standby operations without danger of seal hang-ups or bearing damage and enabling frictionless startups and shutdowns.

Because of the excellent aerodynamic properties available from the smooth porous face, external pressure to the bearing maybe often turned off once the compressor or turbo machinery is at sufficient speed, as at that point the shaft will be supported on aerodynamic effects. So the auxiliary compressor (if so equipped) may be run only at startup and shutdown, or slow roll conditions. If this auxiliary compressor failed during operation it would not affect the operation of the main compressor and the rotor could spin to a stop in a loss of pressure without damage due to the excellent tribological properties of the steel shaft on a carbon graphite bearing face. Additionally the technology is appropriate for canned compressors targeted towards subsea compression as the bearings can take their pressure from the high pressure side of the pump and have acceptable life as plain bearings in the start stop cycles. This is a much simpler and more compact way of eliminating oil than magnetic bearings.

But without sealing—and without venting—the bearings operate under extreme pressures. If the suction pressure of the pump is 100 bar, and the output side of the compressor was 200 bar, then the bearings could be fed at 106 bar and the flow through these bearings becomes the buffer gas. Bearings that operate in a 100 bar environment, actually only see a 6 bar pressure difference.

Figure 6A:
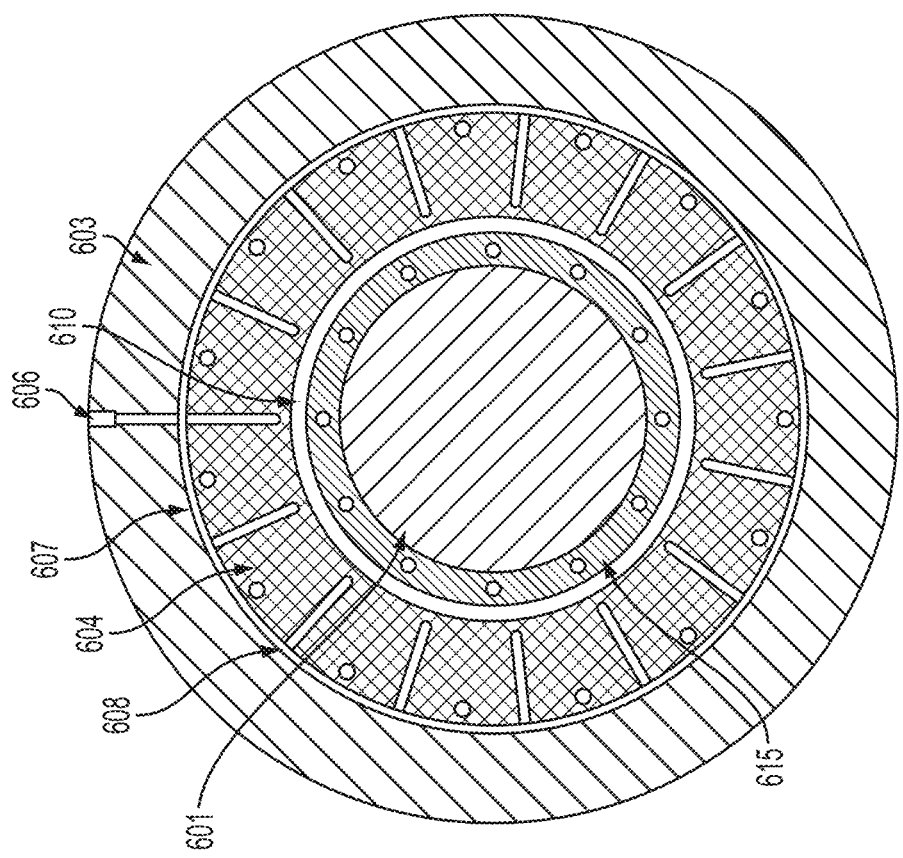
FIG. 6A is a multi-blade seal.
Figure 6A:
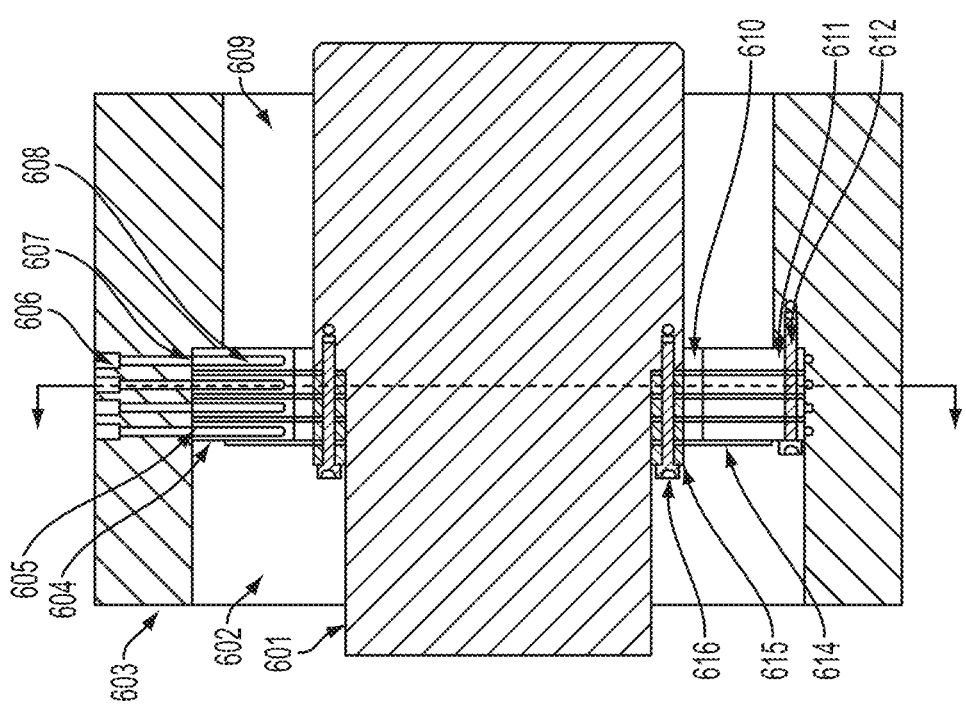
Figure 6B:
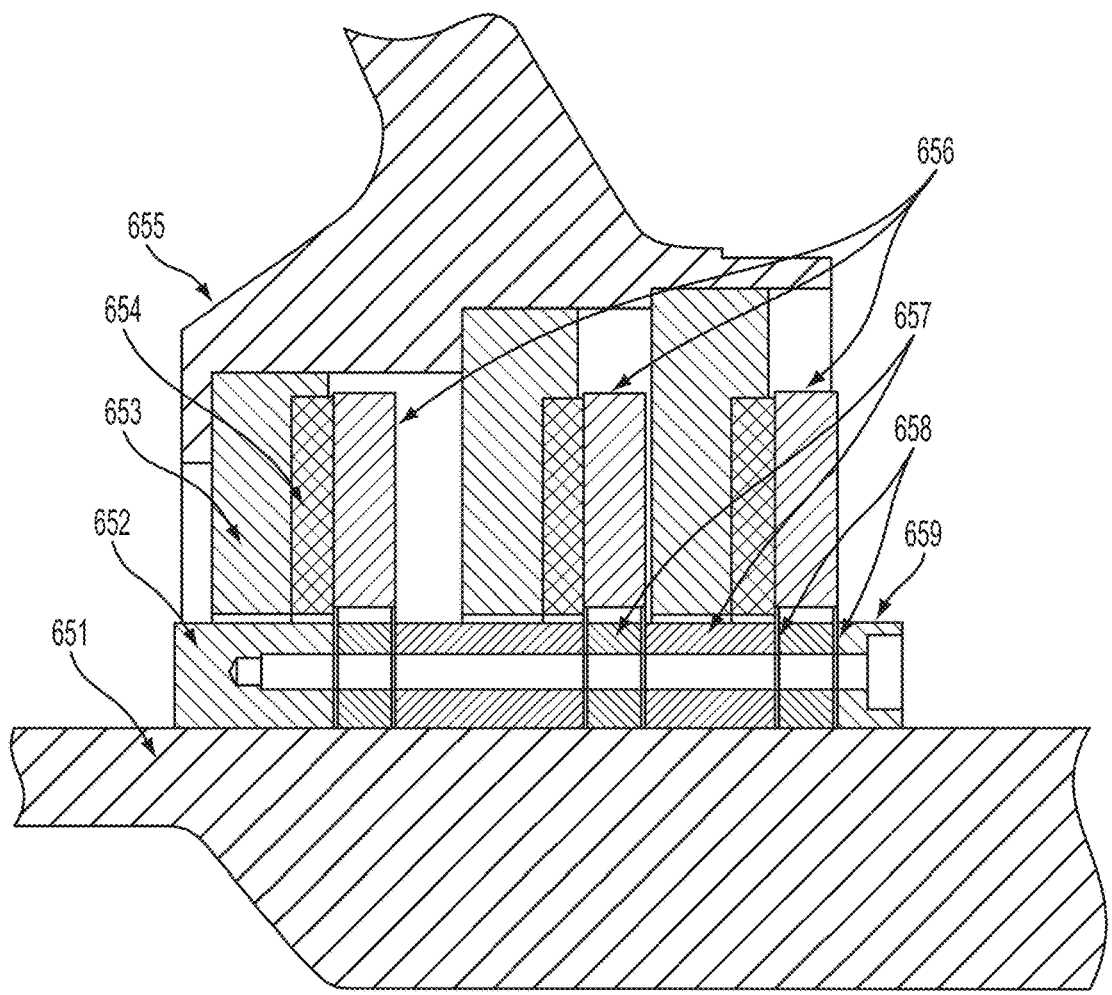
FIG. 6B is a parallel flexure, aero engines.

As illustrated in FIG. 6A, a shaft 601 which may be turning at a high velocity has connected to it multiple thin blades as described in FIG. 400 above. These blades 614 are fixed to the shaft 601 via a shoulder and bolt 616 and are separated from one another by precision spacing rings 615. The porous bearing seals 604 are connected to the Stator 603 via a shoulder and bolt 612. The porous bearing seals 604 are also separated by precision spacers 605 approximately the same size or slightly thicker, but preferably not more than 10 µthicker, than the Blade Runners. There is clearance 610 between the inside diameter of the porous bearing seals and the outside diameter of the shaft. There is complementary clearance 611 between the outside diameter of the Blade runners and the inside diameter of the Stator. This clearance provides for radial motion of the shaft. If there exists a pressure differential between volume 602 and volume 609, for instance a higher pressure in volume 602, that pressure will act against the first blade runner urging it against the first porous bearing seal. But because higher pressure is being introduced through ports 606 and this pressure is conducted circumferentially by groove 607 and then radially through the porous bearing seal by radial hole 608. This pressure then conducts through the porous media and the face between the blade and the bearing creating a separating force that is also a seal.

Regarding illustration 6B; this embodiment is likely pertinent to aero engines as may be found on jet airplanes and or gas turbines that are employing brush or centrifugal seals. These contact type seals are a maintenance issue, they create friction and heat which cause efficiency losses and they are noisy. These issues are in large part solved by employing porous carbon air bearing technology. Bearing technology is taught in multiple other locations within the specification. The specific arrangement has a turbine shaft 651 fitted with a mechanism to retain runners which are flexure mounted to the shaft using parallel flexure technology. These runners 656 cooperate with a stationary air bearing seal 653 which in this preferred embodiment uses porous media compensation 654. The stationary part of the seal is mounted to the engine/compressor/generator housing 655 using conventional techniques similar to what would have been employed to mount the stationary section of the friction based seal. Spacers 657 are used to approximately locate the runners axially with the stationary parts of the seal add key off of 652 that is connected to the shaft and secured by 659. Parallel flexures 658 allow the runner to translate axially with respect to the shaft, which will happen for instance under the acceleration of take off, and yet remain parallel to the face of the stationary part of the seal.

Figure 6C:
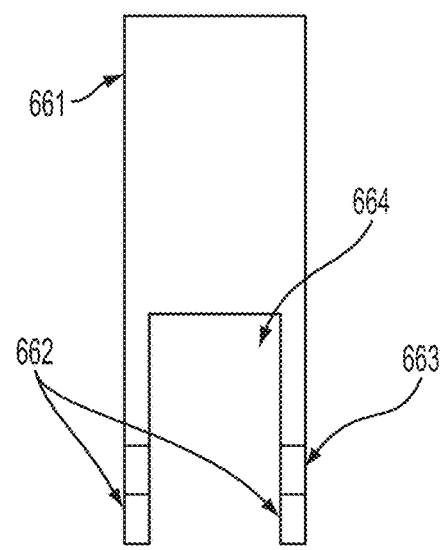
FIG. 6C is a close-up of parallel flexure.

As illustrated in FIG. 6C, a close-up of the flexure seal runner shows the bearing face 661, the flexure components 662, one of the through holes for mounting 663 and the area 664 which was either machined, ground or EDM away from a solid stainless steel blank. There may be other ways to manufacture a flexure-based runner.

As illustrated in FIGS. 7A-7B, a shaft 701 of a piece of equipment that is carrying with it a runner 711 that has a spherical outside diameter. The runner with a spherical OD couples to the shaft through two O-rings 702. This is advantageous because many shafts have experienced damage and/or out of round at their ends, keyways will often have raised edges, these high spots can damage a precision air bearing/sealing surface while being slid over these damaged features and into position. O-rings can tolerate these types of high spots due to their resiliency. Another advantage is that it reduces tolerance concerns for the fit at 705. This may not be an issue if a cartridge seal employing this technology is associated with an accompanying sleeve for the shaft that goes with the cartridge seal. The OD of the spherical runner mates to complementarily shaped spherical air bearings, which in the preferred embodiment would be porous media restricted. Spherical air bearings are mounted in yoke 712 which is split vertically, split not shown, and air is fed in to the back of the porous restrictive elements 703 through air input port 706 and distribution labyrinth 704. Using this technique as taught will provide for an air gap with several bar's pressure between the porous carbon restrictive element 703 the OD of the spherical runner 711. This air film provides for a frictionless and ware free way of providing angular freedom to the shaft and avoiding over constraint from angular changes in the shaft as indicated by 713, 707 and 710. 709 provides a vent in between the two spherical bearings, this avoids a pressure buildup between the two bearing elements and so the bearings see more pressure drop and their performance increased.

As illustrated in FIG. 7C, the porous media restrictive element 751 is shrunk fit in to the nonporous housing 752 which may be made of aluminum or steel or stainless steel or some other suitable material. A plenum 753 comprising approximately 50% of the surface area between the housing and the porous media and having a conductance at least 10 times that of the free flow through the porous media may be disposed on the ID of the housing or the OD of the porous media or some of both. An air feed hole 754 to the plenum provides air flow to the plenum and then through the porous media and into the bearing gap. The air bearing gap provides an axial degree of freedom, but as noted above in areas where a precision shaft is not available, O-rings or a sleeve for the shaft that comes with the seal cartridge may be used. It should be noted that in an embodiment the shaft may spin within journal gas bearing as well still leaving axial shaft freedom.

Figure 8A:
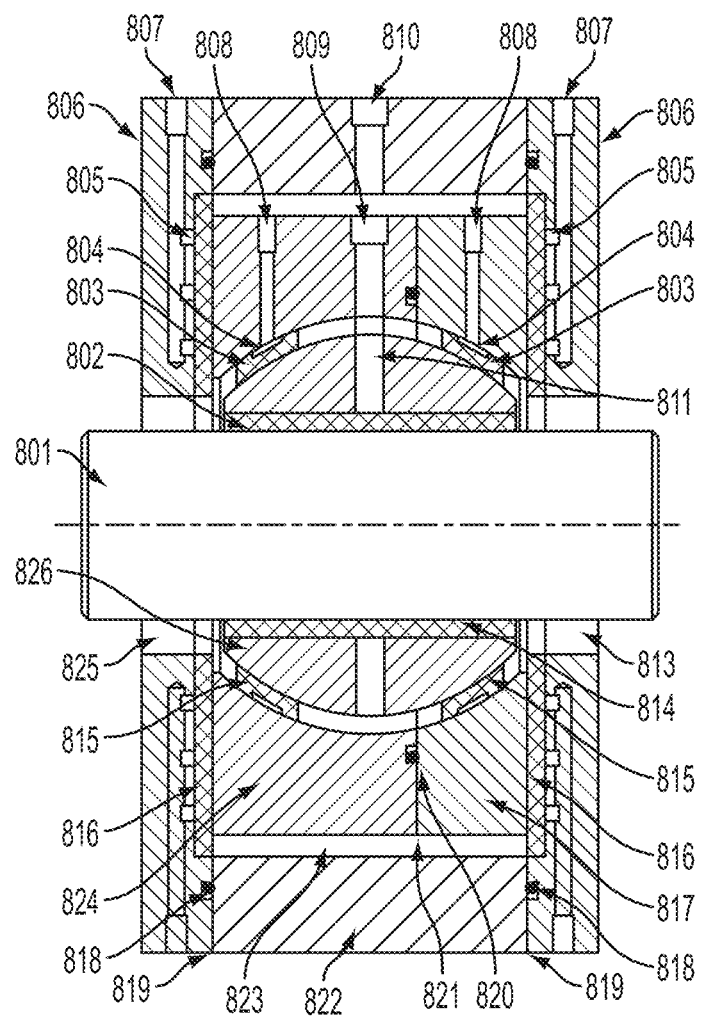
FIG. 8A-8B is an axial, angular, radial unvented seal compliance.
Figure 8B:
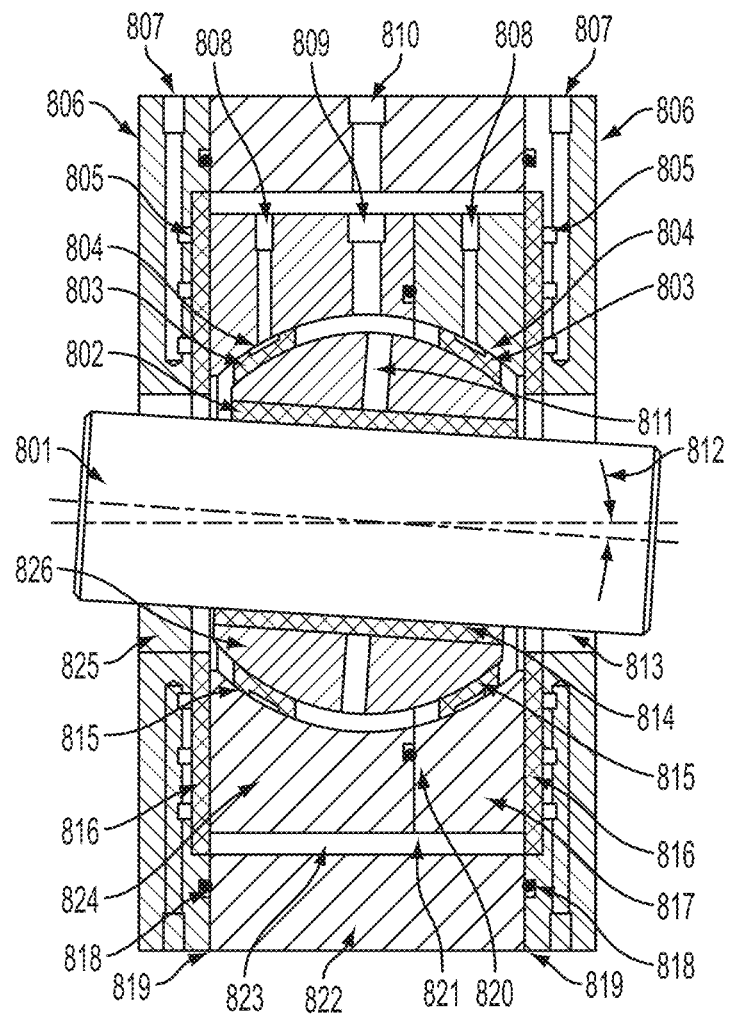
Figure 9A:
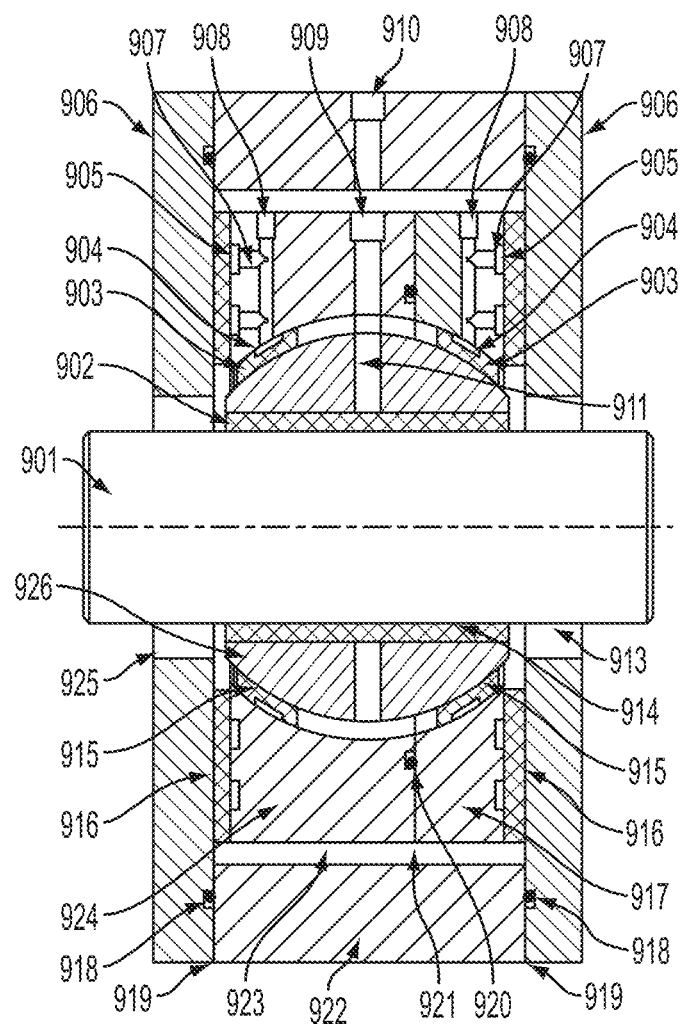
FIG. 9A-9B is an axial angular radial single source.
Figure 9B:
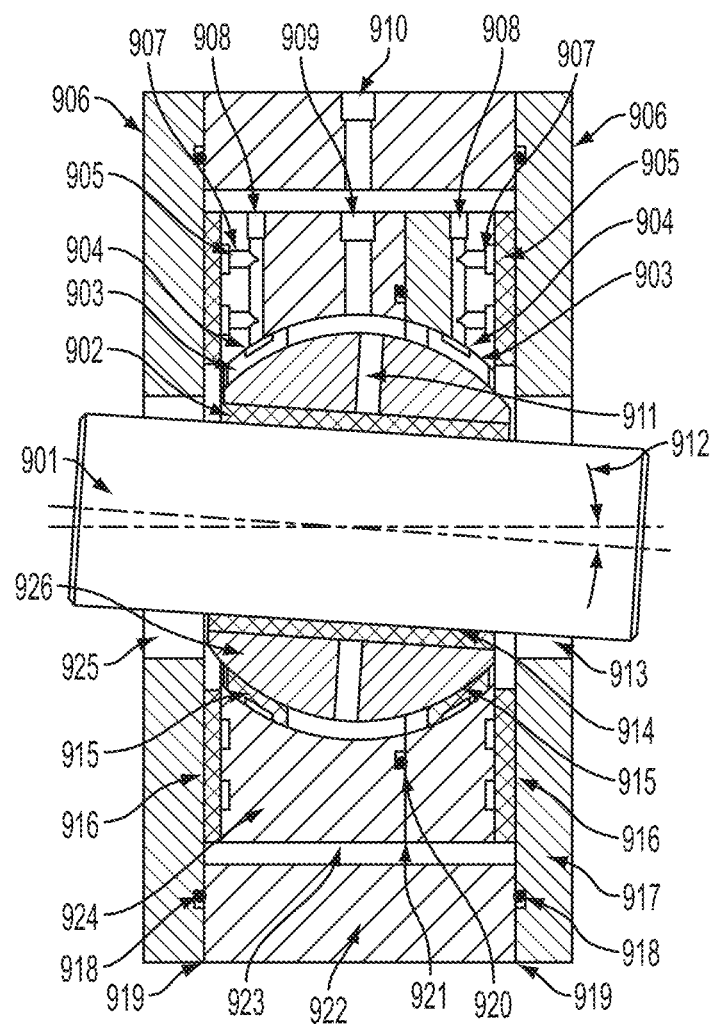

As illustrated in FIGS. 8A-8B, freedom for frictionless radial displacements of the shaft is provided. This is accomplished by taking the yoke 824 and 817 and suspending it between thrust faces. The yoke 824 is keyed with an anti-rotation to pin (not shown) to keep it from rotating with the shaft. This anti-rotation pin is provided with enough clearance that allows free motion of the components over the limited range compliance is intended. This yoke is split at 821 and O-ring seal 820 is employed. A thrust plate or collar 806 of appropriate strength for the application is provided with porting 807 and plenum 805 for distributing the air pressure to the back of the porous media 816. The thrust collars 806 may be sealed at joint 819 by an O-ring in a groove such as 818. The spherical gas bearings have a plenum 804 and air input port 808 and a restrictive porous element 803. In this embodiment, there is no vent between the spherical bearings, instead the high pressure developed in this region is used to conduct pressure through to the Journal bearing in a non-contact fashion. External pressurization ported through 810 in stationary housing 822 then to the Plenum area 823, which is sealed at each side by the thrust bearings, and then through port 809 into the area between the spherical bearings where it can pass in a noncontact fashion through port 811 Into Plenum as described in 753, then through the restrictive element 802 into the gap between the rotor of the restrictive element bearing face at 814.

This embodiment provides for axial freedom of the shaft, angular freedom of the shaft, and radial displacements of the shaft in a frictionless manner using bearings which are also seals in all motion locations.

The shaft 801 may spin and move axially within the bearing element 802 and the runner 826. The runner is not coupled to anything except through air bearing films and so it may rotate also. This would allow them to share the speed of the shaft, so for a shaft spinning at 20,000 RPMs 10,000 RPMs could be taken by the Journal bearing 814 if the runner were spinning at 10,000 RPMs and the other 10,000 RPMs could be taken between the spherical bearings 803, 815 and the runner 826.

The difference between FIGS. 8A and 8B and FIGS. 9A and 9B is that porting for the opposed axial air bearings which provide friction free radial motion for the shaft have had the porting 908 and the Plenum 905 moved internal to the yoke 924 from the thrust plates 906 where they were in FIG. 800. This simplifies the manufacturing of the thrust plates 906 and allows them to retain a higher stiffness for their given axial thickness, because the yoke is seeing a compressive load in what amounts to column stiffness where the thrust cap sees a cantilevered bending stiffness which is not as strong. It should be noted that in each of the bearing arrangements in FIG. 800 and FIG. 900 that the interface between the porous media gas bearing surface and the guide way it acts upon 916, 915 and 914 only one side of the bearing elements are open to ambient pressure, this reduces the effect of the externally pressurized air bearings but the bearings do retain significant load capacities.

Figure 10A:
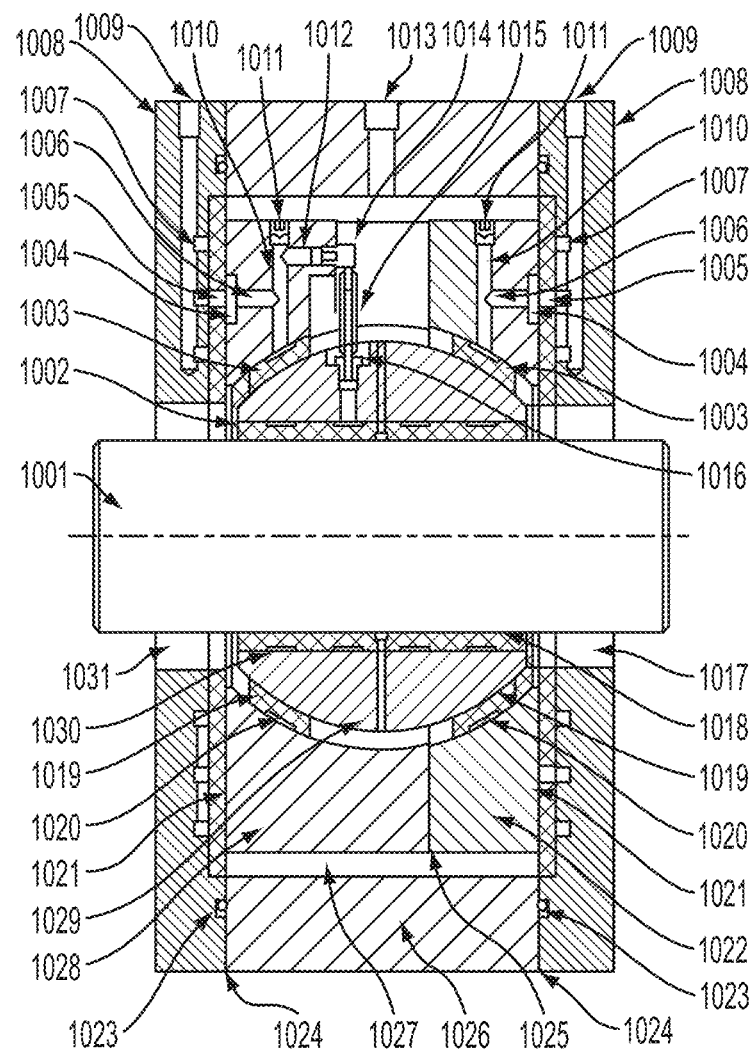
FIG. 10 is an axial angular radial vented.
Figure 10B:
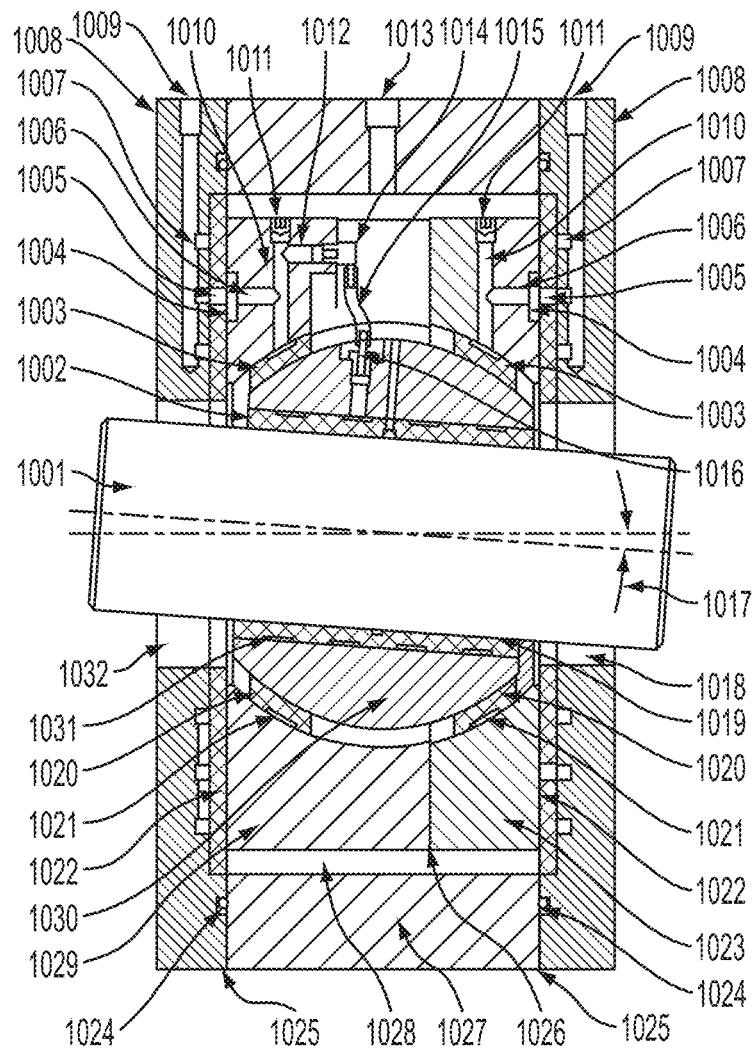

The difference between FIGS. 8A-9B and FIG. 10 is that FIG. 10 is fully vented, that is all of the gas bearings see the full pressure drop between the external input pressure and ambient or a process pressures that exist at the escape edges of the bearings. So the external pressure is ported into the thrust plates 1008 via 1009 and distributed behind the porous media restrictive element by Plenum 1007. Additionally a through hole 1005 has been drilled through the porous media and directly in to the Plenum 1007. This whole aligns roughly with a hole in the yoke 1006, which has a counter bore 1004 that maintains conductance between 1005 and 1006 during the designed displacements of this compliance device. It stays aligned due to the anti-rotation pin discussed in FIG. 800. Hole 1006 provides conductance of pressure to both the spherical bearing element 1003 and the Journal porous bearing element 1002 via the cross hole 1010 drilled in the yoke 1028 which is later plugged 1011. 1010 delivers the pressure and flow to the Plenum 1020 providing the external pressurization for the spherical restrictive elements/bearings 1020. Cross hole 1010 also communicates with hole 1012 which is threaded to accept a fitting, the fitting is connected to a flexible tube which provides motion compliance in the conductance of pressure to be spherical runner which is now also keyed to the yoke to provide anti-rotation relative to the yoke. The pressure and flow for the journal restrictive element 1002 are provided through the fittings 1014, 1016 via the tube 1015 and into Plenum 1030.

An annular groove in the center of the Journal gas bearing portion provides even communication of the bearing/seal flow to a center vent hole. This is the radial hole in the spherical runner 1028 and is shown next to fitting 1016. This whole exhausts in the space between the spherical bearings and both of these bearings are able to exhausts through the hole that the fittings 1014, 1016 and tube 1015 partially consume. Hole 1013 through housing 1026 provides the exhaust for these flows plus flow from the opposed axial faces 1021.

Figure 11A:
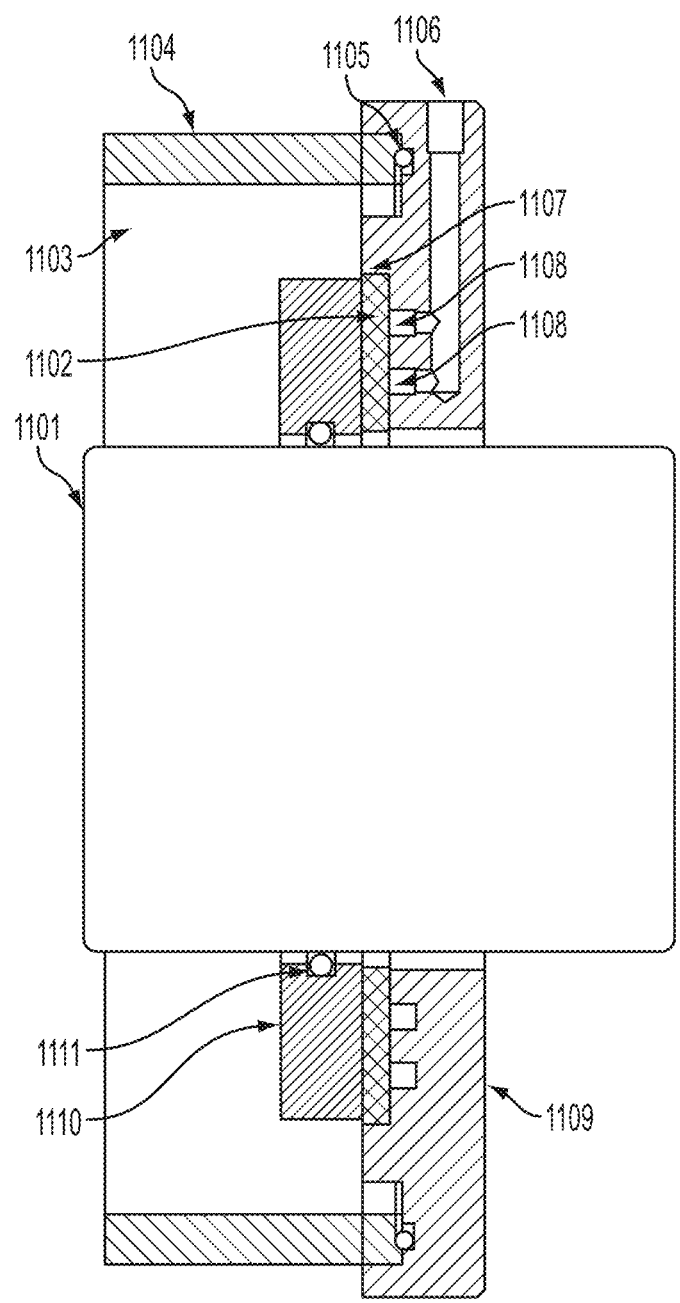
FIG. 11A is a balanced force bearing.

In order to effect a seal, as shown in FIG. 11A, a porous material 1102 which comprises one side of two opposing surfaces is used to evenly distribute hydraulic pressure from an external source of pressurized fluid between the two surfaces. The pressure is ported through 1106 to Plenum 1108 then through the porous media 1102 and into the gap 1107. This hydrostatic pressure creates a force which is opposite the forces from pressure differences or Springs trying to close the two faces together, the other face being the bearing seal side of 1110. Also see FIG. 100 for teaching regarding this illustration 1100. This hydrostatic pressure may be adjusted to the point where the two faces are completely unloaded and zero contact pressure exists between the two faces even though the faces are in intimate contact 1107. Because the faces are in contact there is approximately zero flow through the gap and the line pressure being fed into the porous material will exist between the two faces.

Figure 11B:
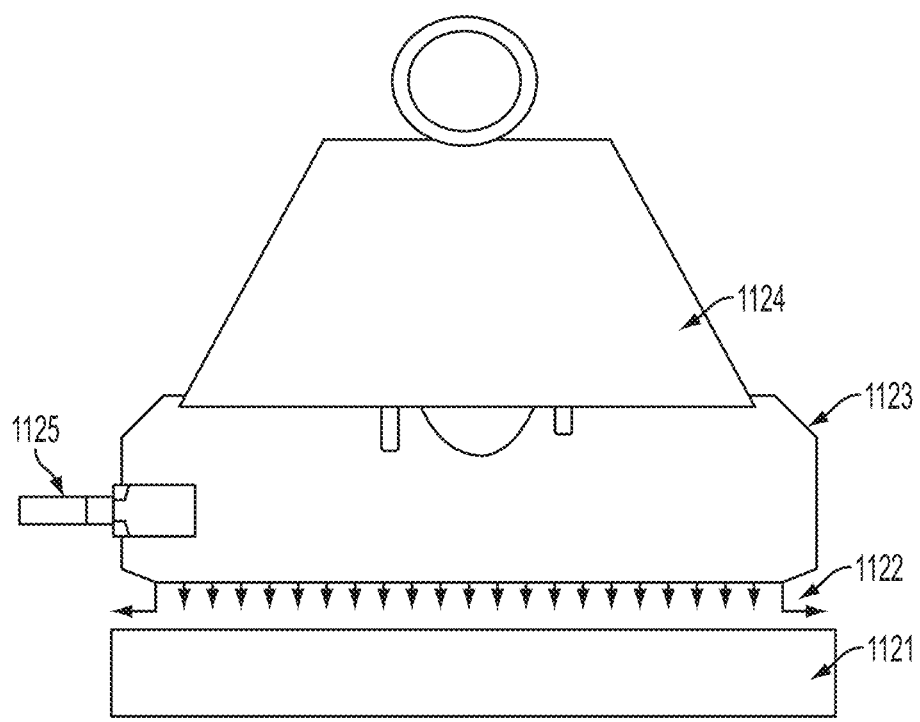
FIG. 11B is a balanced force bearing.

As illustrated in FIG. 11B, if there is 1000 pounds of force or in this illustration a 1000 pounds of mass represented by 1124 urging the face of the seal body 1123 together with the counter face 1121 and the seal faces have 10 in.$^2$ of area between them and 100 PSI air pressure is fed in at port 1125 and this pressure is distributed cross the back of the porous medium using a Plenum as taught multiple times before in this specification, the porous seal face will have exactly zero contact force between the faces as the hydrostatic force between the faces will equal the mass or force urging the seal faces together. This contact force can easily be adjusted by varying the input pressure to reduce ware and heat generated by friction.

This technique combines the high stiffness and damping of plane bearings and contact seals with the low friction and high speed capability of fluid film bearings and seals.

The porous media may be comprised of graphite, carbon, silicon carbide, Tungsten carbide, alumina or basically any porous and or sintered material. These materials are typically found as face seals and mechanical seals and as runners and runner faces in dry gas seals. Just instead of filling or sealing this porosity the porosity is used to conduct and evenly distribute hydrostatic pressure.

Orifice pocketed or step type air bearing compensations will not work in this application as only a uniform porous media is capable of evenly distributing a hydrostatic pressure with zero gap. For instance, if orifices were employed, when the faces were in contact hydrostatic pressure would only be exerted over the area of the orifices.

Figure 12:
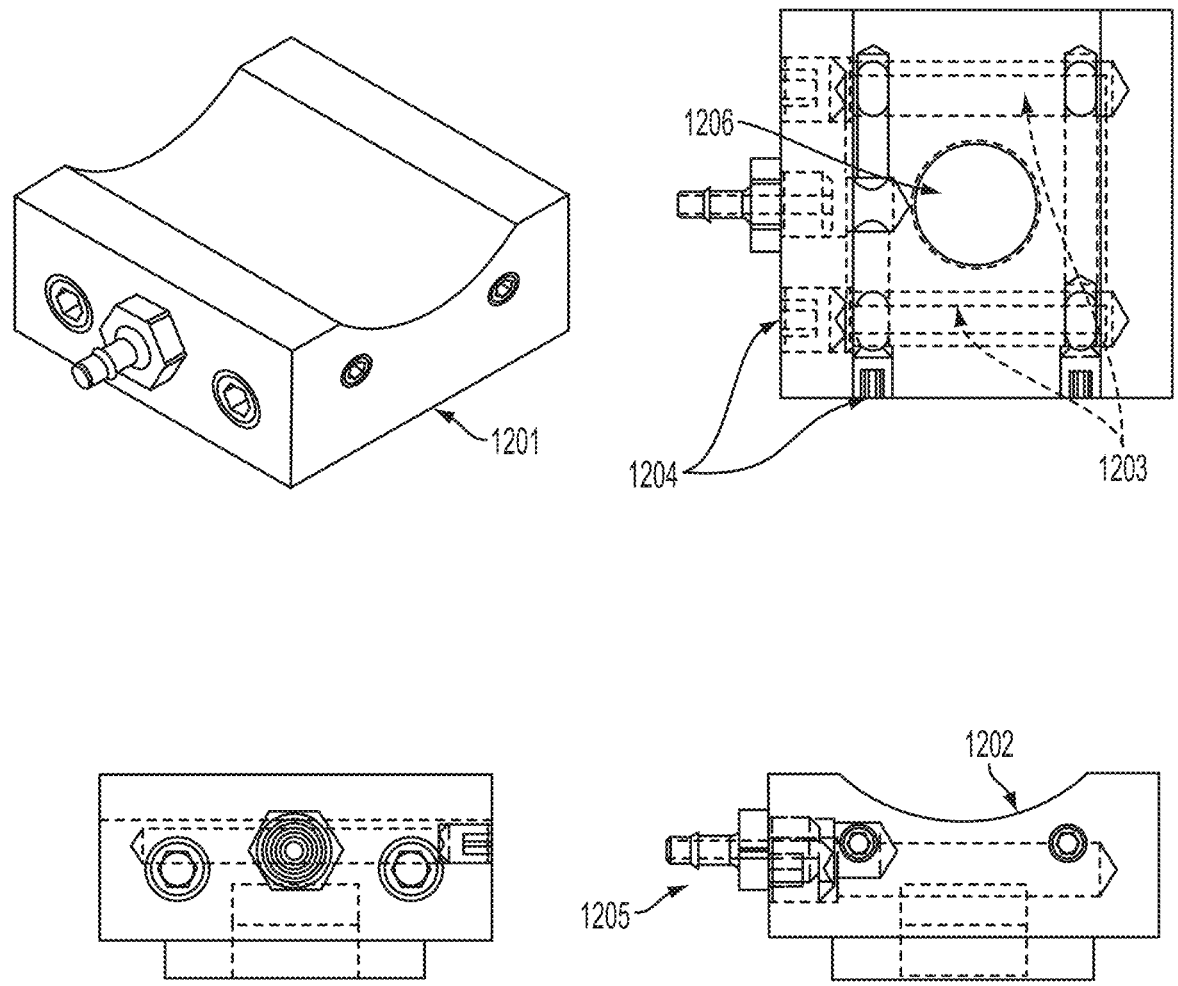
FIG. 12 is a method for making bearing seals with wide temperature capability

As illustrated in FIG. 12, this is an illustration of a solid carbon graphite tilting pad radial air bearing 1201. When manufacturing it from a single part rather than attempting to laminate two parts together the trouble of joining two components together for use under extreme temperatures is avoided. Most carbon graphite will not start to oxidize until it is in an environment over 800° C., so this provides a very extensive temperature range. In this case a Plenum to distribute the air to the back of the porous media face is accomplished by drilling cross holes 1203. These cross holes are threaded and plugged 1204 with high temperature ceramic or glaze which is later fired so that it becomes co-sintered with the carbon graphite. A ceramic insert from a metal cutting tool is sintered in at 1206 at the same time to distribute the load of the Hertzian contact of the tilting pad mechanism. 1205 represents a high temperature fitting known in the art. 1202 represents a diameter which would be complementary to a shaft that such a bearing would support.

Figure 13A:
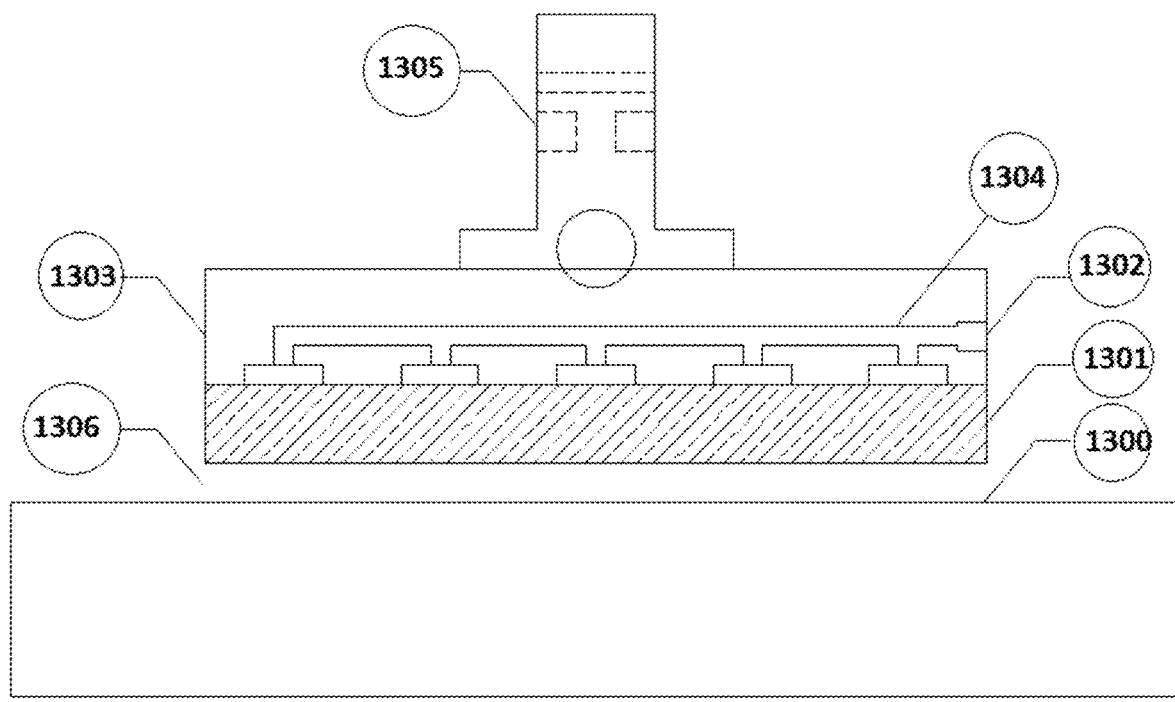
FIG. 13A is a tilting-pad, externally pressurized gas bearing.

It is also possible to co-fire separate ceramic components, for instance a nonporous housing with a porous media face. The co-firing essentially makes a monolithic part but there was an opportunity to machine plenums or labyrinths into the green parts before they were sintered or fired together. Alternatively a glass bonding, similar to a glazing operation done on the outside of a piece of pottery may be employed as a high temperature glue to bond separate ceramic components into a single high temperature part that could be used as a bearing or a seal in extreme temperature environments As illustrated in FIG. 13A, a non-rusting material 1300 such as stainless steel, coated steel, e.g., nickel or ceramic, or anodized aluminum that may be acted on by an attractive magnetic field of a porous magnet 1301 may be used since oil is not employed. The material is separated from the magnetic field of the porous magnet by a pressurized hydrostatic film 1306 is maintained by a continuous flow of fluid pumped through a porous media. The pressurized fluid is pumped through the porous media at a relatively higher pressure than a respective ambient pressure and is supplied to the porous media through an input port 1302. A labyrinth 1304 distributes the pressurized fluid across the back of the porous media and may be provided in a non-porous housing 1303. In an alternative embodiment, the labyrinth may be provided in the porous magnetic material in itself. In both embodiments, the non-porous housing 1303 and the porous magnet material 1301 are laminated together by a gluing, glazing or brazing operation that may take place inside of the housing or on a separate modular bearing component. The laminated housing 1303 and porous magnetic material 1301 may be mounted inside of housing or to a structure using a mounting stud attached through a flexure, gimbal mount, bolted joint or bonded in place.

Regarding the labyrinth and porting 1304, the flow through this should be significantly higher than the flows expected through the porous media to keep the labyrinth and porting from becoming a restriction. In other words, what you see on the pressure regulator should be the pressure that is exposed to the back of the porous media. The labyrinth should supply air pressure to at least 25% but not more than 75% of the back of the porous media. It should be noted that it is best not to make the grooves in the labyrinth wider than the thickness of the porous media. It is very important that the pressure differential to the back of the porous media and the pressure in the bearing gap not cause the porous media to blow up into the bearing gap. In fact, it is preferred have the bow of the porous media from the said pressure differential to be less than 10% of the design gap, as shown in FIG. 13D.

Figure 13B:
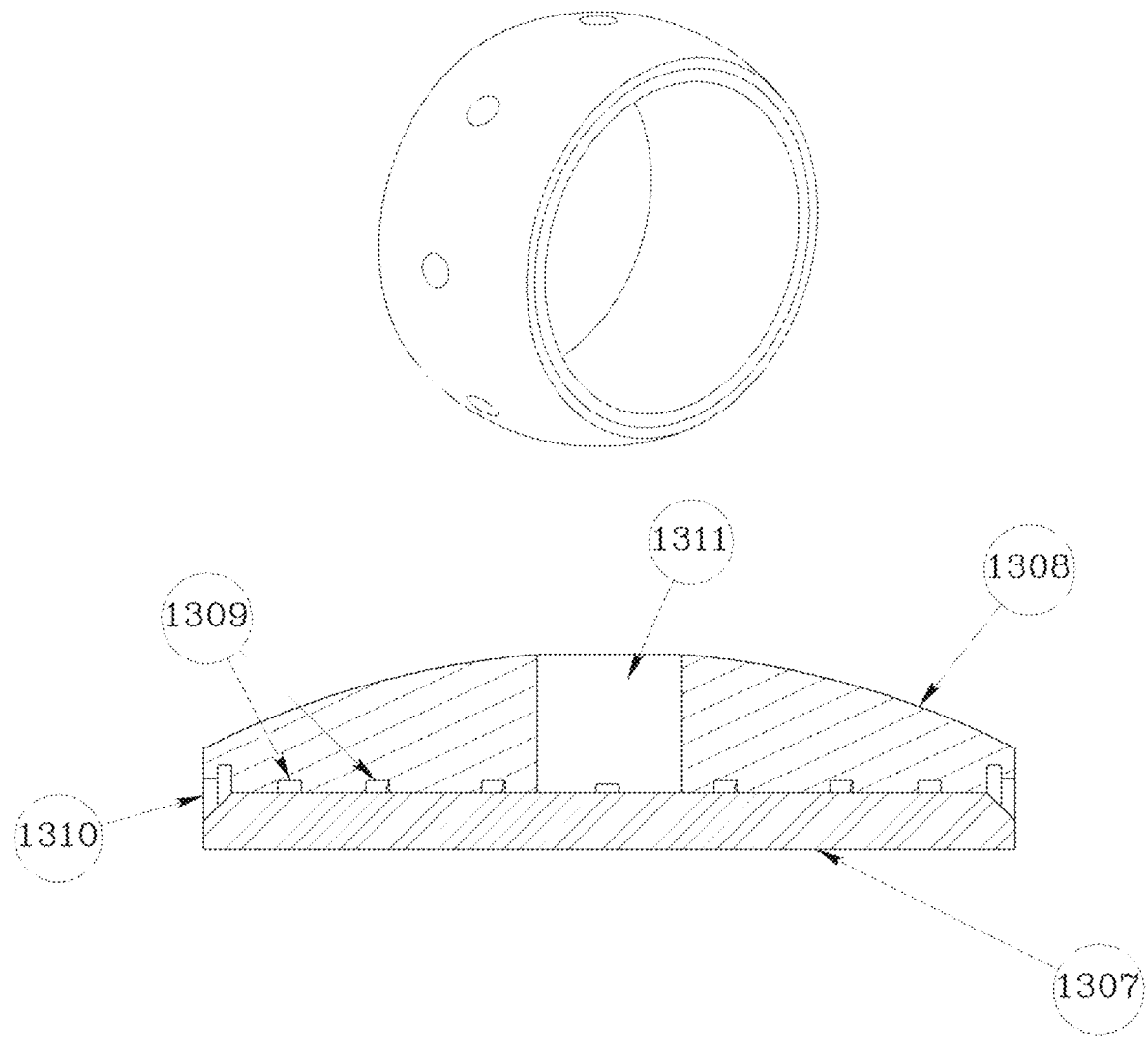
FIG. 13B is a bearing mounting and flow channel distribution.

As illustrated in FIG. 13B, high pressure fluid supplied through an aperture 1311 to a hole in the seal body is distributed axially and radially between a seal body 1308 and a porous media 1307 by a labyrinth 1309 that evenly distributes the pressurized fluid to a backside of the porous media. The labyrinth 1309 can alternatively be positioned in the porous media 1307 or the seal body 1308. A plenum that comprises approximately 50% of the surface area between the housing and the porous media may be disposed on the inner diameter of the housing or the outer diameter of the porous media. In one embodiment, the plenum may be dispose on both the inner diameter of the housing and the outer diameter of the porous media. The plenum has a conductance at least 10 times that of the free flow through the porous media.

The porous media layer 1307, shown in FIG. 13B, is generally between 0.020 and 0.200 inches thick and can be shrunk fit and/or bonded into the nonporous housing 1308. The air distribution labyrinth 1309 may be disposed between the porous media layer 1307 and the housing 1308. Finish boring of the porous media face/journal may be performed to increase or decrease the diameter of the porous media face/journal to a desired diameter. In an alternative embodiment, turning for finish flatness of a thrust face is performed. Air distribution channels or gaps have a labyrinth that distributes air to at least 25% of the surface but not more than 75% of the surface exposed to the high pressure source. Generally the air gaps are between one 0.0001 and 0.001 of an inch thick with shear energy. The flow through the gap is a function of the gap that may be squared or cubed. The flow through the porous media is determined by the desired flow through the gap; generally the ratio is approximately two times the desired flow of the shaft or thrust face in place. As the speed of the shaft increases, the ideal gap thickness also increases to minimize heat buildup through shear energy losses.

Figure 13C:
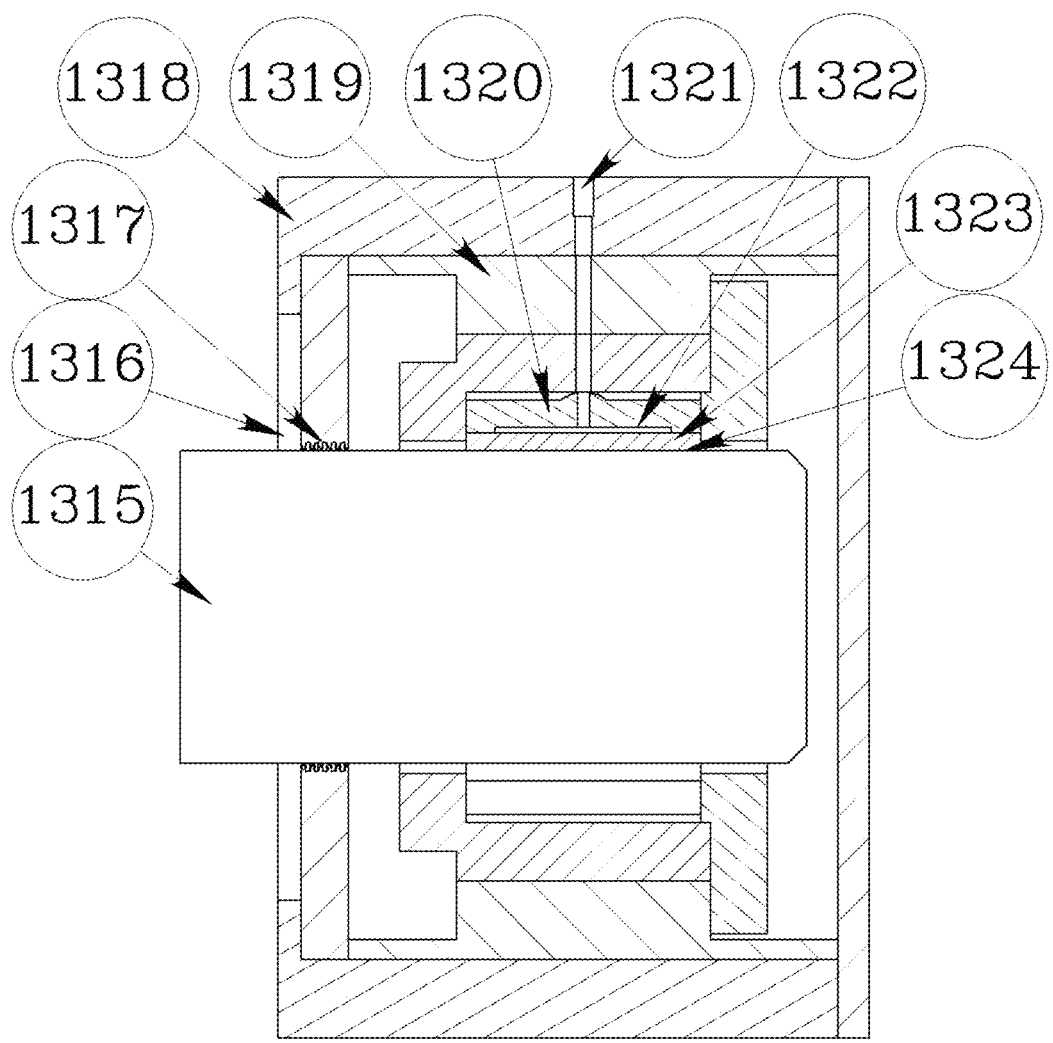
FIG. 13C is a tilting pad externally pressurized gas bearing for rotating shaft in Turbo machinery.
Figure 13D:
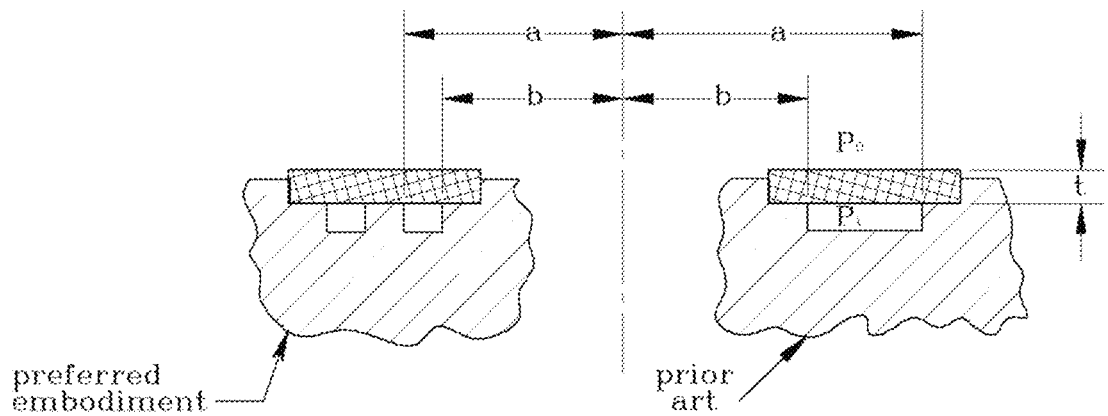
FIG. 13D is supported v. unsupported channels.

As illustrated in FIG. 13C, a compressor (oil has been removed as a lubricating medium for the bearings supporting the shaft) has gas bearings that operate on compressed gas and are used to generate an externally pressurized gas bearing support 1320 for the shaft 1315. A bearing cartridge 1319 and a bearing chamber and/or seal chamber in the compressor casing 1318 may be compactly designed; however this is not necessary as the gas bearing cartridge can fit in the same space that an oil bearing cartridge fits into. In one preferred embodiment, a porous media restriction 1323 occurs at the face of the tilting pad of the externally pressurized gas bearings 1320. These bearings 1320 can be fed using buffer gas that is pumped into the externally pressurized gas bearings 1320. The bearings 1320 require a higher pressure differential, in the range of 4 to 20 bar above the pressure on the other side of labyrinth seal in a volume 1316. The volume of the buffer gas flow, e.g., bearing gas, is dramatically less than the buffer gas required in the prior art, e.g., less than one cubic foot per minute per bearing.

The buffer gas may be taken from the high-pressure side of the pump, or the suction side, conducted through filters or dryers, compressed (suction side), and introduced through a port 1321 into the bearing 1320 and distributed to the labyrinth 1322. The labyrinth is restricted by the porous media 1323. The buffer gas exits the labyrinth under pressure through a final bearing restriction gap 1324. After the gas has exited the bearing gap 1324, it acts to raise the pressure in the bearing compartment slightly. This occurs because the used gas flows back into the process through the labyrinth seal 1317 or through some other ring or separation seal that may be used in that location. In the preferred embodiment, all vents are eliminated and process flow does not enter the bearing chamber. This eliminates having to flare or report vents to atmosphere and allows for "canned" motor possibilities in future turbo machinery designs. In the preferred embodiment, rotor dynamics are dramatically improved and the length of the shaft, previously consumed by seals, may be eliminated. This results in a dramatically stiffer shaft 1315.

Due to the stiffening of the shaft, the diameter of the shaft can be increased due to higher speed capability and, consequently, increased area for squeeze film damping in the gas bearing is provided. Unlike oil, which controls the temperature that the bearing compartment can operate at, gas bearings may operate at extreme temperature ranges from cryogenic to a superheated stream. Conventional techniques for gluing porous media 1323 to stainless steel or aluminum bearing housings 1320 is not appropriate for extreme temperatures. The compressor, gas turbine, or other large generator, supports the rotor on a frictionless gas film, even at zero RPM. This enables frictionless startups and shutdowns and allows for slow roll and standby operations while reducing the risk of seal hang-ups and bearing damage. Because of the aerodynamic properties of the smooth porous face, external pressure to the bearing may be turned off once the compressor or turbo machinery has reached a sufficient speed because the shaft is supported by aerodynamic effects. An auxiliary compressor may be run only at startup and shutdown, or during slow roll conditions. Failure of an auxiliary compressor during operation and loss of pressure does not affect the operation of the main compressor and the rotor may spin to a stop without damage. This is due to the tribological properties of the steel shaft on a carbon graphite bearing face. The preferred embodiment may be used in "canned" compressors targeted towards subsea compression as the bearings can take their pressure from the high pressure side of the pump and have acceptable life as plain bearings in start/stop cycles.

But, without sealing and without venting the bearings operate under extreme pressures. For example, where the suction pressure of the pump is 100 bar and the output side of the compressor is 200 bar, the bearings could be fed at 106 bar and the flow through the bearings would become the buffer gas; bearings that operate in a 100 bar environment see only a 6 bar pressure difference.

In order to appreciate the need for support of the porous media via the lands of the channels, the following discussion is provided. Referring to FIG. 13D, an example is provided for porous media which is supported vs. that which is unsupported. In order to calculate the maximum deflection of the porous media under pressure (say, at 600 psig), "Plate Formulas" by William Griffel (Frederick Ungar Publishing Co., New York) are used. In Griffel's book, the maximum deflection can be calculated for both a supported and unsupported case. A modulus of elasticity of $1.4 \times 10^6$ psi is used to correspond to graphite as cited in prior art (e.g., Union Carbon Grade ATJ) wherein an unsupported plenum is taught.

In FIG. 13D, for the supported case, Griffel's case 37 yields a maximum deflection of 0.00005 inch.

In FIG. 13D, for the unsupported case (which is consistent as in the case of other prior art), Griffel's case 37 yields a maximum deflection of 0.0002 inch (which is greater than certain minimum air gaps required for externally pressurized gas bearings). There are many cases of prior art which show improperly supported porous media, such as U.S. Pat. No. 4,710,035 (Tittizer), U.S. Pat. No. 6,404,845 (Sharpless), U.S. Pat. Nos. 2,683,635 and 2,683,636 (Wilcox), U.S. Pat. No. 4,848,710 (Ohta), and others.

The unsupported configuration is inadequate in preventing distortion since it yields under pressure. Yielding may result in increased deflection that is greater than the air gap resulting in rub or "clamping" of a mating component. The externally pressurized gas bearing cannot function properly when the unsupported configuration distorts so that the deflection is greater than the air gap.

Figure 14:
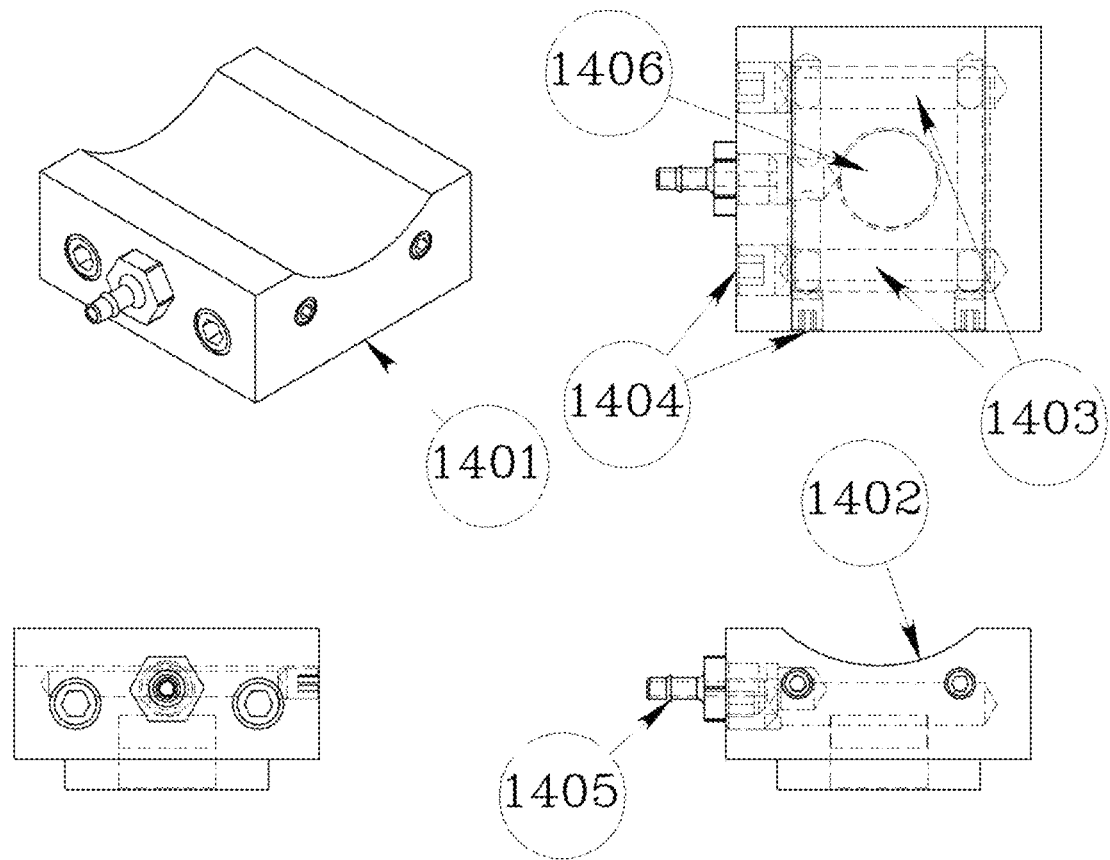
FIG. 14 is a solid carbon graphite tilting pad radial externally pressurized gas bearing for Turbo machinery.

As illustrated in FIG. 14, a radial, externally pressurized gas bearing 1401 is manufactured of a single solid carbon graphite tilting-pad. The use of a single carbon graphite tilting-pad avoids the need for lamination of multiple components at high temperatures since most carbon graphite will not oxidize until the temperature has exceeded 800° C. As shown in FIG. 14, a Plenum is used to distribute air through cross holes 1403 to a backside of a porous media face. These cross holes 1403 are threaded and plugged 1404 with high temperature ceramic or glaze which is later fired causing the ceramic or glaze to become co-sintered with the carbon graphite. In one embodiment, a ceramic insert from a metal cutting tool may be sintered with the ceramic or glaze at 1406 to distribute the load of the Hertzian contact of the tilting pad mechanism. It is possible to separately machine plenums or labyrinths and co-fire the separate ceramic components into a single part, for instance a nonporous housing with a porous media face. In an alternative embodiment, a glass bonding operation may be employed as a high temperature glue and used to bond separate ceramic components into a single high temperature part that can be used as a bearing or a seal in extreme temperature environments. See generally, FIGS. 14, 1402 and 1405. The radial gas bearing should be made such that the radius is the same size as the shaft minus nothing, plus 0.001 inch.

Externally pressurized gas bearings employ compensation to restrict and control the flow of air into a bearing gap. The object of compensation is to provide enough air into the bearing gap to maintain load bearing pressure without having so much air that stability and stiffness suffer. The key here is that a region is created that could easily be several bar pressure, and nothing on either side of this region will pass if it is at a lower pressure. The seal leaks the externally pressurized gas bearing so that gas is supplied to both sides. For example, a 4 inch diameter face seal would have a total flow of about 0.5 standard cubic feet per minute. Because the seal is externally pressurized, it works the same at zero velocity as it does at operational speeds. In orifice pocketed, or step type compensation methods, externally pressurized gas bearing compensations do not work. This is because only a uniform porous media is capable of evenly distributing a hydrostatic pressure with zero gap. For example, if orifices were employed, when the faces were in contact, hydrostatic pressure would only be exerted over the area of the orifices. Porous Graphite externally pressurized gas bearings have been known for their crash resistance. In spindles, where relative surface speed between the bearing faces can be quite high, graphite has been used as a bearing face only and orifice type compensation methods are still employed.

Bearings can be designed to operate on process gas by controlling the porosity of graphite, carbon, or ceramic materials, by known methods such as the amount of binder to be burned out, the amount of compaction pressure, differences in the firing schedule, or other methods known in the art of ceramics manufacturing. It is possible to adjust the porosity used to restrict the flow of gas in the gas bearing to the molecular weight and/or viscosity of the gases to be used in the Turbo equipment. Typical porosity of porous media for externally pressurized seals and bearings is between 2-20%.

Figure 15A:
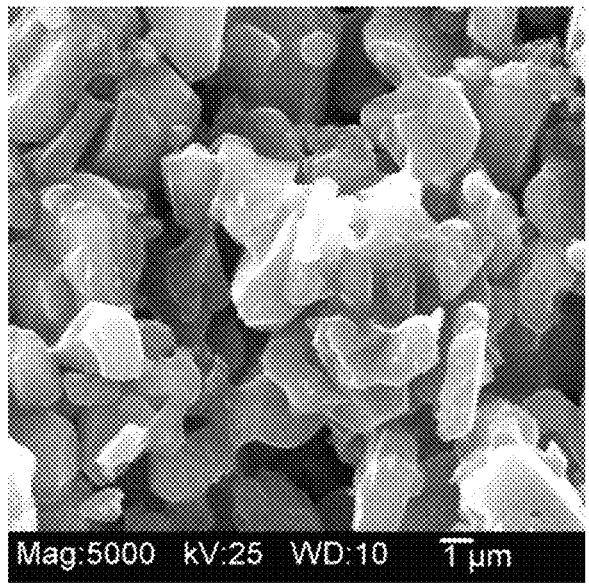
FIG. 15A is a porous media for externally pressurized gas bearings—magnification 5000×.
Figure 15B:
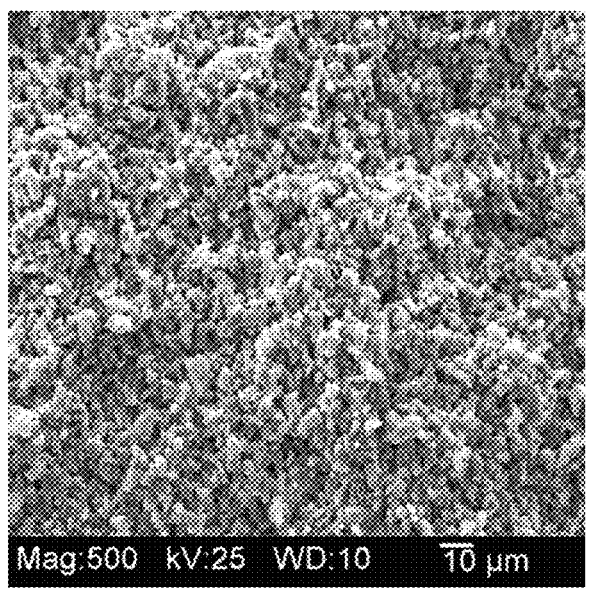
FIG. 15B is a porous media for externally pressurized gas bearings—magnification 500×.

As illustrated in FIGS. 15A-15B, in the manufacture of porous media for externally pressurized gas bearings ceramic casting techniques commonly known in the art can be employed. The following outlines such techniques and methodology as found in open literature.

Dry pressing involves the bi-directional compaction of ceramic spray dried powder and is generally used in high volume applications requiring complex geometry and high tolerances (typically +/−1% above 10 mm and +/−0.1 mm below 10 mm). With mechanical presses of between 2 and 100 tons, components in a wide range of sizes and materials can be produced.

Freeze casting is a process for casting ceramics. Powdered ceramic mixed with a water-based gel is cooled to −50° C. The expansion of the water as it freezes compacts the powder into the precise shape of the mold. Freeze casting offers benefits above what currently available refractory ceramics can provide.

For components requiring high precision, and medium to high volumes, typically using high purity Aluminas, offers the same benefits of a plastic injection molded component along with the excellent material properties of an advanced ceramic. The benefits of ceramic injection molding include: excellent tolerance achievable (+/−0.025 mm), high surface quality without the need for additional finishing processes, and an economic option for otherwise high cost production components.

Isostatic pressing is used for cylindrical components. Isostatic pressing is an omni-directional compaction of ceramic powder in a flexible mould. Iso-pressed parts can be produced in almost all of the materials used for dry pressing. This also allows for producing designs with fluted shafts and a number of features in the pressing.

Extrusion is ideal for products with a regular cross section and offers the advantage of long lengths of product with uniform density. A ceramic (typically from Alumina, Magnesia or Silicates) is mixed with a plasticized carrier and forced through a die to produce the product which is cut to required length. Volumes can be relatively small to very large, and product diameters of less than 1 mm and bores of less than 0.25 mm can be accommodated.

In slip casting, sometimes called drain casting, a plaster of Paris mold is filled with a slip. Slip is a liquid containing a ceramic material in a water suspension. As the mold absorbs water, the ceramic suspension solidifies uniformly on the walls of the mold. Once the desired wall thickness is reached, the remaining slip is drained, the mold is separated or broken, and the part is removed. The part, now in a powder compact or green stage, is then sintered in an oven.

In tape casting, ceramic powder is mixed with binding and dispersant agents, solvents, binders, plasticizers and is called a "Slip". This is a slurry that is then cast into a leveling device that creates a measured outlet onto a moving belt. The moving belt controls the thickness of the tape—down to 5 μm w/widths up to 2 m. Porosity and characteristics tightly controlled by powders in Slip. Tape is in a "green" state and is flexible for further processing. This can be laminated or bonded to other ceramics in final firing process. Ultimately tape thicknesses will be achievable on the nanometer scale. This process can be automated and production sped up for lower costs with higher engineered materials.

For finishing, copper plate and hard plate polishing techniques can be used to produce excellent quality surface finish and flatness. Lapping/polishing (flat-face), outer diameter finish, bore grinding, double-sided (face) grinding, and centerless grinding techniques may be used.

Porous bearings create a mitigating force during crashes because they are not dependent on a gap to distribute air pressure across the face of a bearing. An orifice bearing in an overload condition will collapse, closing the gap and leaving only the area of the orifice or grooving to exert air pressure. This means after collapse that the bearing faces will see nearly the entire load as plain bearings. In contrast, porous bearing faces will continue to exert air pressure across the entire bearing area, even in a zero gap and zero flow situations. In fact, the force created will equal the line pressure multiplied by the projected surface area. In order to show this effect in operation, several experiments were performed to determine the static coefficient of friction of graphite on granite and the effect air pressure to the bearing has on static friction before lift-off.

Figure 16A:
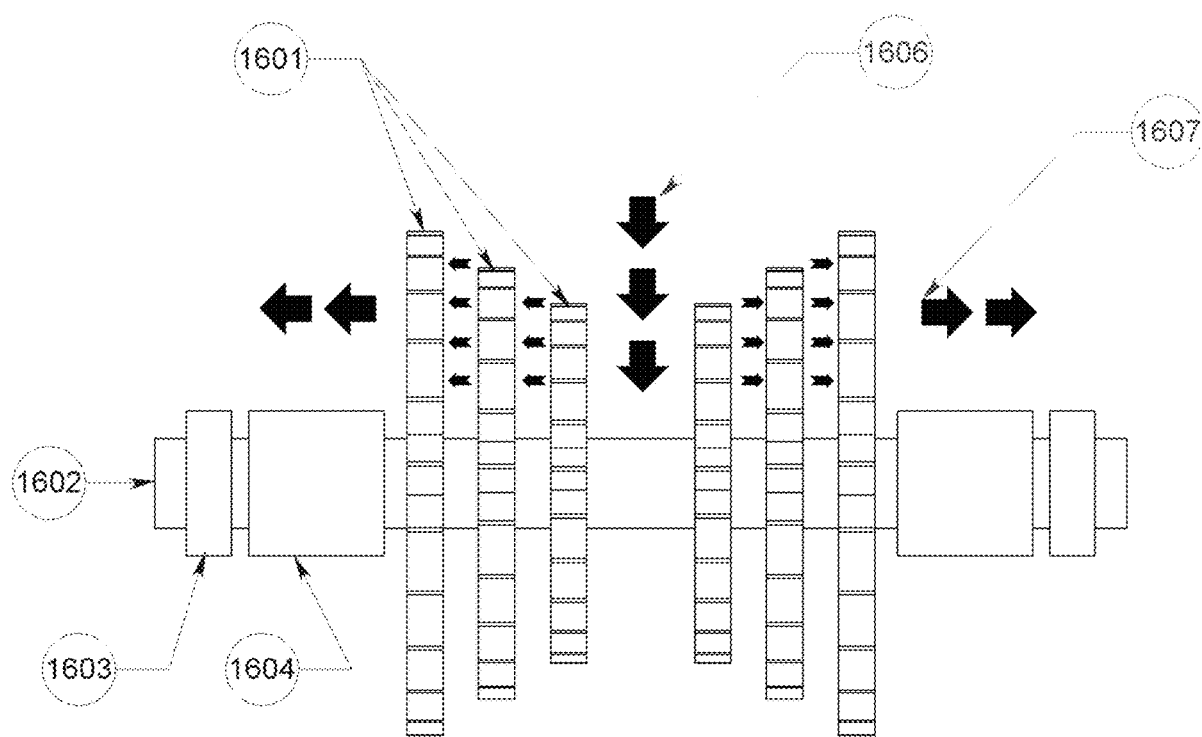
FIG. 16A is an externally pressurized gas bearings operating on steam supporting turbine rotor (Configuration 1).
Figure 16B:
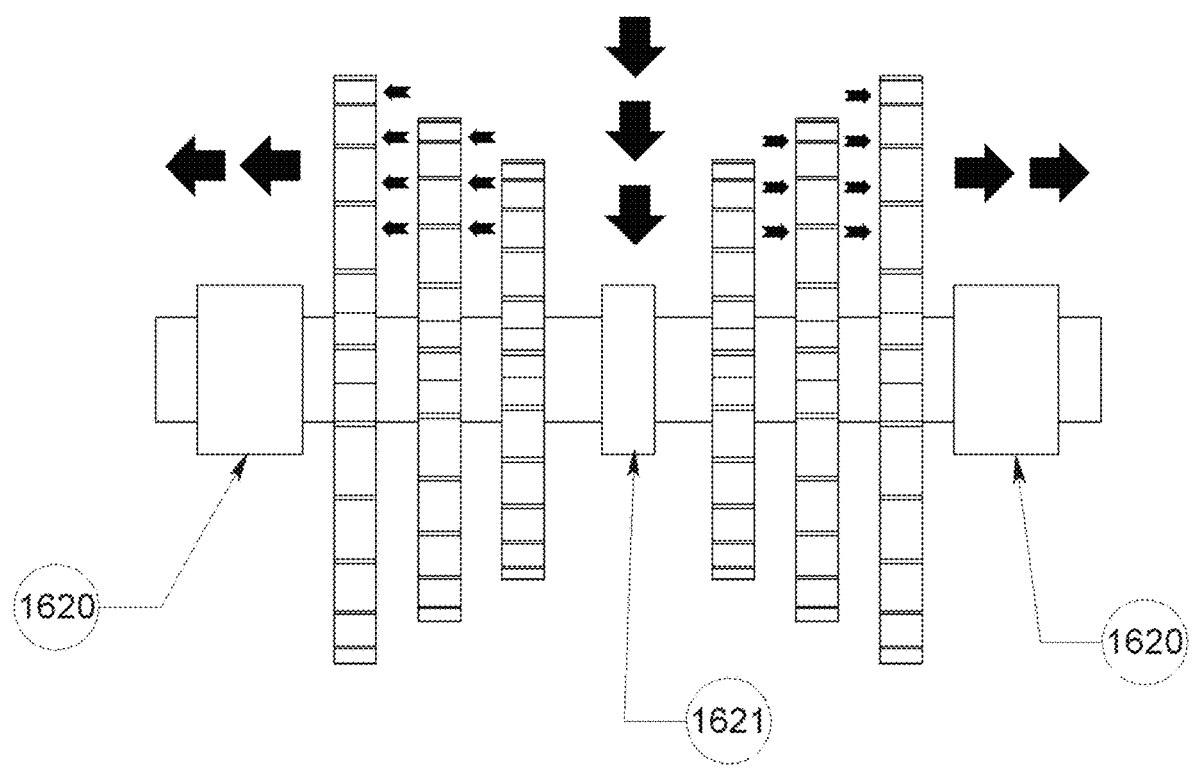
FIG. 16B is an externally pressurized gas bearings operating on steam supporting turbine rotor (Configuration 2).

As illustrated in FIGS. 16A-16B, in a multi-stage 1601 Steam Turbine, a shaft 1602 is supported by oil bearings 1603 and seals 1604. The shaft supports impellers. The stages 1601 of the impellers have axial and radial stator clearances at their perimeters to account for thermal changes, manufacturing errors, rotor dynamics and bending of the shaft. The shaft is not very stiff since the shaft length is approximately 10 times greater than the shaft diameter and cantilevered between the bearings. Gas bearings eliminate the need for this problematic cantilevered design. It is often noted that magnetic bearings have an advantage over other bearings since they can actively influence the shaft to improve rotor dynamics. However, employing bearings directly where the shaft and impellers are doing their work is orders of magnitude more effective. As shown in FIG. 16B, bearings employing steam as the hydrostatic medium, constrain the shaft radially and axially at the ends as had been the case previously with oil bearings. Steam bearings do not require protection of the bearings behind a seal since oil is not used. This is a huge advantage over oil-bearings for maintenance and mean-time-between-failure. Because externally pressurized gas bearings can combine sealing and bearing functionality, highly effective seals are also possible between impeller stages. This eliminates blow-by inefficiencies. Flow through a gap is a cubed function of the gap, so running clearances between stators and impellers or vanes have a very sensitive effect on pump efficiencies.

Gas bearings can operate at temperature extremes along the spectrum of Turbo equipment. For example, externally pressurized gas bearings can use Freon or superheated steam as the aerostatic/aerodynamic medium. This enables externally pressurized gas bearings to be employed directly in the flow path through the Turbo equipment. In the current art of Turbo equipment, the shaft is typically unsupported through this area. This requires leaving large clearances between stators (not shown) and vanes or impellers which contribute to blow-by inefficiencies. Although not shown, just as a steam bearing may be added at the center of span, such a bearing may be employed between each impeller stage. This eliminates back flow to less than what is being fed into the bearings.

Figure 17:
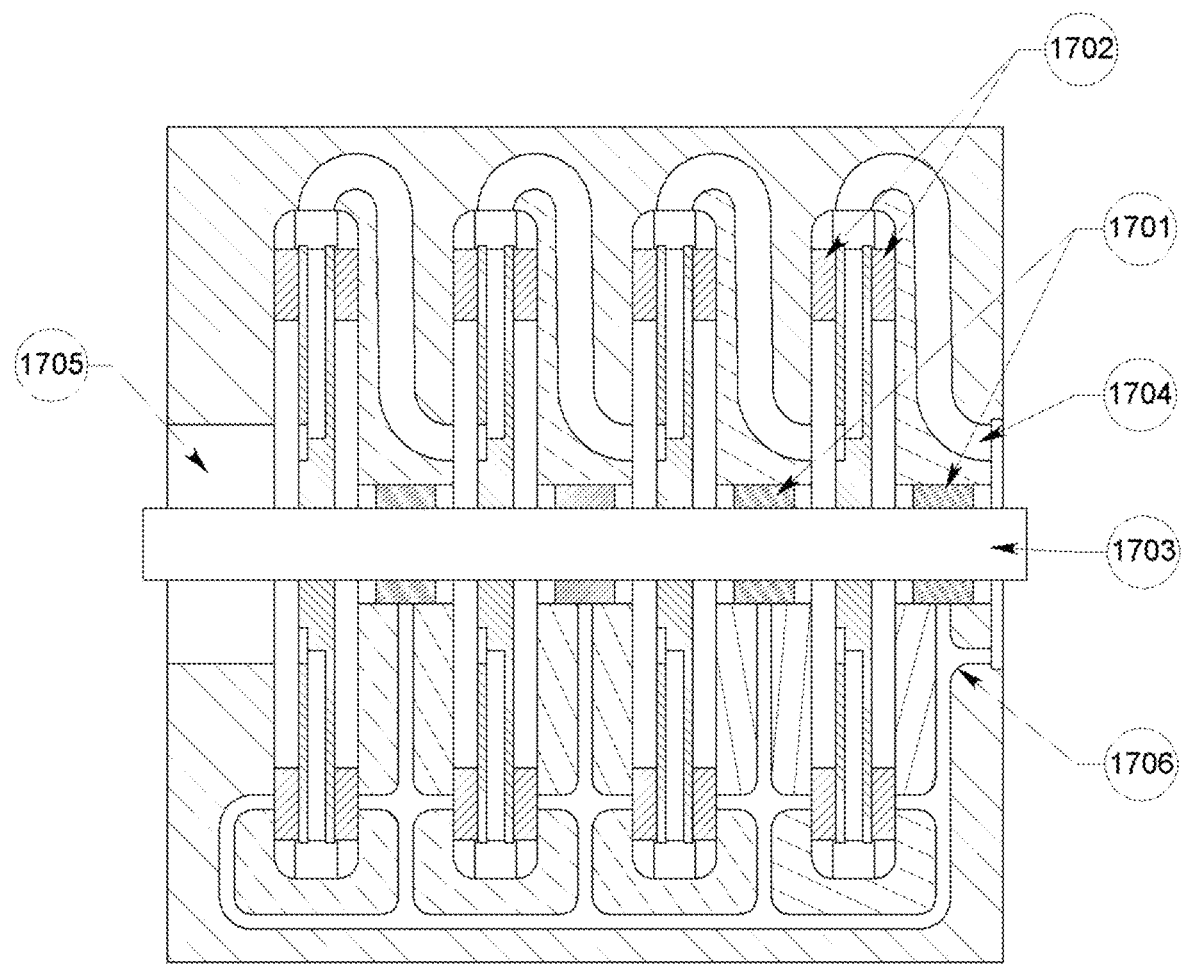
FIG. 17 is a centrifugal compressor with externally pressurized gas bearing support, the bearings having a sealing functionality between the stages.

As illustrated in FIG. 17, using gas bearings at the perimeter of the impellers or vanes 1702 and supporting them axially implies relatively high surface speeds. Unwanted shear in these gaps could become a significant heat source and limitation, but this does not prevent the application of gas bearings with sealing functionalities at or near the impeller diameter radial or axially. The fact that most gases are at least two orders of magnitude less viscous than oil is a strong argument that externally pressurized gas bearings should be able to have higher relative surface velocities before problems from viscous shear heating become a problem. It is true that shear through a gap is a cubed function of the gap, and so larger gaps are way of reducing shear losses.

Because porous media gas bearings have no orifices, grooves, steps or pockets in their face, they have the best chance of maintaining laminar flow at high relative surface velocities. The laminar flow regime creates significantly less drag and heat losses than the turbulent regime. The best way to maintain laminar flow is to have a featureless bearing face with a fine surface finish. Porous bearings enable both these requirements.

Because the linear growth of the rotor will not match the stator, it is recommended that axial steam bearings or gas bearings have compliance on both sides and spring force to urge the pressure issuing face against the impeller, as shown in FIGS. 1A and 2A. The combination of bearing and sealing functionality has significant advantages for equipment simplification and the reduction in the length of the shaft 1703. This allows for higher speed equipment and more compact design. One of the biggest advantages of a combination seal and bearing technology is that it allows for a wholesale revision of equipment design. For instance, in a centrifugal compressor with multi-stages, illustrated in FIG. 29, a shaft may be supported on bearings and seals. The shaft supports impellers that have significant axial and radial clearances at their perimeters, where they are doing most of their work, to account for rotor dynamics and other motions of the shaft. In an alternative embodiment, using externally pressurized gas bearings as seals at the perimeter of the impellers would improve the pressure that could be generated by each stage. Such axial bearings/seals would also tend to dampen the rotor motions and make compression quieter by avoiding back flows between stages which represent high velocity high pressure flows through unwanted clearance regions. Such flows are known to have destabilizing effects.

As illustrated in FIG. 17, a centrifugal compressor, consistent with the preferred embodiments, has no seals or bearings on either end of shaft 1703. These ends could be capped (not shown) without the requirement for any type of vent, enabling a canned or sealed compressor. If it were the middle compressor, in a train of compressors driven by a single power source, seals would be needed at the end but not bearings. Taking this concept further, it could be noted that in centrifugal compressors and Turbo equipment the stages are connected to a common shaft, and so it is not possible to optimize the speed of each stage. If each impeller was supported by a radial externally pressurized gas bearing and also employed the axial externally pressurized gas bearings as sealing technology, it would be possible to drive each impeller independently. In the case of turbines, each turbine stage could also be run at the optimal speed for that particular stage. Each stage would be supported on its own radial and axial externally pressurized gas bearings. These bearings also function as highly effective seals. Each stage can be coupled to its own motor or generator either on the inner diameter or the outer diameter of the impeller or turbine stage. This would essentially eliminate the shaft. One of the biggest problems in Turbo equipment is rotor dynamics of the shaft. One of the best solutions is to get rid of the shaft. This also allows for much more compact equipment and eliminates the need for aligning shafts on the motor to a compressor, or a turbine to a generator. These functions could be combined inside of the same casing, dramatically reducing the size, weight and the cost of equipment while improving the efficiency by optimizing each stage and dramatically improving sealing in between stages. Without a shaft there is no reason for shaft seals anymore.

Figure 18:
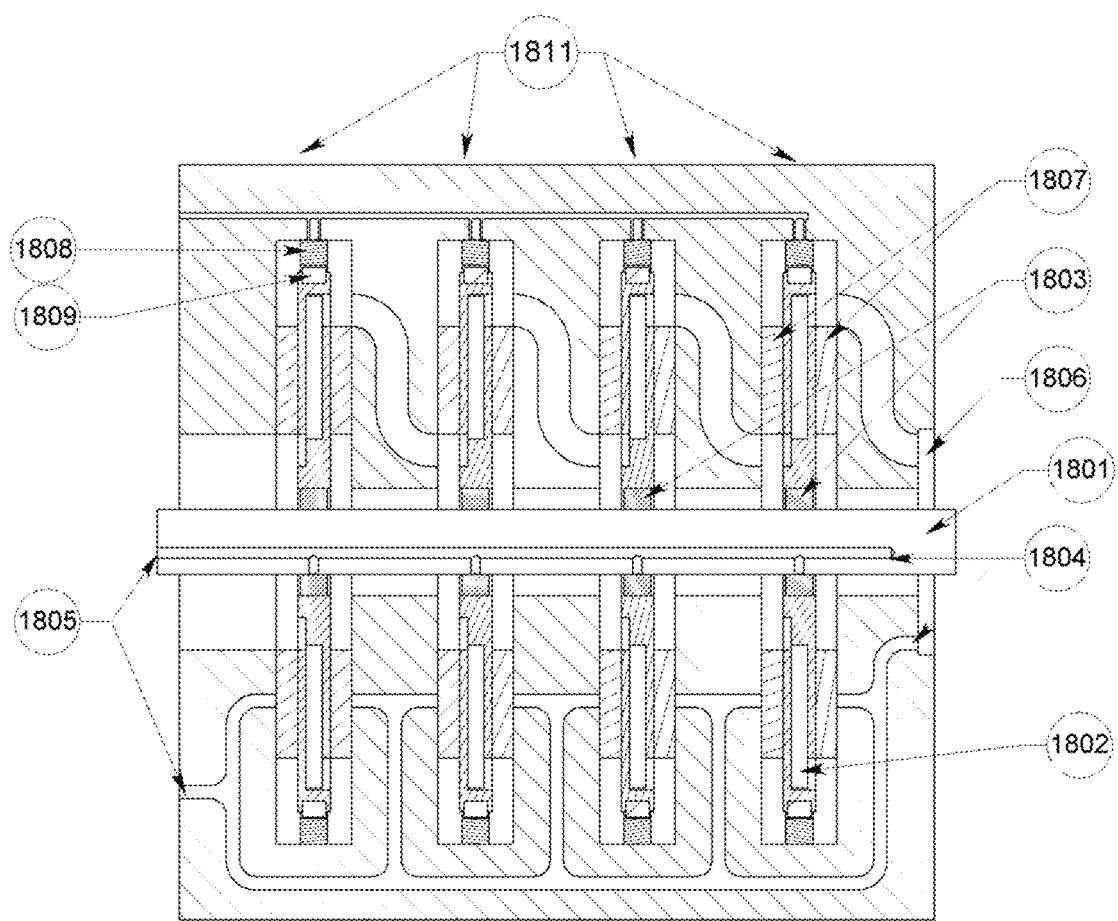
FIG. 18 is a centrifugal compressor with stationary shaft and independent bearing sealed stages.

As illustrated in FIG. 18, a centrifugal compressor has impellers that are supported on a stationary shaft via externally pressurized gas bearing seals. In this manner, each impeller may be spun at a speed that matches its optimum efficiency and it is possible to spin each impeller at different speeds to experimentally determine which speed for each impeller results in the optimal efficiency for the whole set of impellers. Externally pressurized gas bearings are also employed on the sides of the impellers both to restrain the dynamics of the impeller and provide axial constraint for the impeller since it is no longer axially coupled to the shaft. The pressurized gas bearings also provide highly effective sealing to avoid pressure blow back. In an alternative embodiment the motor could be at the ID and the radial bearing at the OD.

In a preferred embodiment, the shaft 1801 is stationary. The shaft supports the radial location of the four spinning impellers 1802. The impellers spin on stationary radial bearings attached to the stationary shaft using the techniques described previously in this application. High pressure, which must be fed to the gas bearings, may be supplied from the high-pressure side 1806 of the compressor to 1804 to distribute the pressure or from an external source to 1805 for the same distribution. The axial bearings/stage seals 1807 together with their respective mating impellers are isolated from axial growth of the stationary shaft through the gas bearing gaps between the radial air bearings and the stationary shaft. By maintaining a higher pressure between the axial gas bearings/seals and the impellers and the pressure at the discharge of the impeller blowback between the stator the impeller is eliminated. Instabilities that are associated with these high pressure/high velocity flows are also eliminated and the compression ratio and efficiencies of each of the stages is increased. Noise generated by the compressor is significantly reduced by eliminating the turbulent flow through labyrinth seals. Since the shaft 1801 in this embodiment does not turn, another method must be employed to introduce the power required for compression to the impellers. Today this can be accomplished with high speed motors that would be integrated with each impeller. This will allow each impeller to rotate independently and at different speeds, whichever speed happens to result in the best system performance. The independently operating stages also dramatically improve the compressor's ability to handle changed processing conditions. In one embodiment, the motor elements are at the outside perimeter of the impellers, providing easy access to coils 1808, permanent magnets 1809, or electromagnets for cooling. This also provides a large circumference onto which to apply torque. The gas pressure distribution into the labyrinths of the porous bearings is conducted in the same way as in FIG. 17.

Figure 19:
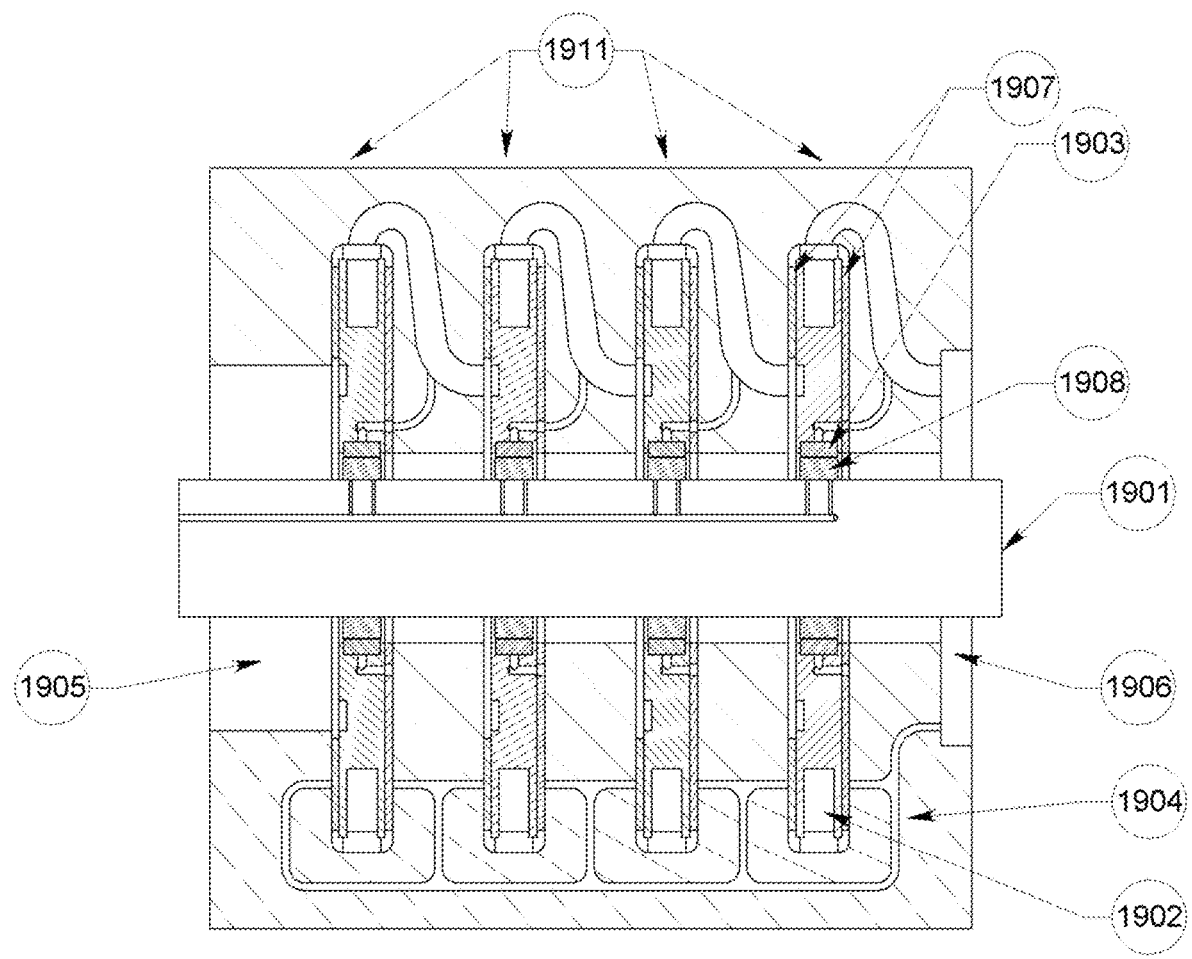
FIG. 19 is a centrifugal compressor on stationary shaft with independent bearing sealed stages and motor magnet bearings.

As illustrated in FIG. 19, a centrifugal compressor employing impellers that are supported on a stationary shaft via an externally pressurized gas bearing. The gas bearing acts as a magnetic element in the motor. The motor drives the impeller or a generator driven by the impeller. In this manner each impeller may be spun at a speed that matches its optimum efficiency and it is possible to spin each impeller at different speeds to experimentally determine which speed for each impeller results in the optimal efficiency for the whole set of impellers. Externally pressurized gas bearings are also employed on the sides of the impellers both to restrain the dynamics of the impeller, provide axial constraint for the impeller as it is no longer axially coupled to the shaft. The pressurized gas bearings provide a highly effective seal to avoid pressure blow back. In an alternative embodiment the motor externally pressurized gas bearing combination could be employed at the outer diameter or in the thrust bearings near the OD or ID.

In on embodiment, shown in FIG. 19, a stationary shaft 1901 is shown with a significantly larger diameter in order to provide more circumferential distance at the inside diameter of the impeller and the outside diameter of the shaft. This increases the radial stiffness of the shaft through the compression work area, provides area to conduct electrical power to the coils and to pass cooling fluids down the shaft. This increases the radial stiffness of the shaft through the compression work area. As in FIG. 18, the impeller stages may be driven independently of each other. In this embodiment, a high-speed motor is used at the ID of the impeller to provide power for compression. The stator coils 1908 are on the OD of the stationary shaft, and the permanent magnets are on the ID of the impeller. This is inside out compared to most motor designs the advantage being that the magnets are held on by centrifugal force, rather than having centrifugal force try to pull off the magnet from the OD of the rotor. Additionally, it is taught that the neodymium, being porous, can be used as the restriction for the hydrostatic bearing function. See generally, U.S. Pat. No. 8,427,021. This allows the neodymium 1903 to function as both a permanent magnet for the high-speed motor, and as a restrictive bearing element for its axis of rotation. Notice in this embodiment that it is being fed 1910 from the high pressure side of the impeller. As noted before, the axial bearings can be fed 1906 from the high-pressure side of the compressor. These axial bearings are constructed using technologies taught in FIGS. 1 and 2, including mounting compliance techniques as applied in FIG. 18.

When using the motor magnet as a bearing element, the high pressure in the air gap will help retain the magnet on the rotor; using the high pressure and velocity of air in the externally pressurized gas bearing gap is a mechanism for cooling the motor. And, by the virtue of the small air gap achieved by the externally pressurized gas bearing functionality, much higher efficiency can be achieved by a smaller design clearance between the magnet and coil; this relationship being a squared function, so dramatic improvements can be made in motor or generator efficiency.

Also it should be noted that the motor magnet bearings could be employed as the axial bearings running on the sides of the impellers 1902, much as conventional linear motors employ magnets on either side of the set coils. This has some advantages especially at high speeds when attempting to keep the magnets attached to the rotor as their centrifugal force pushes them up against a diameter machined into the impeller 1902. Note that the illustration shows that the axial and radial bearings are being fed 1904 from high pressure side of the compressor. In an alternative embodiment, these bearings may be fed from a separate high pressure source (not shown).

Figure 20A:
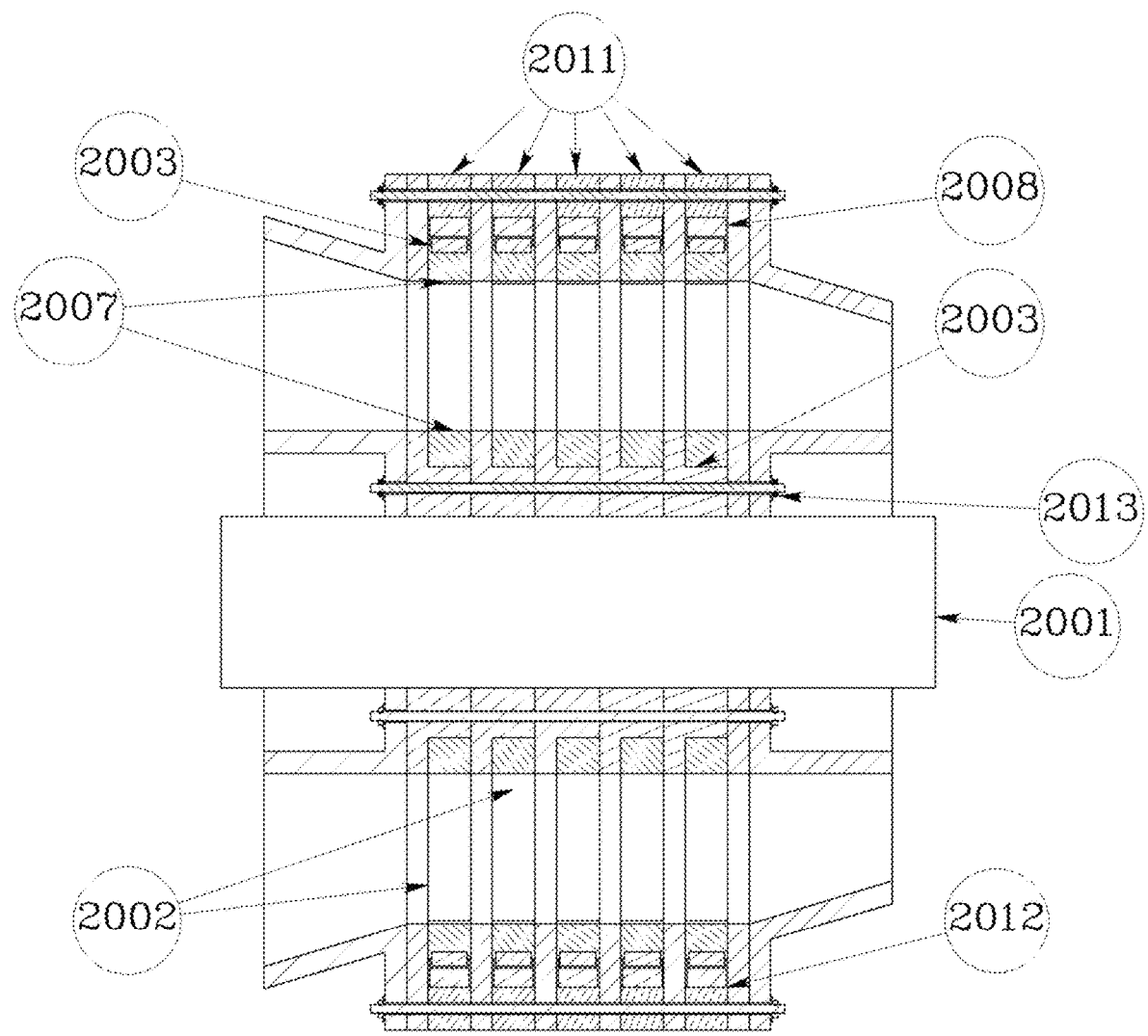
FIG. 20A is a side view of an axial compressor with bearing seals.
Figure 20B:
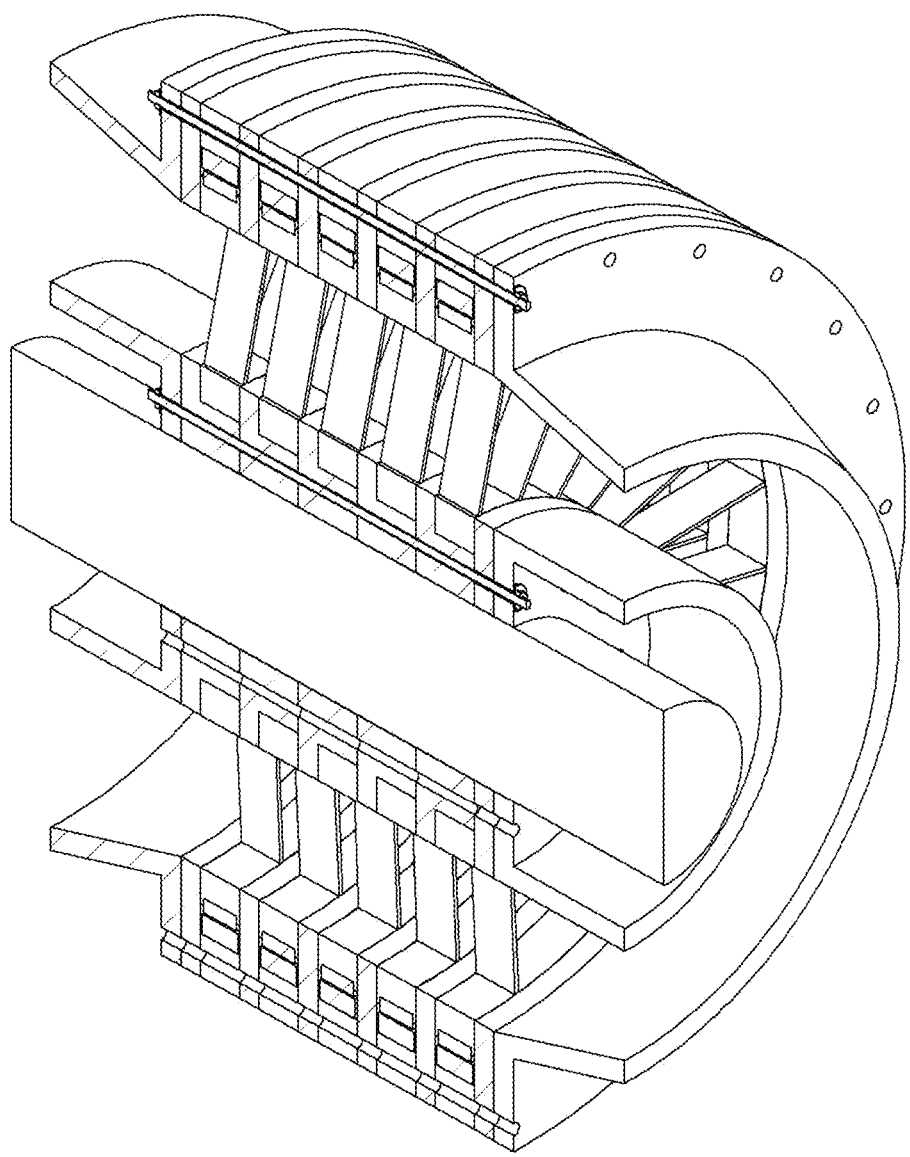
FIG. 20B is a 3-D view of an axial compressor with bearing seals.

As illustrated in FIGS. 20A-20B, an axial compressor employs the bearings/seals of the present invention and has a set of blades 2002 that rotate and are driven independently. The blades are constrained axially by parallel and continuous annular surfaces on both sides at their respective outside and inside perimeter acting against an axial externally pressurized gas bearing/seals 2007 as taught in FIG. 1. These bearing/seals can be placed in series, as taught in FIG. 6, as two-sided stator components. As in FIG. 6, clearance can be designed in-between the thrust faces. Alternatively, the load path of the differential pressures can be accommodated as a straight line through the center of the bearings/seals. Assembly begins with the stationary shaft 2001 and a stage stator assembly 2011 with an axial bearing seal according to FIG. 1. An impeller, or set of blades 2002, with a continuous annular surface, outside and inside perimeters, and rotor components of the high-speed motor 2003 are inserted over the shaft 2001 and into a first stator stage 2011 assembly. A spacer 2012, consistent with the thickness of the impeller between said contiguous parallel surfaces at its perimeters plus the designed clearances for the gas bearings/seals 2007, is bolted between the first stator and a portion of a second stator to be bolted in place. This process continues axially until all the stages for the machine are assembled. A single bolt 2013 can be run the length of all the components. High-speed motors/generators at the outside perimeters allow the stages to run at independent speeds. Consistent with an axial compressor, a high volume of air can have limited compression, for instance, to feed a power turbine or large engine, or a high volume of air could drive the generators creating asynchronous or DC current for use elsewhere. A big advantage of the present design is that there is no leakage of flow or back-flow past the tips or clearance edges of impellers, and the individual impellers may be driven at different speeds.

Figure 21A:
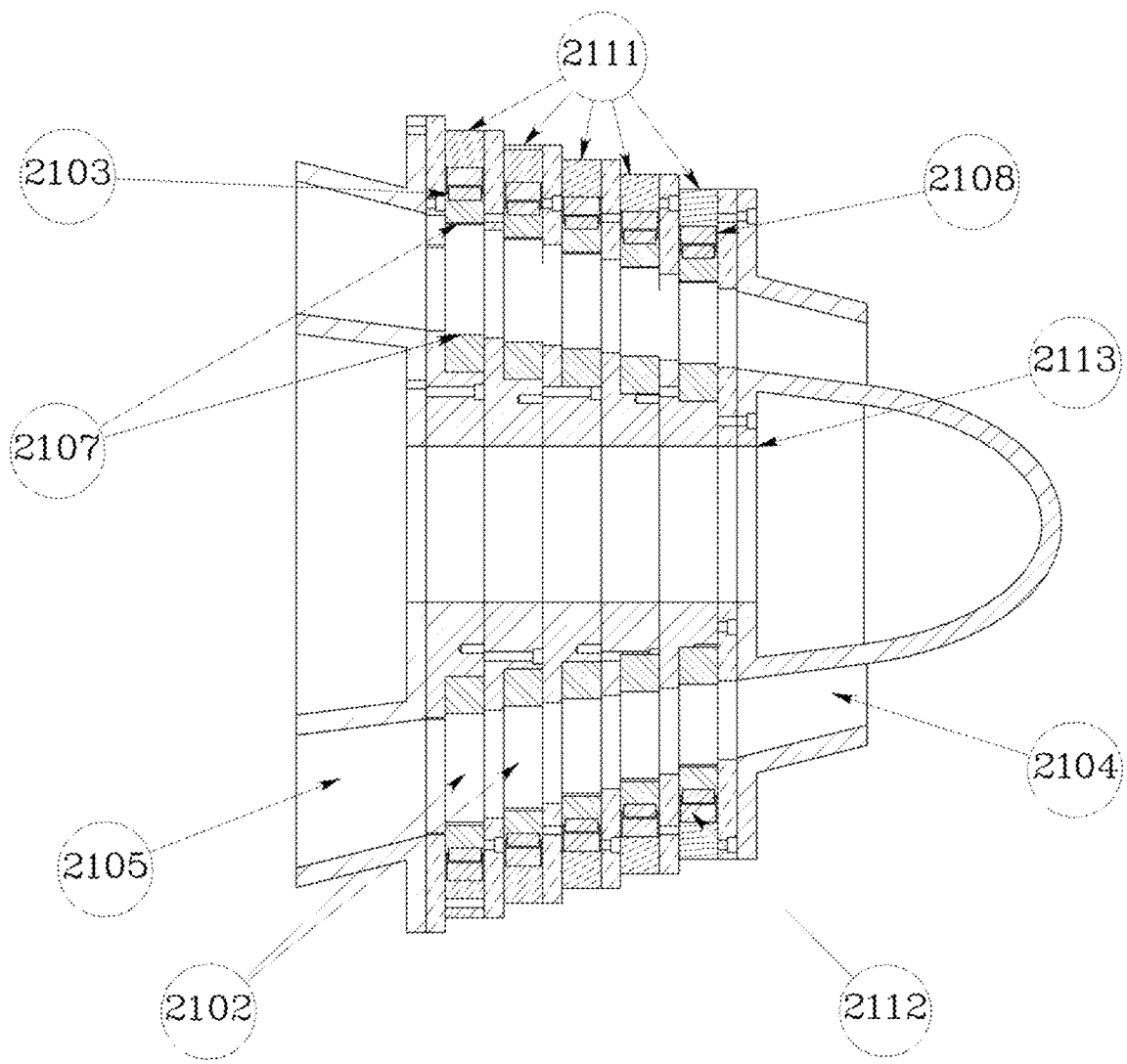
FIG. 21A is a side view of a shaftless turbine.
Figure 21B:
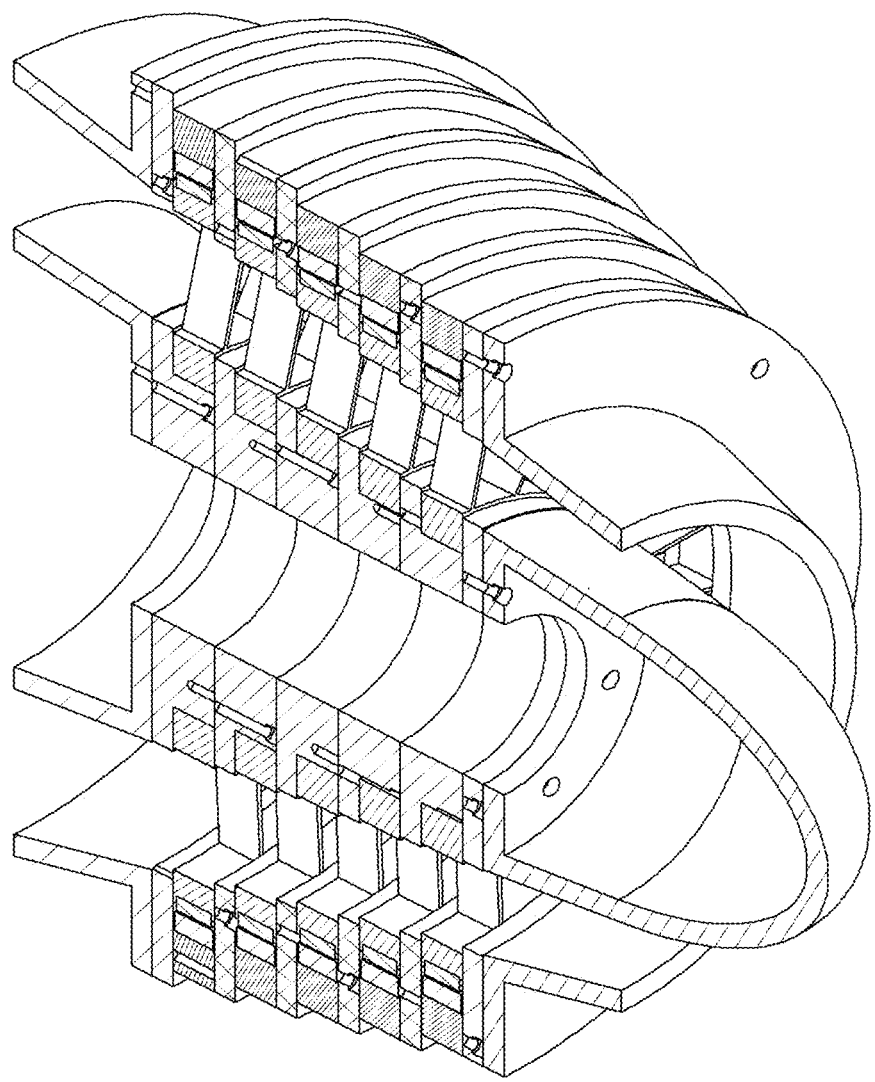
FIG. 21B is a 3-D view of a shaftless turbine.

As illustrated in FIGS. 21A-21B, a shaftless turbine that implements the same techniques noted in FIG. 20, has no center shaft, not even a stationary shaft. The stator includes components that are slipped over the shaft of FIG. 20 and bolted together to form a structural stator. The shaftless turbine of FIGS. 21A-21B is lighter than the embodiment described in FIG. 20 and would be appropriate for aerodynamic applications. For example, propulsors for lightweight drones require low sound output. Shaftless turbines would also be appropriate for power turbine applications.

As shown in FIGS. 21A-21B, the impeller stages do rotate independently to accommodate the highest efficiency possible. The volume encompassed by the veins of blades is reduced as the diameter and as the fluid being compressed are reduced. Each set of blades 2102 rotates and is driven independently. The blades are constrained axially by parallel and continuous annular surfaces on both sides at respective outside and inside perimeters that act against an axial externally pressurized gas bearing/seals 2107. These bearing/seals can be placed in series, as taught in FIG. 6, as two-sided stator components. As shown in FIG. 6, clearance can be designed between the thrust faces. In an alternative embodiment, the load path of the differential pressures can be accommodated as a straight line through the center of the bearings/seals. A spacer 2112, consistent with the thickness of the impeller between said contiguous parallel surfaces at its perimeters plus the designed clearances for the gas bearings/seals 2107, is bolted between the first said stator and the next section of stator to be bolted in place. This process continues axially until all the stages for the machine are assembled.

As illustrated in FIGS. 22A-22E, in the design of a radial compressor or expander, e.g., a compressor-loaded turboexpander as manufactured by Air Products, the conventional oil bearings and seals are removed and replaced with externally pressurized gas bearings 2203 and 2207 that support the impellers and provide sealing directly on the back of the impeller. This enables dramatic shortening of the shaft between the impellers while maintaining the maximum possible distance between the bearing surfaces supporting the impellers. Externally pressurized gas bearings enable high speeds with low frictional losses and heat generation; oil is entirely eliminated. The bearing seals can operate on process gases, steam or at cryogenic temperatures. Cost effectiveness and simplicity of this design makes energy recovery more economical.

In an expander/compressor with adjacent stages, e.g., as seen in a compressor-loaded turboexpander as manufactured by Air Products, is a shaft supported on rolling or oil bearings, going through seals. The shaft supports impellers cantilevered off the bearings which need to have significant axial and radial clearances at their perimeters, where they are doing most of their work, to account for rotor dynamics and other motions of the shaft. The shaft cannot be very stiff as the shaft length between impellers is a five times or more multiple of its diameter.

Figure 22A:
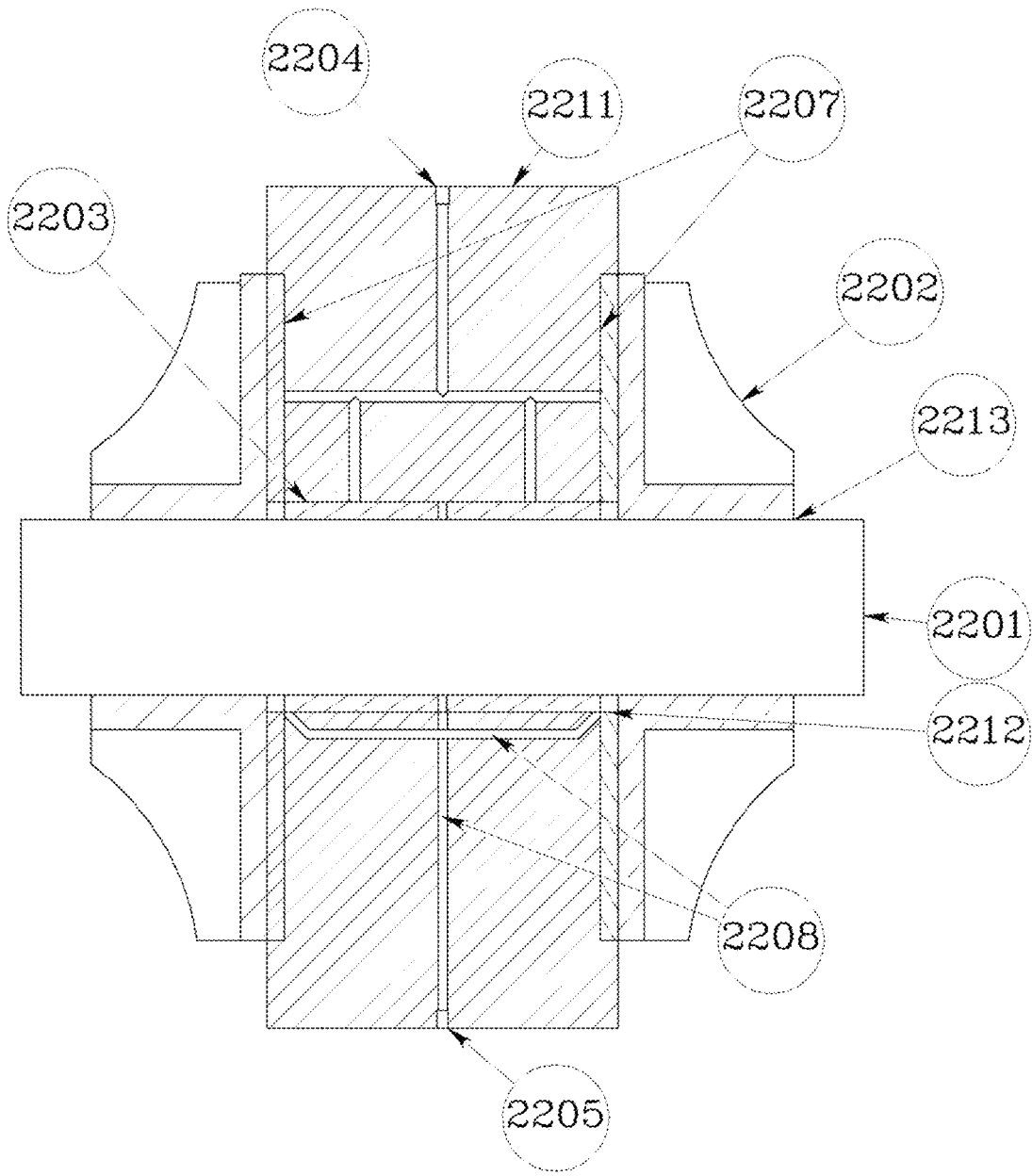
FIG. 22A-22E is various views of an oil-free expander or radial compressor with bearing seals.
Figure 22B:
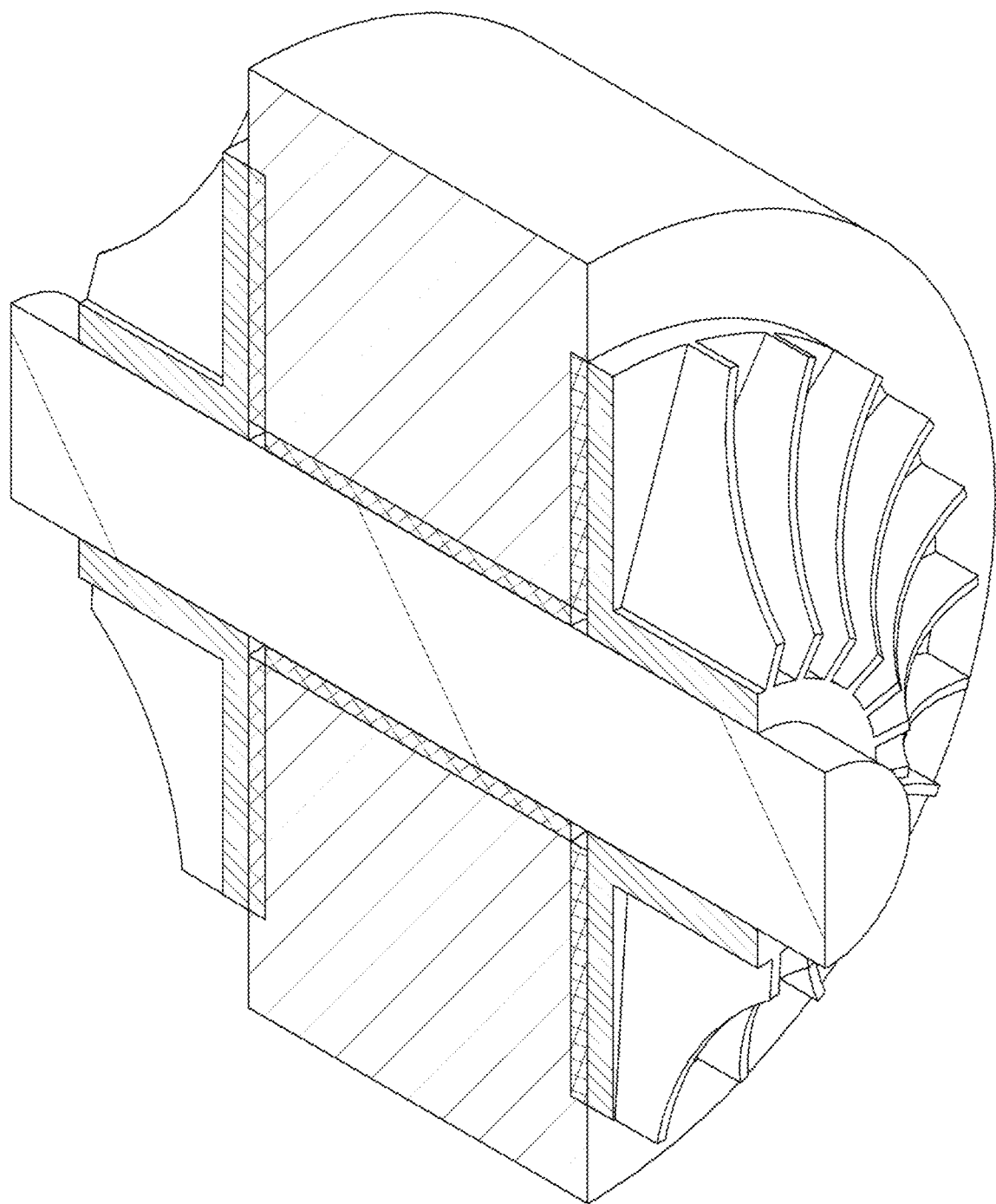
Figure 22C:
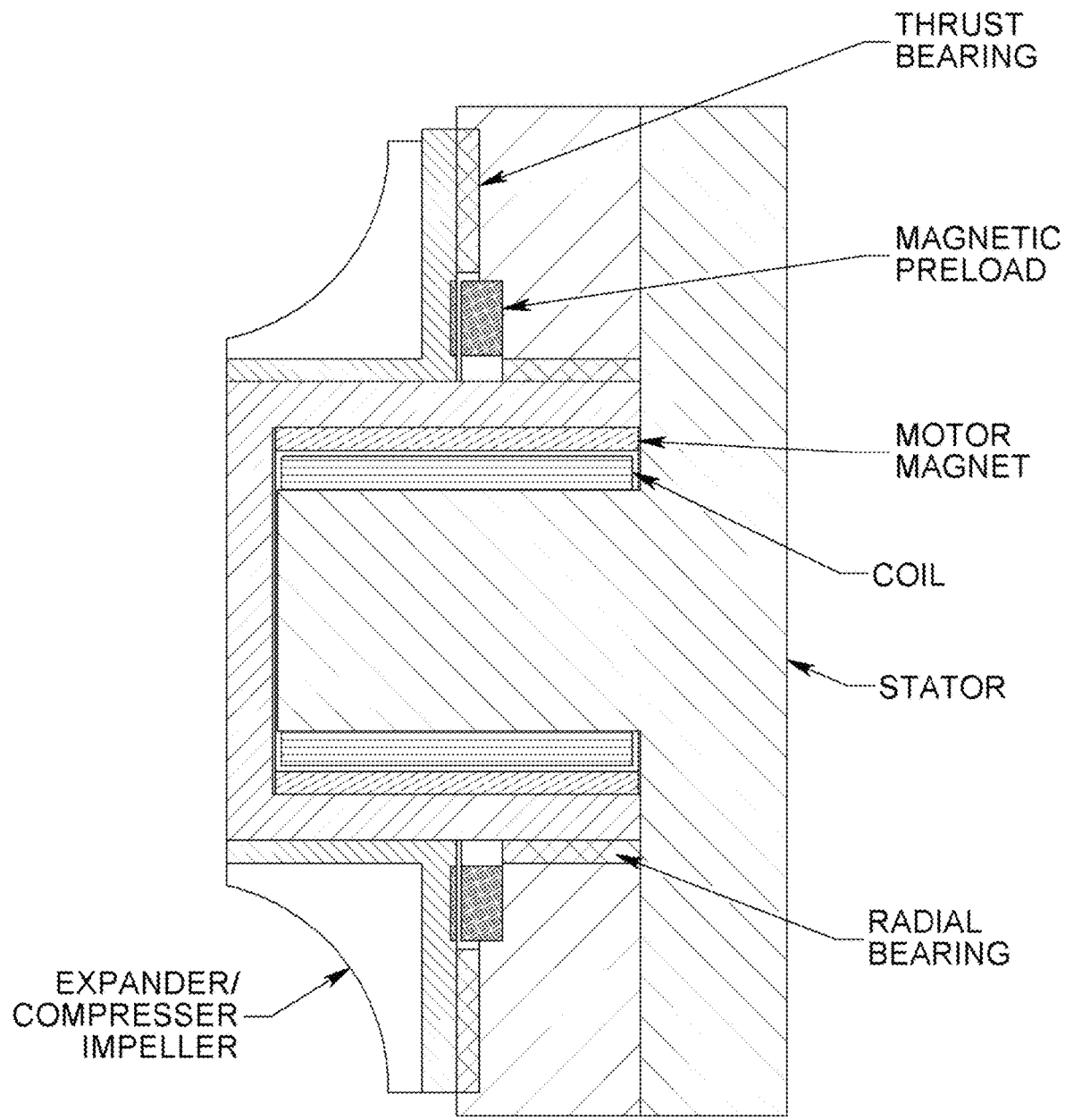

In an alternative embodiment, shown in FIG. 22A, using externally pressurized gas bearings as seals at the perimeter of the impellers 2207 would dramatically improve the dynamics and cost by eliminating the seals and oil bearings. The externally pressurized gas bearing seal combination could operate at cryogenic temperatures (−300 C), or on superheated steam. Air feed pressure could be from the high pressure side. Such aerostatic axial, radial bearings/seals would also tend to damp the rotor motions. Most importantly the bearings would allow for a much shorter shaft 2201 and hold the shaft as a stiff shaft. The stator 2211 has at least one port 2204 to accept pressurized gas. Passageways through the stator are used to distribute the pressurized gas to labyrinths (not shown in this illustration, but taught in FIGS.

1, 2 and 3) behind the porous media, used as a restrictive element in the radial 2203 and axial 2207 gas bearings. For example, the porting 2208 shown in the lower half of the stator in FIG. 22A allows gas that has been pumped through the porous media restriction and through the restriction of the actual bearing gap to escape to low-pressure. In this example, pressurized gas is percolated through the porous media 2207 and into the bearing gap that exists between the impeller 2202 and the thrust bearings 2207. It exits the gap at the outside perimeter or the inside perimeter. The clearance area at the inside perimeter also has the journal bearing gas exiting into it. If you do not provide a vent, pressure will build up to the pressure that is in the gap and load capacity will suffer. In this example, venting to the low-pressure side is preferred. Further, in this example, virtually 100% of the backside of the impeller is supported by a thrust bearing. This means that cantilevering is completely eliminated and there is no unsupported surface. This allows for dealing with thrust loads, from the high pressure, in the working chamber as a column stiffness through the back of the impeller to the bearing face. Also notice that the length to diameter ratio of the rotor is on the order of 2:1 rather than 5:1 or 10:1, as is common with expanders. It should be noted that turbochargers, expanders and radial compressors can be exposed to dramatic temperature fluctuations. So, some compliance should be designed in, for instance the methods taught in FIG. 1, or some ability for the impeller 2202 to translate on the rotor 2201, possibly applying a preload force.

Figure 29:
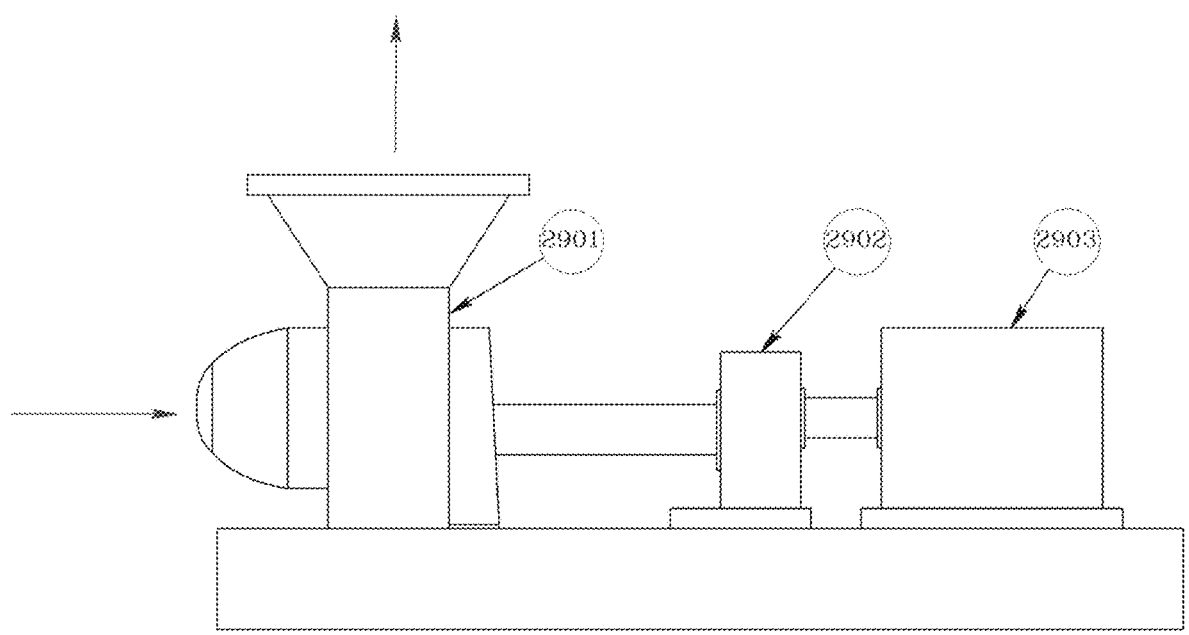
FIG. 29 shows a turbo charger.

One side of the expander could easily be configured into a generator, including a generator design which would employ magnets on the inside of the outside perimeter of the rotating shaft. Often the energy released in expanding gases is dissipated into heat though work, this design makes it economical to capture more energy as electricity. As shown in FIG. 29, the practice of using an expander 2901 to drive a gearbox 2902, which would step down the speed and then feed into a generator 2903, could be eliminated.

Figure 23:
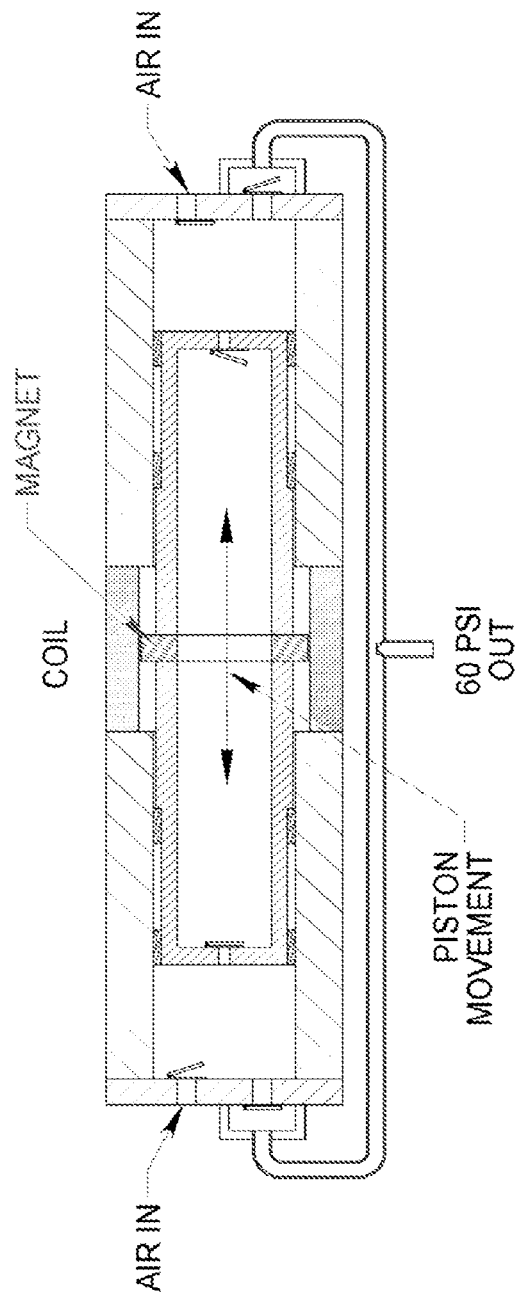
FIG. 23 is an air compressor with single reciprocating piston supported on air bearings which are also a seal.

FIG. 23 shows a dual faced piston that is reciprocated with in a cylinder by a voice coil motor. The piston is supported in the cylinder with a non-contact externally pressurized gas bearing which derives its pressure source from the high pressure side. The annular externally pressurized gas bearings also provide a sealing functionality. Reed valves or spring-loaded conventional cylinder valves control the flow fluid being pumped entirely by the pressure differences created. A voice coil motor situated in the relative center of the cylinder and piston is used to drive the piston back and forth within the cylinder in a noncontact fashion.

As in dry gas and face seals, biasing or spring loading one thrust side accounted for thermal growth of the shaft, and support for the impeller directly on the back of the impeller and near the perimeter was a dramatic improvement in stability. Such aerostatic axial, radial bearings/seals would also tend to damp the rotor motions. The elimination of oil reduced thermal isolation requirements as the gas bearing seal combination could operate at cryogenic temperatures or on superheated steam. Gas feed pressure could be from the high pressure side.

It is possible to combine the function of the annular graphite bearing seals with the magnet functionality by employing porous neodymium or various other magnetic materials.

One way of maintaining some reduction between the expander speed and the generator speed is to use the radius of the impeller as the reducing lever. It can be seen in FIG. 22C that a sleeve at the ID of the rotor was fitted directly with motor magnets. Also in this design the opposed thrust faces of the previous two designs were simplified by the use of a magnetic preload against a single thrust face.

Figure 22D:
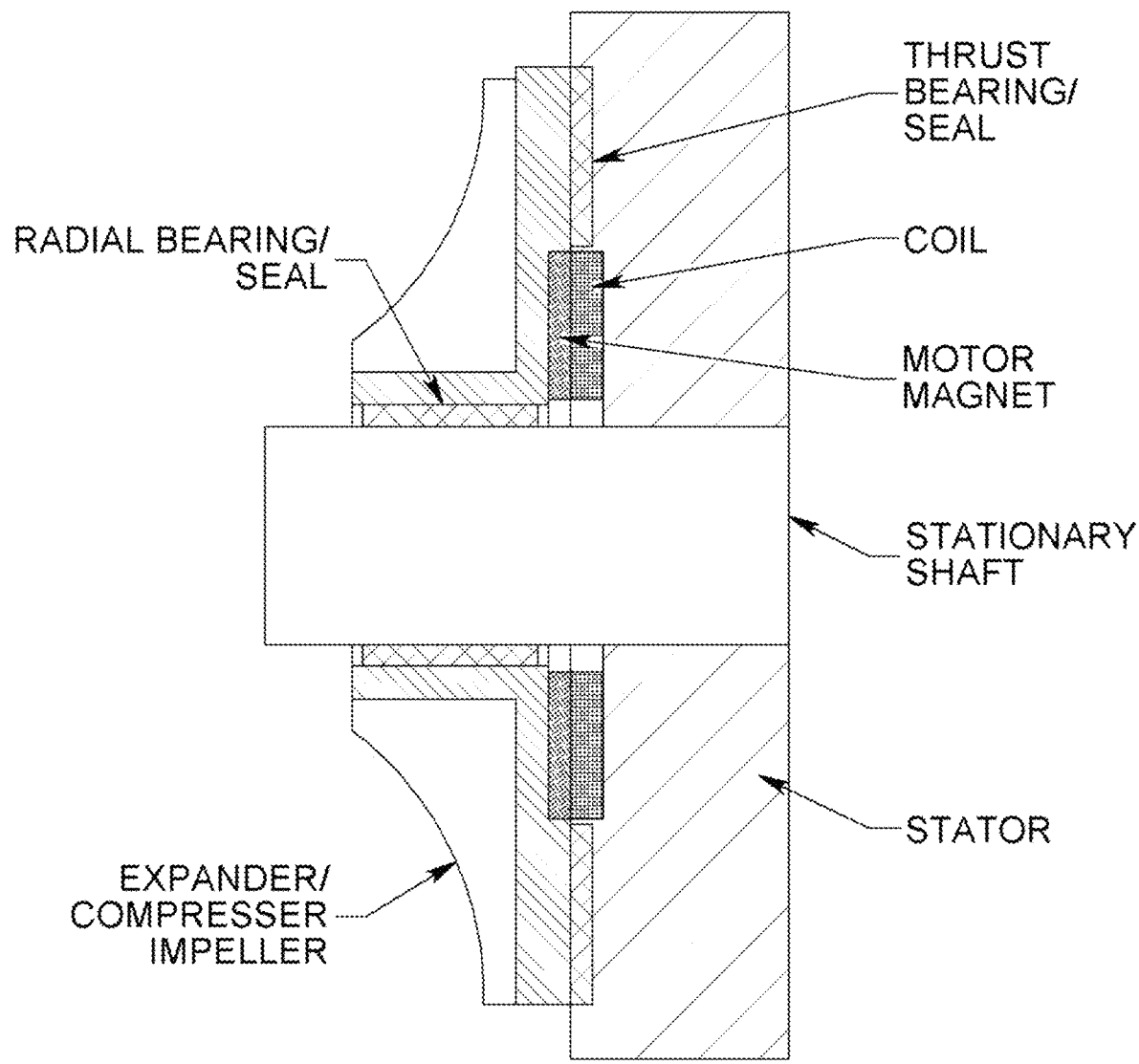

Referring to FIG. 22D, in yet another reduction of space, the magnetic preload employed in the previous example is instead provided by the attractive force between the magnets and the coils of the motor/generator itself. Notice that the physical weight of the rotating mass continues to be reduced but there are no issues with inertia or torsional dynamics as the impeller is not hard-coupled to anything.

Figure 22E:
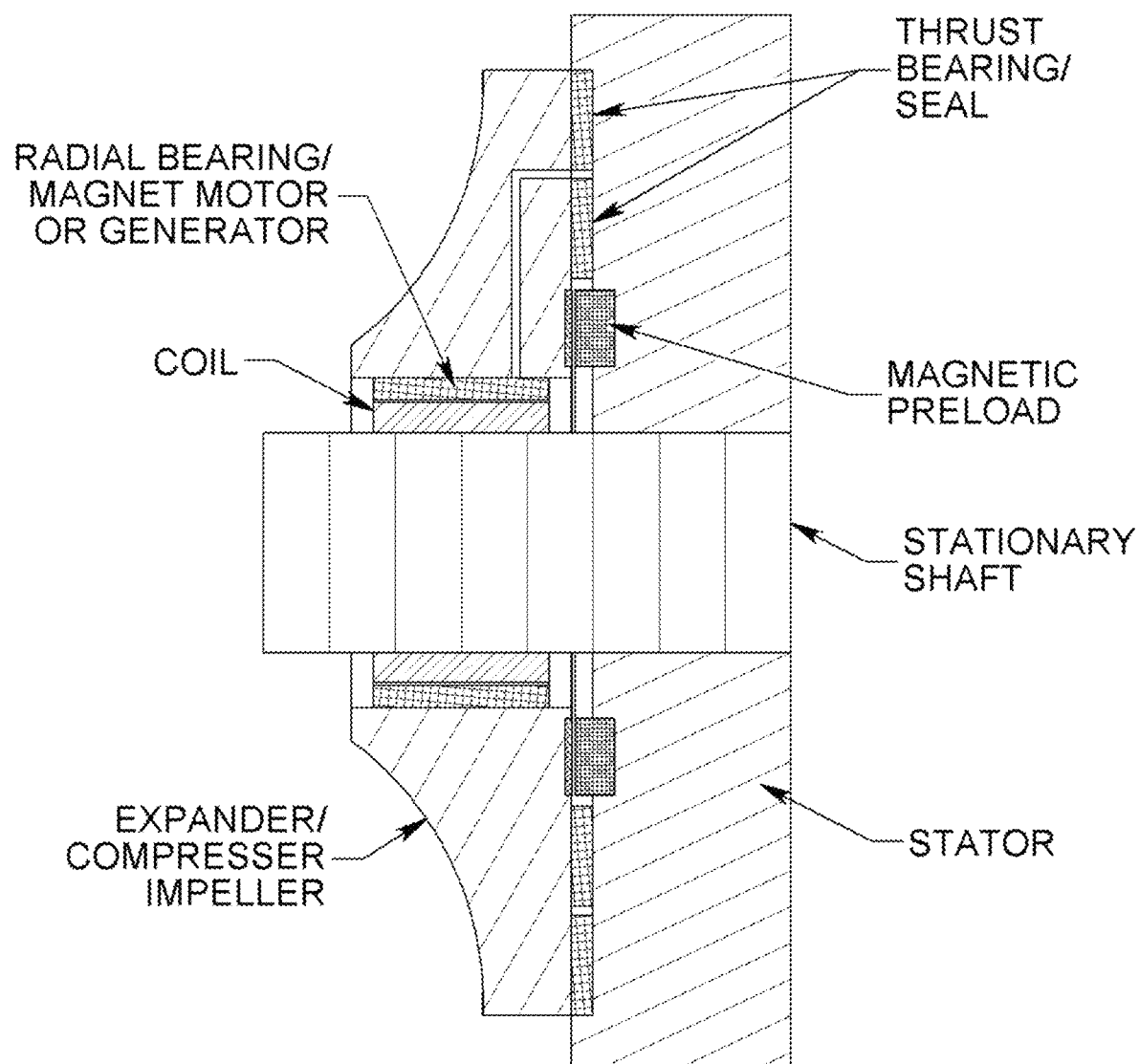

As motors cooperate with bearings to drive closer to the work being done, FIG. 22E shows porous neodymium made into an externally pressurized bearing element.

Figure 24A:
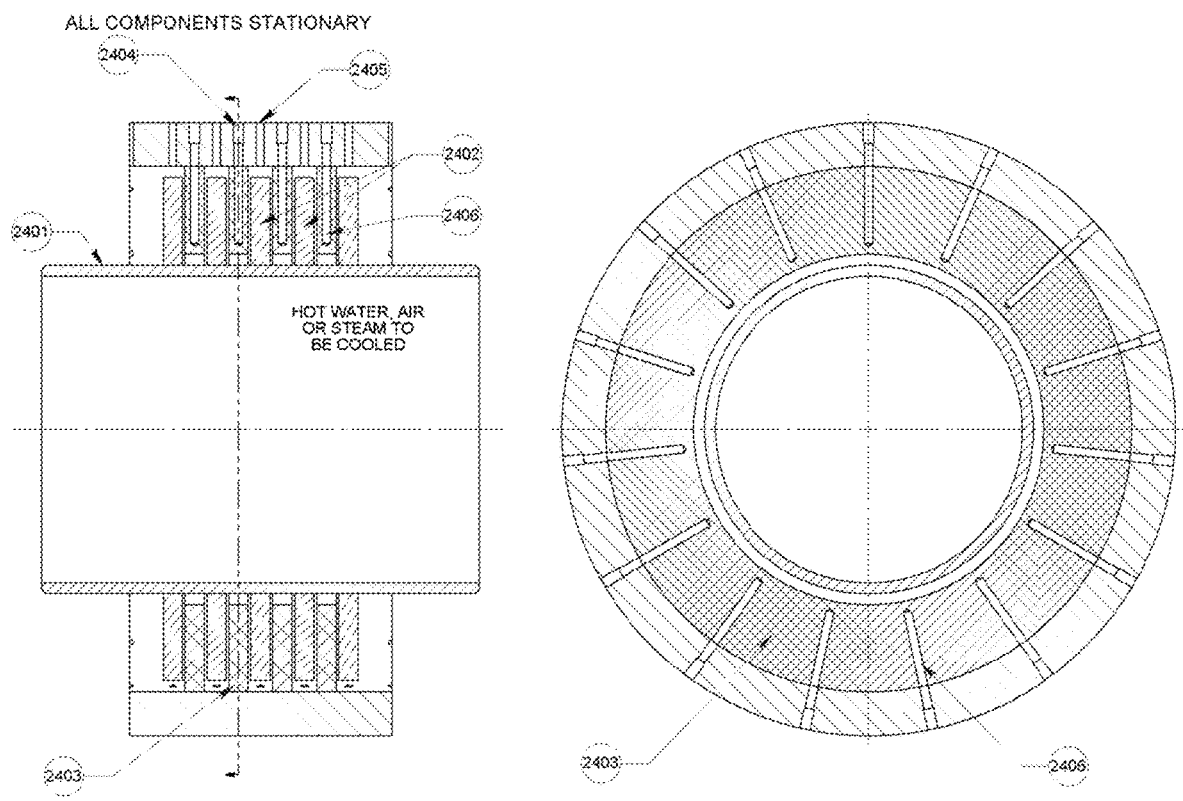
FIG. 24A is a side view of an externally pressurized gas bearings for viscous shear cooling.
Figure 24B:
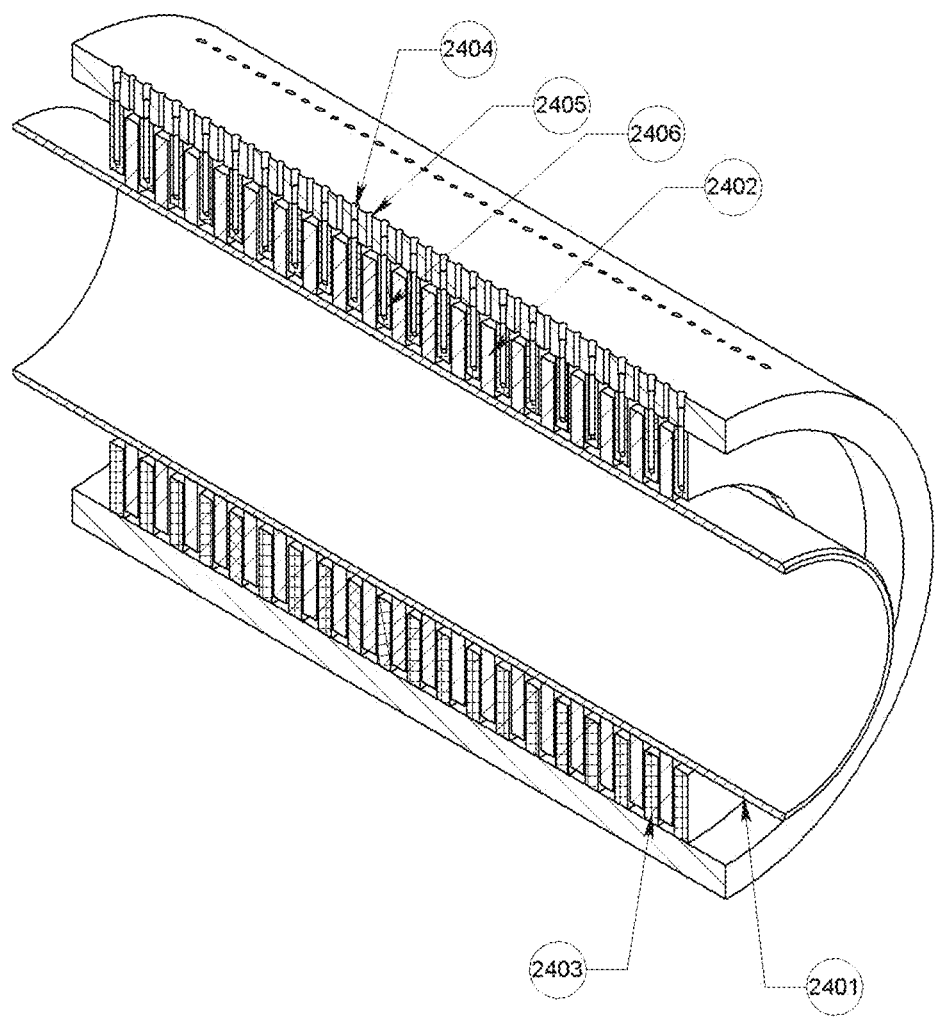
FIG. 24B is a 3-D view of an externally pressurized gas bearings for viscous shear cooling.

As illustrated in FIGS. 24A-24B, convective film coefficients, and boundary layer effects are key for effective thermal transfer from a surface to air. By employing externally pressurized gas bearing technology to create a very stable, high pressure, e.g., multiple atmospheres of pressure not just inches of water pressure differentials, high velocity air flows through very narrow gaps a boundary layer scrubbing effect can be achieved that dramatically improves thermal transfer at significant energy savings. Although the pressure introduced to the bearing is much higher than fan cooled heat exchangers, the volume of the air flow is much lower as it is being forced through a very restrictive 10 to 20µ gap. The energy required to move the air is not significantly different. The heat capacity of the air is improved because it is compressed, still at 2 to 4 bar as it flows through externally pressurized gas bearing gap. This high pressure air flows at speeds in excess of 50 m/s, which very effectively scrubs the boundary layer, you could think of "wind chill turbocharged".

In high performance rotating Turbo equipment, temperature, and temperature transfer can become a significant production issue. In the heating, ventilating and cooling industry, temperature transfer is a key component to efficiency. In both these cases, the use of the high pressure and velocity flows of gas through a gas bearing gap have some fundamental advantages to conventional air cooling technologies. First, pressurized air in the air gap has a higher density, and so a higher heat capacity than air that is at or near ambient pressure, as is typical in fan-blown radiators and cooling towers. Second, because of the high pressure, high velocities are also typical of gas bearing gaps; higher velocity of air means many more air molecules flows across the surfaces. Third, and possibly most importantly, there is a boundary layer scrubbing effect that cleans away the molecules that try to attach themselves to the surface being cooled. This boundary layer scrubbing effect is much more effective than what can be achieved with fans because of very high pressures and velocities available with gas bearings.

As illustrated in FIG. 24, a pipe carrying hot water 2401 or condensing steam, or even some fluid that is meant to be heated is integrally associated with a high thermal conducting attachment technique 2202, e.g., cooling fins. The pipe and the cooling fins would be stationary. To achieve cooling functionality, relatively cool air would be introduced at air input ports 2404. This air, or gas, is conducted into the donut-shaped porous media discs through hole 2406. The pressurized gas percolates through the porous media disc 2403 and into the gaps between porous media disc 2403 and the cooling fin 2402. The gas then flows between two components, scrubbing the boundary layer of the cooling fin, and carrying away heat. Then, it exits through the exhaust ports 2405 and back atmosphere.

Figure 27:
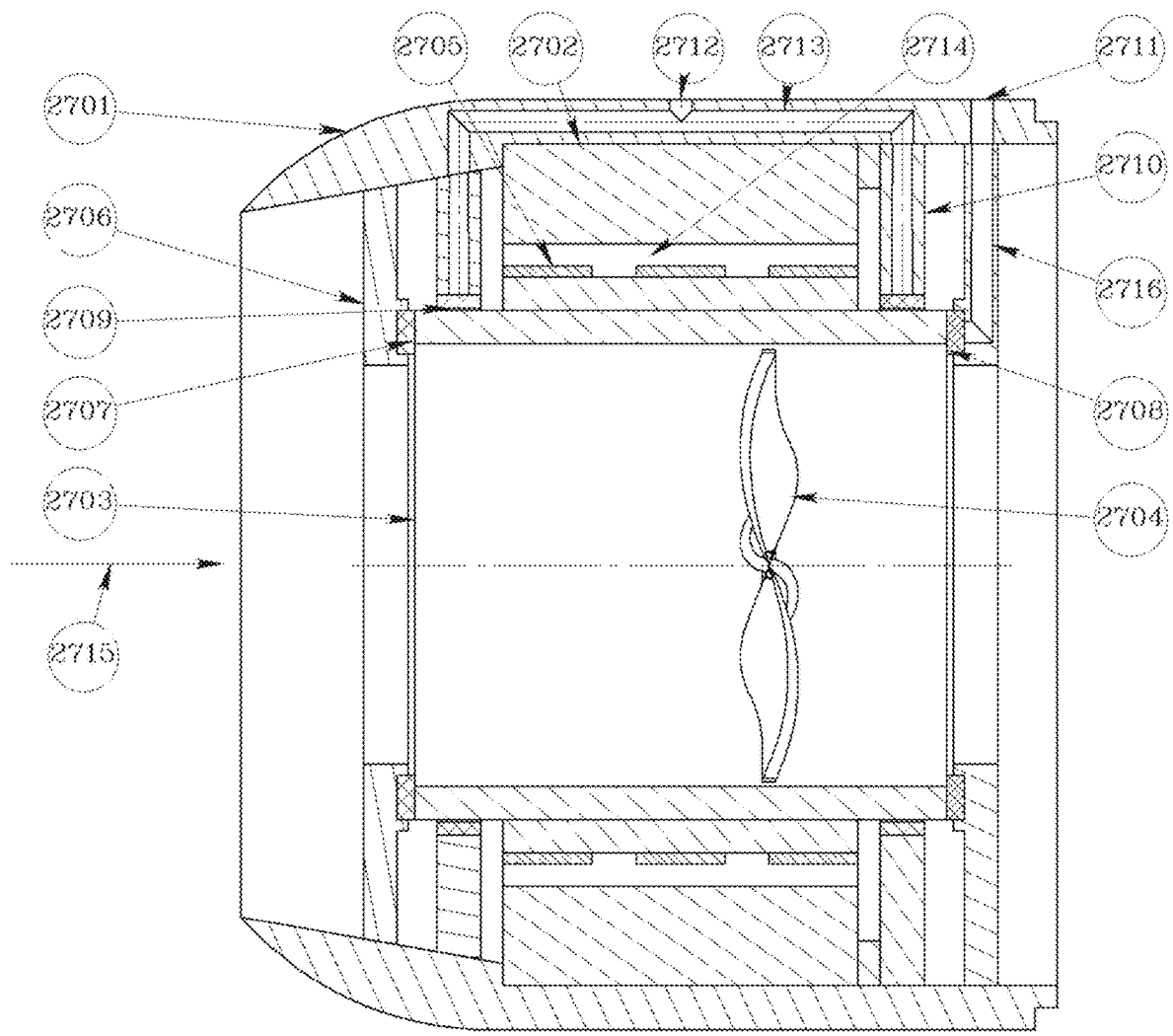
FIG. 27 shows bearings for thrust and propulsion.

Not shown in any figure is the concept that the externally pressurized gas bearings taught herein may be instrumented with temperature probes, proximity probes, force gauges, accelerometers, or any other type of sensor/probe that may be rendered useful in allowing an operator to monitor the life and health of the bearing. Such monitoring will allow for recognition of when the bearing is in need of maintenance. Mounting of such instrumentation can be done by drilling and potting and/or any means which renders the probe to be adequately secured for its intended purpose As illustrated in FIG. 27, a "rim-driven" thruster or propulsor 2701, a type of turbomachine comprises a stator 2702, a rotor 2703, blades 2704 which are mounted to the rotor 2703, and permanent magnets 2705. Seawater passes through the rotor-stator gap 2714. As opposed to use of bearings which are hardened material and lubricated by seawater, which is common in the art, the use of porous media externally pressurized gas bearings. Two radial bearing holders 2710 provides mounting for two porous media radial bearings 2709, to which gas is supplied via plenum 2712 and through multiple air distribution channels 2713 comprising a labyrinth to distribute air to the porous media radial bearings 2709. Two axial porous media bearings 2707 and 2708 are mounted in two bearing holders 2706, to which gas is supplied via orifice 2711 and through channel 2716. The externally pressurized gas bearings are not subject to debris in the seawater as positive pressure through the porous media prevents such contamination.

Figure 28:
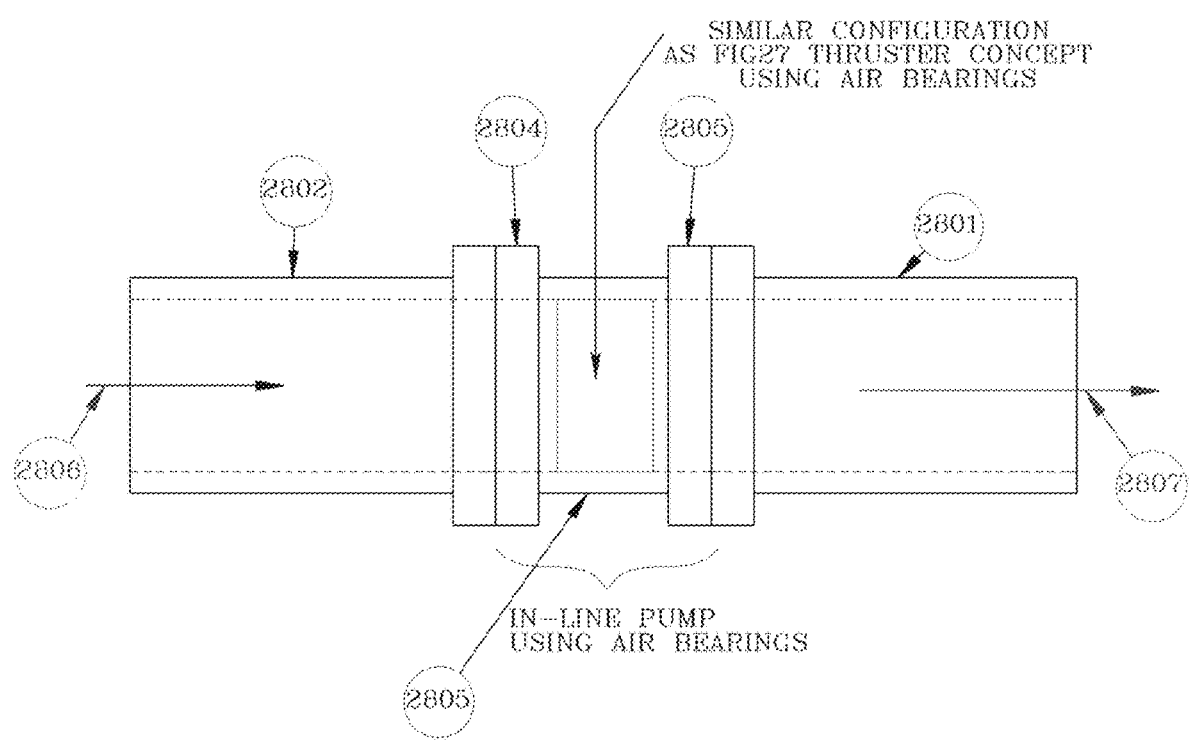
FIG. 28 shows bearings for in-line circulation.

As illustrated in FIG. 28, a similar configuration of the externally pressurized gas bearings of FIG. 27 representing a thruster or propulsor shows the rim-driven assembly 2803 connected between two pipes 2801 and 2802, and bolted via flanged members 2804 and 2805, with incoming flow 2806 and exiting flow 2807. This in-line pumping/circulation embodiment is one which can be used to circulate flow, as in a refinery or other piping arrangement. This provides a sealless solution for piping, and one in which the externally pressurized gas bearings can operate in the process fluid without the possibility of contamination from any debris, due to the positive pressure supplied to the porous media.

Carbon brushes, commonly understood in the art, provide electrical contact between rotating and stationary components of DC, and some AC, machines (e.g., motors, generators, alternators, and the like). The brushes carry current into the rotating parts, and assist in the commutation process. Carbon brushes are retained by brush holders and maintain contact with a slip ring assembly or commutator.

While carbon brushes vary by material grades (e.g., carbon graphites, electrographitic brushes, graphites, and metal graphites) and methods of contact (e.g., various types of brush holders and types of springs), the primary concern in operation is maintaining the proper amount of contact pressure. If the contact pressure is too low, any of the following situations can occur: brush sparking, increased wear of slip ring, increased brush wear, or increased slip ring temperature. If the contact pressure is too high, any of the following may occur: increased mechanical losses, increased brush wear and slip ring wear, and increased temperature. Hence, a properly maintained contact pressure is paramount in carbon brush design and operation. Since mechanical and electrical wear are important considerations (with tradeoffs as contact pressure changes), an optimal condition would be one in which there is continuous and precise contact between the brush and slip ring or commutator. One specific source suggests that for large DC equipment, 4 psi is an optimal pressure—one in which electrical and mechanical losses are optimized.

In order to maintain proper contact pressure, there are various contributing factors, including: brush and brush holder size, brush holder position, brush holder angle, and brush holder mounting height. However, the single-most important factor in maintaining contact pressure has been the spring which is used. Historically, various types of spring devices have been used, including clock-type springs, torsion bars, lever springs, and helical coil springs. One common problem is that, as spring force declines over time, an acceleration of electrical wear occurs. One solution to maintaining proper force has been the use of constant-force springs. However, even constant-force springs have limitations including a spring force manufactured tolerance of approximately +/−10%, specific break-in requirements, and premature performance if they conduct current. Regardless of the method used, shortcomings remain with respect to the current art relative to maintaining a constant pressure between carbon brushes and a slip ring or commutator.

Figure 25A:
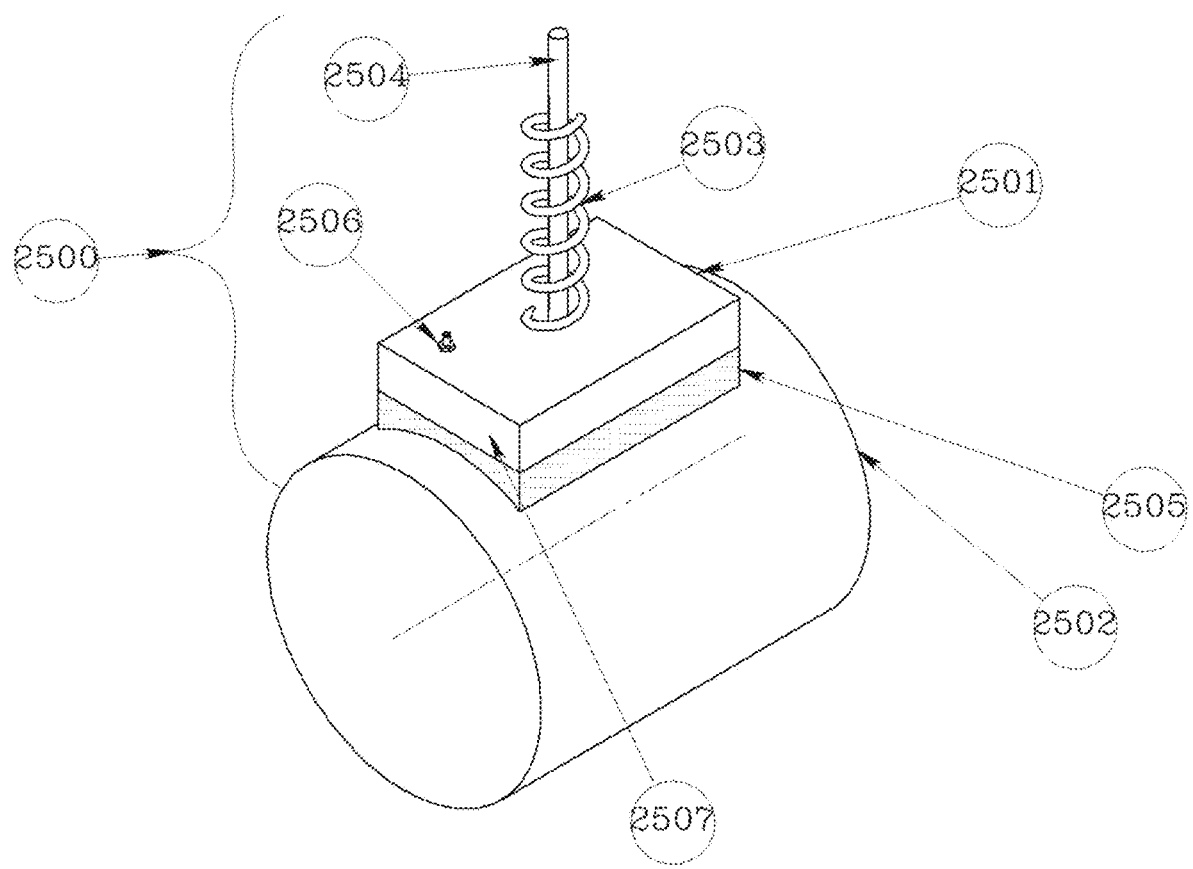
FIG. 25A shows balanced forces for carbon brushes, slip rings, and commutators.

As illustrated in FIG. 25A, a constant-pressure carbon brush 2500 comprised of a porous media member 2505 to provide balanced force, a holder 2501, a spring 2503, a conductive wire 2504, with gas is supplied via plenum 2506 and through multiple air distribution channels comprising a labyrinth to distribute air to the porous media. To accomplish a balanced force, spring force, which diminishes over time, is balanced by external pressure that is introduced through the porosity in the carbon brush itself through orifice 2506. To explain this, assuming that the desired contact pressure is 4 psi, a spring 2503 can be designed to transmit a higher pressure than this (e.g., 10 psi). Initially, when the spring 2503 is new, it is assumed that the pressure from the spring 2503 would be a full 10 psi. Since only 4 psi is the desired contact pressure, externally pressurized air set to 6 psi can be introduced into the carbon brush such that the resulting (differential) pressure at the porous media restriction face 2507 which contacts the commutator or slip ring 2502 is 4 psi contact pressure. As the spring pressure decreases over time, the externally-supplied air will be adjusted (decreased) such that the resulting contact pressure (differential pressure between the spring force and the externally-pressurized air) remains constant.

Figure 25B:
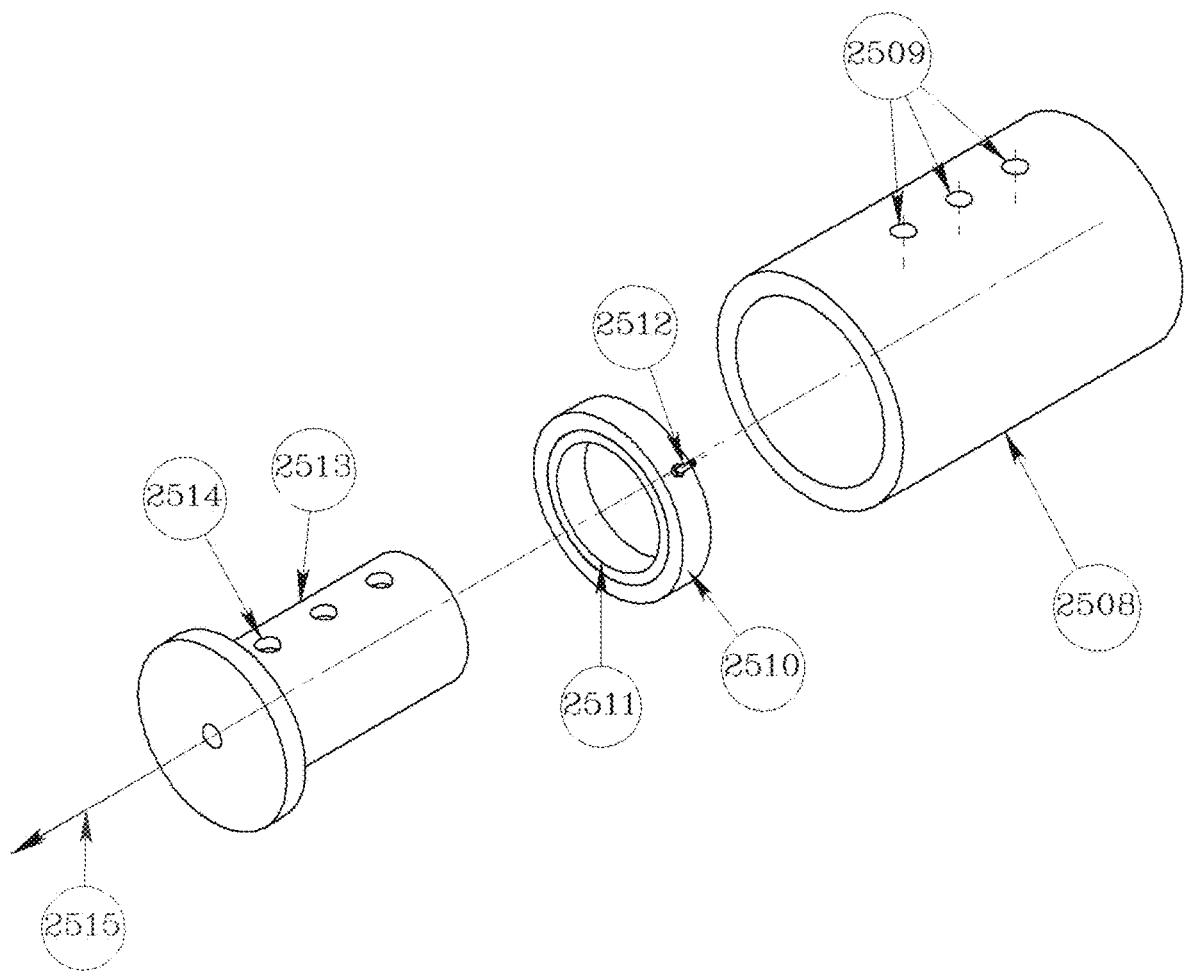
FIG. 25B is a bearing seal for rotary union.

In an alternative embodiment, rotary unions, commonly known in the art as a mechanism that allows the transfer of fluid from a stationary member to a rotating member, while maintaining sealing at the connection point. Referring to FIG. 25B, A housing 2508 allows entry of fluid through orifices 2509 which flow into channels within the housing. The fluid is transferred through orifices 2514 in a rotating member or shaft 2513 and fluid exist the shaft at an exit 2515. In order to preserve the sealing of the mechanism, traditionally, sealing devices are contained with the housing. In the preferred embodiment, a porous media bearing seal is used, comprising porous media 2511 in a holder 2510, with gas supplied via plenum 2512 and through multiple air distribution channels comprising a labyrinth to distribute air to the porous media. The externally pressurized gas bearing seal is installed in the housing 2508 and acts as both a bearing for the shaft and as a seal, preventing the transferred fluid from escaping from the overall rotary mechanism. Only one bearing seal has been shown in FIG. 25B, although more than one would typically be used.

Figure 25C:
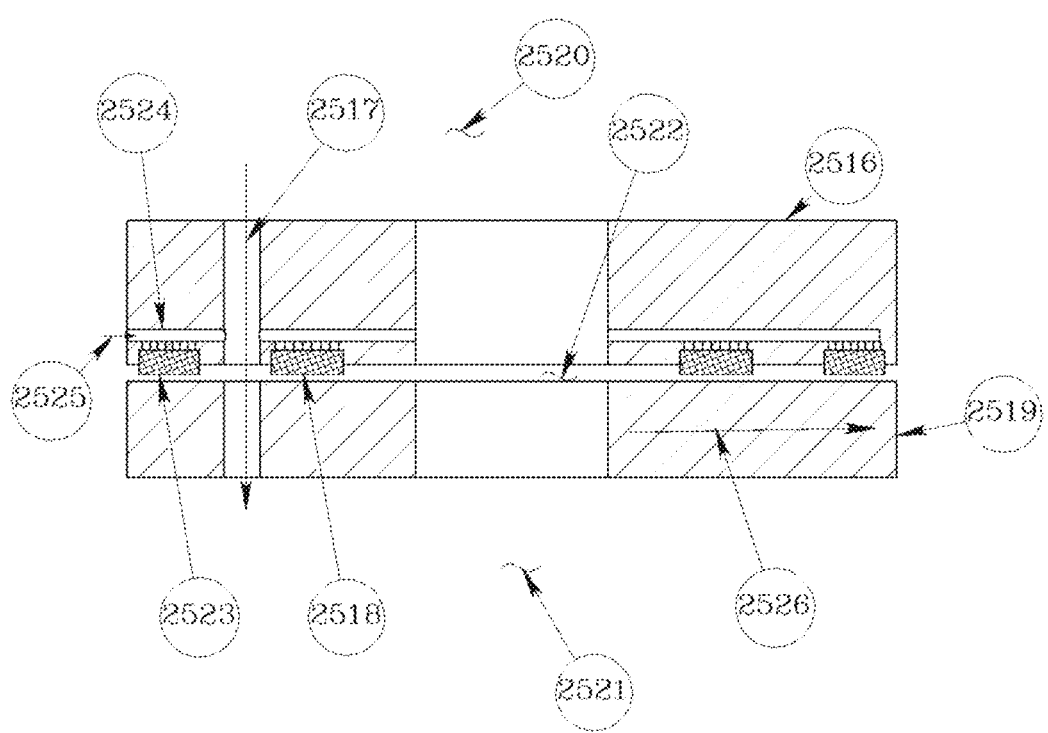
FIG. 25C shows balanced forces for unions.

In a variation of the aforementioned rotary union embodiment, FIG. 25C shows a means of employing balanced force methodology at the face of a rotary union. A stationary member 2516 allows flow 2517 through the stationary member 2516 and through rotating member 2519 which spins in the direction shown by 2526, without leakage at the face 2522. The stationary member retains porous media members 2523 and 2518 in the form of two concentric rings, with an annular space 2526 between said porous media rings. Gas 2525 is introduced to the porous media via plenum 2524 and through multiple air distribution channels to supply gas pressure to both porous media rings. This gas pressure counteracts a force acting on the top side of the rotary union 2520, which can occur from a spring, flexure, or other means. The supplied gas pressure and force acting on the top side of the rotary union are balanced such that the gap at face 2522 is zero, and such that there is no contact, this preventing leakage when flow 2517 passes from the stationary member 2516 through the rotating member 2519 and into the working side 2521 of a machine, such as into a machine tool spindle, or other similar member.

Figure 26:
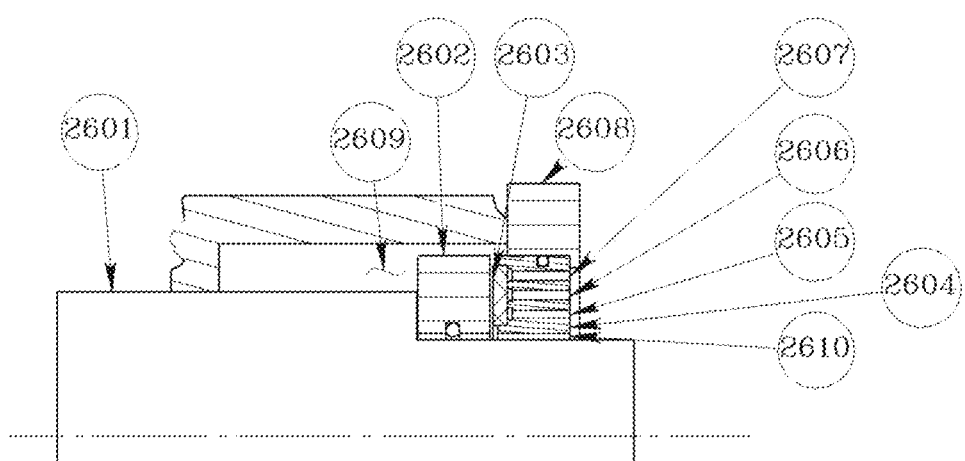
FIG. 26 shows differentially pressurized grooves.

As illustrated in FIG. 26, the concept of balanced force is shown with differentially-pumped grooves. In this embodiment, a shaft 2601 rotates with a runner 2602 attached to it. A seal housing 2604 is attached to stator 2608, and a porous media face 2603 has relative motion with runner 2602. For example, a system pressure 2609 may be at 3,000 psig. The three channels distributing gas pressure to the porous media 2603 each are supplied with a different and adjustable pressure. These adjustable pressures are such that the resulting pressure at location 2610 will be zero psig. This can be accomplished by having a pressure at the first channel location of, say 6 bar above system pressure, or, approximately 3,090 psig, which will be reduced by the time it exits the porous media, but still higher than system pressure 2609. The next channel 2606 could be at 2,000 psig, and the last channel 2605 pressure could be at 1,000 psig.

Not shown in any figure is the notion that the externally pressurized gas bearings taught herein may be used for high speed balancing of rotating equipment. Typically, high speed rotor balancing and testing is performed using oil lubricated hydrodynamic bearings. Using externally pressurized gas bearings eliminates the mess associated with use of oil, which results in oil leaking onto rotating assemblies, and also misting onto various portions of high speed test bunkers. Additionally, due to the frictionless, non-contact effects of externally pressurized gas bearings (even at zero rpm), better rotordynamic analysis is permitted. Furthermore, set-up is simplified since oil lubrication of bearings, along with the associated pressure systems, is eliminated.

While preferred embodiments have been set forth in detail with reference to the drawings, those skilled in the art who have reviewed the present disclosure will readily appreciate that other embodiments can be realized within the scope of the invention, which should therefore be construed as limited only by the appended claims.

What is claimed is:

1. A rotating equipment comprising:
a housing including a plurality of conductive passages for communicating gas;
at least one impeller having an annular bearing surface contained in the housing, wherein the at least one impeller is arranged along a shaft;
a first plurality of porous media gas bearings configured to support the at least one impeller radially; and
a second plurality of porous media gas bearings configured to directly support the annular bearing surface of the at least one impeller axially,
wherein each of the first and second pluralities of porous media gas bearings are connected to multiple plenums and the plurality of conductive passages for communicating gas are configured to supply pressurized gas to each of the multiple plenums, wherein each of the first and second pluralities of porous media gas bearings have a back surface and a front surface, and wherein each of the front and back surfaces are a continuous piece of porous material without openings.

2. A rotating equipment comprising:
a housing that includes a plurality of conductive passages for communicating gas;
a shaft;
at least one impeller having an annular bearing surface and arranged along the shaft and contained in the housing;
a first plurality of porous media gas bearings configured to support the at least one impeller radially; and
a second plurality of porous media gas bearings configured to directly support the annular bearing surface of the at least one impeller axially,
wherein the shaft is fixed relative to the housing, wherein the first plurality of porous media gas bearings are arranged radially between the shaft and each of the at least one impeller, wherein each of the first and second plurality of porous media gas bearings are connected to multiple plenums and the plurality of conductive passages for communicating gas are configured to supply pressurized gas to each of the multiple plenums, wherein each of the first and second pluralities of porous media gas bearings have a back surface and a front surface, and wherein each of the front and back surfaces are a continuous piece of porous material without openings.

3. The rotating equipment of claim 1, wherein the at least one impeller is at least two impellers, and the first plurality of porous media gas bearings are arranged along the shaft in between each of the at least one impeller.

4. The rotating equipment of claim 1, wherein the first plurality of porous media gas bearings are arranged along the shaft on either side of the at least one impeller.

5. The rotating equipment of claim 1, wherein all of the first plurality of porous media gas bearings and the second plurality of porous media gas bearings are also configured to serve as a seal.

6. The rotating equipment of claim 1, wherein the at least one impeller is at least two impellers, and each of the at least two impellers are driven at different speeds.

7. The rotating equipment of claim 1, wherein either of the first plurality of porous media gas bearings or the second plurality of porous media gas bearings are also a magnetic element in a motor or generator.

8. The rotating equipment of claim 1, wherein the second plurality of porous media gas bearings are arranged on opposite sides of each of the at least one impeller to provide axial support.

9. The rotating equipment of claim 1, wherein the first and second plurality of porous media gas bearings each comprise a porous media bearing surface selected from a group consisting of ceramic materials, graphite, carbon, silicon carbide, tungsten carbide, alumina, neodymium, and other sintered materials.

10. The rotating equipment of claim 1, wherein each porous media element is formed using at least in part a 3-D printing process.

11. The rotating equipment of claim 2, wherein all of the first plurality of porous media gas bearings and the second plurality of porous media gas bearings are also configured to serve as a seal.

12. The rotating equipment of claim 2, wherein the at least one impeller is at least two impellers, and each of the at least two impellers are driven at different speeds.

13. The rotating equipment of claim 2, wherein either of the first plurality of porous media gas bearings or the second plurality of porous media gas bearings are also a magnetic element in a motor or generator.

14. The rotating equipment of claim 2, wherein the second plurality of porous media gas bearings are arranged on opposite sides of each of the at least one impeller to provide axial support.

15. The rotating equipment of claim 2, wherein the first and second plurality of porous media gas bearings each comprise a porous media bearing surface selected from a group consisting of ceramic materials, graphite, carbon, silicon carbide, tungsten carbide, alumina, neodymium, and other sintered materials.

16. The rotating equipment of claim 2, wherein each porous media element is formed using at least in part a 3-D printing process.

* * * * *